(12) United States Patent
Kikuchi et al.

(10) Patent No.: US 6,210,770 B1
(45) Date of Patent: Apr. 3, 2001

(54) OPTICAL RECORDING MEDIUM AND METHOD OF MANUFACTURING THE SAME

(75) Inventors: Minoru Kikuchi; Yoshihiro Akimoto; Fuminori Takase; Nobuhiro Saito; Noriko Kikuchi, all of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/274,274

(22) Filed: Mar. 22, 1999

(30) Foreign Application Priority Data

Mar. 20, 1998 (JP) ................................. P10-072676
Mar. 20, 1998 (JP) ................................. P10-072677
Mar. 31, 1998 (JP) ................................. P10-087595

(51) Int. Cl.$^7$ ....................................... B32B 3/02
(52) U.S. Cl. ................. 428/64.1; 428/64.4; 428/64.5; 428/913; 430/270.13; 430/495.1; 430/945; 369/283; 369/288; 204/192.26
(58) Field of Search ................ 428/64.1, 64.2, 428/64.4, 64.5, 913; 430/270.13, 495.1, 945; 369/283, 288; 204/192.1, 192.12, 192.26

(56) References Cited

U.S. PATENT DOCUMENTS

| | | | |
|---|---|---|---|
| 5,100,700 | * | 3/1992 | Ide ........................... 428/64.1 |
| 5,888,680 | * | 3/1999 | Ohbayashi .................... 430/19 |
| 6,040,066 | * | 3/2000 | Zhou ......................... 428/64.1 |
| 6,042,021 | * | 3/2000 | Yoshinari .................... 428/64.1 |

* cited by examiner

Primary Examiner—Elizabeth Evans
(74) Attorney, Agent, or Firm—Sonnenschein, Nath & Rosenthal

(57) ABSTRACT

A phase-change optical disc has a recording layer formed from a phase-change material switchable between a crystalline state and an amorphous state. The recording layer is illuminated signal-wise by a light is focused onto the recording layer to change the phase thereof from crystalline to amorphous, to thereby write an information signal onto the recording layer. The phase-change material contains a GeSbTe alloy. The recording layer is formed by sputtering in an Ar gas atmosphere containing at least either $N_2$ or $O_2$ gas or both. The optical recording medium exhibits improved durability after repeated recording and maintains a stable and good write/read characteristic even after repeated cycles of signal recording.

27 Claims, 30 Drawing Sheets

OPTICAL RECORDING MEDIUM AND METHOD OF MANUFACTURING THE SAME

BACKGROUND OF THE INVENTION

The present invention relates to an optical recording medium comprising a recording layer formed from a phase-change material changeable between a crystalline state and an amorphous state, which responds to a focused spot of a light by switching between crystalline and amorphous phases to thereby record an information signal, and to a method of manufacturing the optical recording medium.

Conventional optical recording media in which a variety of information signals can be written and/or read out with respect to a portion of the recording medium under the focused spot of a light such as a laser beam include: optical discs, in which information signal is previously written with embossed pits; phase-change optical discs, in which information signal is written to a recording layer thereof utilizing the switching between crystalline and amorphous states of the recording layer; and magneto-optical discs, in which information signal is written to a recording layer thereof utilizing the magneto-optic effect of the recording layer, etc. Each of these optical discs comprises a transparent substrate made of glass or a plastic, such as polycarbonate, having functional layers, such as a recording layer, a reflective layer, etc. formed on the substrate.

Among the types of optical recording media, the magneto-optical disc and phase-change optical disc are of a rewritable or erasable type. Especially, the phase-change optical disc is advantageous in that it is easily rewritable. Disc drives for the phase-change optical disks may be made very compact, since read and write functions with respect to the phase-change optical discs can be achieved without the need for apparatus for generating an external magnetic field. Thus, the phase-change optical disc has been attracting much attention in the field of industry.

In such a phase-change optical disc, an information signal is written by focusing a laser beam having a high level of power (will be referred to as "recording power" hereinafter) onto a recording layer of the optical disc to heat the recording layer to a temperature higher than its melting point, and then cooling it quickly enough to freeze the portion of the recording layer under the focused spot of the laser beam in an amorphous state to form a recording mark for the information signal.

To erase the information signal recorded on the recording layer of the phase-change optical disc, a laser beam of a power level below that of the laser beam used to record the information signal, that is, a lower-power laser beam than the recording level, is focused at least onto the recording mark to heat the portion under the focused laser beam to a temperature higher than the crystallization point and lower than the melting point, and then the heated portion is cooled to recrystallize the portion, namely, change the recording layer portion from the amorphous state back to the crystalline state, and thus erase the amorphous recording mark.

Further, in the phase-change optical disc, since even a same portion of the recording layer under the focused spot of laser beam differs in reflectivity depending upon whether it is in a crystalline or amorphous phase, a difference in reflectivity between the crystalline and amorphous states can be detected, by focusing a laser beam having a lowest level of power onto the recording layer, to read out the recorded information signal.

The recording layer of such a phase-change optical disc is formed from a phase-change recording material such as a calcogenide containing a GeSbTe alloy (will be referred to as "Ge-calcogenide" hereinafter), a calcogenide containing an AginSbTe alloy (will be referred to as "Ag-calcogenide" hereinafter), or the like. It is well known that a phase-change optical disc having a recording layer made of a Ge-calcogenide is superior in durability against repeated recording to a one having a recording layer formed from a Ag-calcogenide.

As mentioned above, the phase-change optical disc having a recording layer made of a Ge-calcogenide is known to be superior in durability against repeated recording to a one having a recording layer made of an Ag-calcogenide. It is also known however that the characteristic of a signal read out after being repeatedly recorded a few times to tens of times is regionally deteriorated and the characteristic of a signal read out after being repeatedly recorded more than tens of thousands of times is deteriorated drastically.

Thus, this conventional phase-change optical disc is not able to assure a stability of a signal read out after being repeatedly recorded a small number of times such as a few times to tens of times and also not able to assure a quality of a signal read out after being repeatedly recorded a large number of times, such as more than tens of thousand of times. In effect, the conventional phase-change optical disc is not yet sufficiently reliable with respect to the write/read characteristics thereof under conditions of intended re-use.

SUMMARY OF THE INVENTION

Accordingly, the present invention has an object to overcome the above-mentioned drawbacks of the prior art by providing a phase-change optical disc further improved in durability against repeated recording and adapted to always show a stable and good characteristic of a signal read out even after being recorded repeatedly, and a method of manufacturing the phase-change optical disc.

The above object can be attained by providing a phase-change optical disc comprising a recording layer comprising a phase-change material switchable between a crystalline state and an amorphous state, and in which a light is focused onto the recording layer to change the phase thereof from crystalline to amorphous, thereby writing an information signal into the recording layer, wherein according to the present invention, the phase-change material comprises a GeSbTe alloy; and
the recording layer is formed by sputtering in an Ar gas atmosphere containing at least either $N_2$ or $O_2$ gas.

In the above-mentioned optical recording medium according to the present invention, since the recording layer forming conditions are defined, the GeSbTe alloy forming the recording layer is suitably nitrided and oxidized to optimize the physical properties of the recording layer for information signal read/write and to further improve the durability against repeated recording. The optical recording medium according to the present invention is thereby adapted to minimize the regional deterioration of a signal read out after being repeatedly recorded a few times to tens of times and to provide a quality signal read out even after being repeatedly recorded more than tens of thousands of times. Thus, information signal can be read out from the new and improved optical recording media of the present invention in a manner exhibiting a stable and good characteristic even after being re-used and repeatedly rewritten.

More particularly, on the assumption that the recording layer of the optical recording medium of the present invention is formed at a speed X (nm/s) in an Ar gas atmosphere containing $N_2$ and $O_2$ gases of which the mixing ratio $(N_2+O_2)/Ar$ between the $N_2$ and $O_2$ gases and the Ar gas is $Y(\%)$ and the mixing ratio $O_2/(N_2+O_2)$ of $O_2$ gas with the mixture of $N_2$ and $O_2$ gases is $Z(\%)$, the parameters X, Y and Z should preferably meet the following relations (1) to (3):

$$Y \geq 2.3X+1.0 \quad (1)$$

$$Y \leq 12.8X+16.7 \quad (2)$$

$$10 \leq Z \leq 60 \quad (3)$$

Further, on the assumption that the recording layer of the optical recording medium of the present invention is formed at a speed X (nm/s) in an Ar gas atmosphere containing $O_2$ gas of which the mixing ratio $O_2/Ar$ between the $O_2$ and Ar gases is $Y(\%)$, the parameters X and Y should preferably meet the following relations (1) and (3):

$$Y \geq 2.3X+1.0 \quad (1)$$

$$Y \leq 5.5X+2.7 \quad (4)$$

Furthermore, on the assumption that the recording layer of the optical recording medium of the present invention is formed at a speed X (nm/s) in an Ar gas atmosphere containing $N_2$ gas of which the mixing ratio $N_2/Ar$ between the $N_2$ and Ar gases is $Y(\%)$, the parameters X and Y should preferably meet the following relations (2) and (5):

$$Y \leq 12.8X+16.7 \quad (2)$$

$$Y \geq 1.8X+5.0 \quad (5)$$

The above object can also be attained by providing a method of manufacturing an optical recording medium having a recording layer formed from a phase-change material switchable between a crystalline state and an amorphous state, and in which a light is focused onto the recording layer to change the phase thereof from crystalline to amorphous, thereby writing information signal onto the recording layer, the method comprising, according to the present invention, the steps of:

preparing the recording layer
using a GeSbTe alloy as the phase-change material; and
forming the recording layer by sputtering in an Ar gas atmosphere containing at least either $N_2$ or $O_2$ gas.

In the above-mentioned optical recording medium manufacturing method according to the present invention, since the recording layer forming conditions are defined, the GeSbTe alloy forming the recording layer is suitably nitrided and oxidized to optimize the physical properties of the recording layer for the read/write and further improve the durability against repeated recording. The method according to the present invention permits to manufacture an optical recording medium adapted to minimize the regional deterioration of a signal read out after being recorded repeatedly a few times to tens of times and to provide a quality signal read out even after being recorded repeatedly more than tens of thousands of times.

More particularly, on the assumption that the recording layer of the optical recording medium manufactured by the method according to the present invention is formed at a speed X (nm/s) in an Ar gas atmosphere containing $N_2$ and $O_2$ gases of which the mixing ratio $(N_2+O_2)/Ar$ is $Y(\%)$ and the mixing ratio $O_2/(N_2+O_2)$ is $Z(\%)$, the parameters X, Y and Z should preferably meet the following relations (1) to (3):

$$Y \geq 2.3X+1.0 \quad (1)$$

$$Y \leq 12.8X+16.7 \quad (2)$$

$$10 \leq Z \leq 60 \quad (3)$$

Further, on the assumption that the recording layer of the optical recording medium manufactured by the method according to the present invention is formed at a speed X (nm/s) in an Ar gas atmosphere containing $O_2$ gas of which the mixing ratio $O_2/Ar$ is $Y(\%)$, the parameters X and Y should preferably meet the following relations (1) and (4):

$$Y \geq 2.3X+1.0 \quad (1)$$

$$Y \leq 5.5X+2.7 \quad (4)$$

Furthermore, on the assumption that the recording layer of the optical recording medium manufactured by the method according to the present invention is formed at a speed X (nm/s) in an Ar gas atmosphere containing $N_2$ gas of which the mixing ratio $N_2/Ar$ is $Y(\%)$, the parameters X and Y should preferably meet the following relations (2) and (5):

$$Y \leq 12.8X+16.7 \quad (2)$$

$$Y \geq 1.8X+5.0 \quad (5)$$

Other objects, features and advantages of the present invention will become more apparent from the following detailed description of the preferred embodiments taken in conjunction with the accompanying drawings, in which:

DETAILED DESCRIPTION OF THE PREFERRED EMBODIMENTS

First Embodiment

Figure 1:
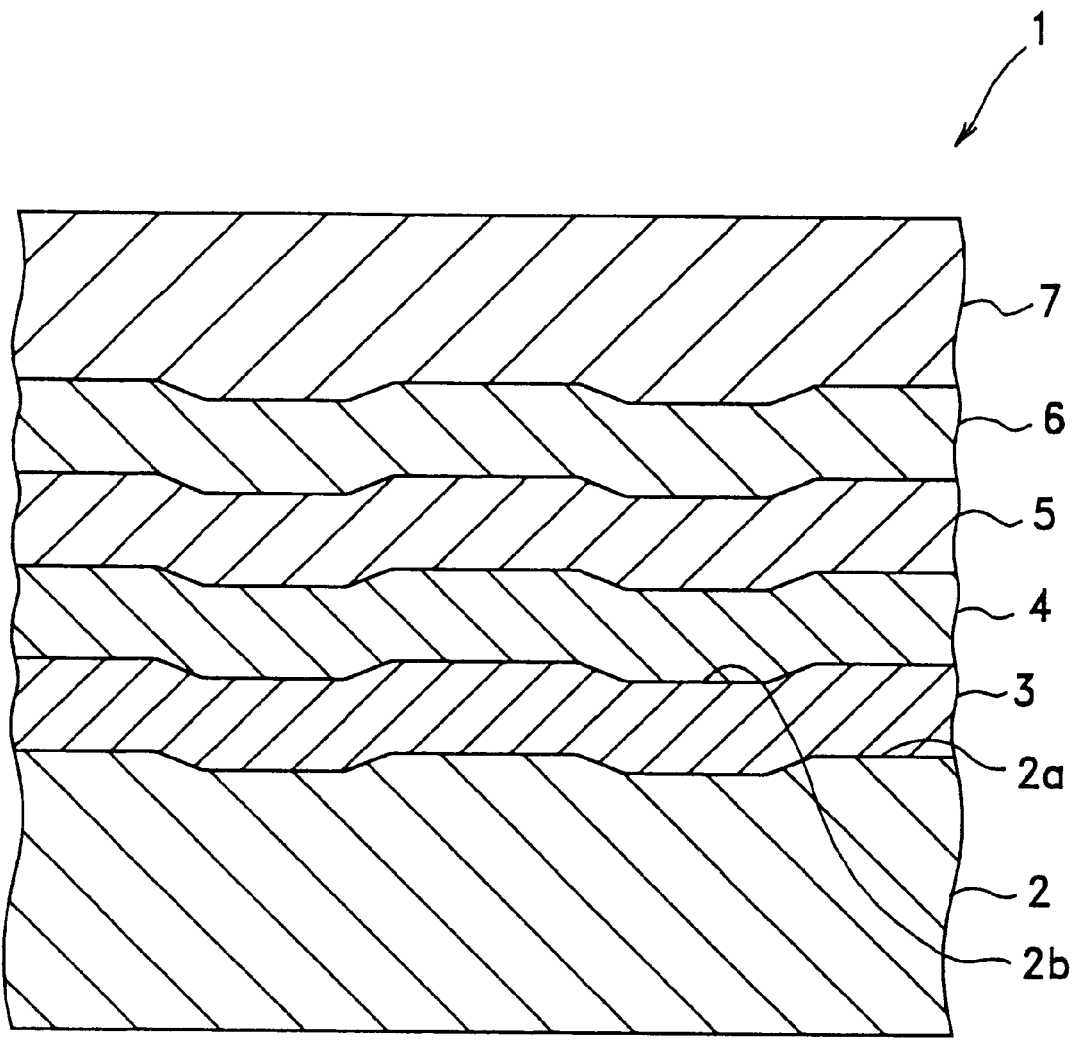
FIG. 1 is an enlarged elevated cross-sectional view, in scale, showing an essential part of an optical recording medium according to the present invention.

Referring now to FIG. 1, there is given a sectional view, enlarged in scale, of an essential part of a phase-change optical disc according to the present invention. The phase-change optical disc is generally indicated with a reference 1.

As shown in FIG. 1, the phase-change optical disc 1 comprises a substrate 2, first dielectric layer 3, recording layer 4, second dielectric layer 5, light-reflective layer 6 and a protective layer 7 formed in this order on the substrate 2.

The substrate 2 has formed on one main surface 2a thereof grooves 2b extending along recording tracks. The substrate 2 is 0.6 mm thick, for example. It is formed from a plastic substrate such as polycarbonate (PC) or polymethyl methacrylate (PMMA), a glass substrate, or the like. The substrate 2 is molded by injection molding or photo polymerization (2P method), for example. Note that for write or read of information signal with respect to the optical disc 1, a light such as laser beam is incident from on the substrate 2.

As mentioned above, the recording layer 4 is formed on the first dielectric layer 3. It is formed from a phase-change material changeable in state from crystalline to amorphous, or vice versa, under the focused spot of a laser beam or the like. Namely, the recording layer 4 is an optical recording layer of which the phase can be changed under the focused spot of laser beam to write, erase or read an information signal.

More particularly, the phase-change material of the recording layer 4 is changed to an amorphous state when heated to over its melting point and then cooled quickly. However, the phase-change material is switched to a crystalline state when heated to a temperature above its melting point and below its crystallization point and then cooled. Therefore, to record an information signal, the recording layer is heated to a temperature over the melting point of the phase-change material and then cooled quickly to form a recording mark in the form of region or area of phase-change material in its an amorphous phase.

The recording layer 4 varies in reflectivity depending upon whether it is in the crystalline or amorphous state. Thus, an information signal is read out by detecting a change of reflectivity of the return light of the laser beam incident upon the recording layer 4.

Specifically, the phase-change material of the recording layer 4 in the present invention is a calcogenide containing a GeSbTe alloy. The recording layer 4 should preferably be 18 to 30 nm thick.

It should be noted that the recording layer 4 should preferably be formed at a speed X (nm/s) in an Ar gas atmosphere containing $N_2$ and $O_2$ gases of which the mixing ratio $(N_2+O_2)/Ar$ between the $N_2$ and $O_2$ gases and the Ar gas is Y(%) and the mixing ratio $O_2/(N_2+O_2)$ of $O_2$ gas with the mixture of $N_2$ and $O_2$ gases is Z(%), the parameters X, Y and Z meeting the following relations (1) to (3):

$$Y \geq 2.3X+1.0 \quad (1)$$

$$Y \leq 12.8X+16.7 \quad (2)$$

$$10 \leq Z \leq 60 \quad (3)$$

Note that the mixing ratio $(N_2+O_2)/Ar$ is a flow ratio between $(N_2+O_2)$ and Ar, in other words, a volume ratio between $O_2$ and $(N_2+O_2)$ in the Ar gas atmosphere.

Furthermore, the recording layer forming speed X should preferably be over 0.1 nm/s and under 5.0 nm/s. Namely, the speed X should preferably meet the following relation (6):

$$0.1 \leq X \leq 5 \quad (6)$$

Recording Layer Forming Atmospheric Conditions and Speed X

The mixing ratio $(N_2+O_2)/Ar$ of Y(%) between the $N_2$ and $O_2$ gases and the Ar gas and the recording layer forming speed X (nm/s) for forming the recording layer 4 in the optical recording medium and in the optical recording medium manufacturing method according to the present invention, are defined by the relations (1) to (3) as in the above for the reasons based on the following experiment results having been conducted on the embodiments of the present invention and comparative examples:

Relation Between Recording Layer Forming Atmospheric Conditions and Read Signal Characteristic First, a phase-change optical disc was made as will be discussed below:

First, a substrate 2 having a diameter of 120 nm and a thickness of 0.6 was made. Then a first dielectric layer 3 of ZnS—$SiO_2$ having a thickness of 120 nm was formed on the substrate 2 by sputtering.

Next, a target of $Ge_2Sb_2Te_5$ was used on the first dielectric layer 3 and a recording layer 4 of GeSbTe having a thickness of 25 nm was formed by sputtering at a speed of 0.42 nm/s in an Ar gas atmosphere in which $N_2$ and $O_2$ gases were mixed.

At this time, in the Ar gas atmosphere having mixed therein the $N_2$ and $O_2$ gases, the mixing ratio $O_2/(N_2+O_2)$ was fixed to 20% while the mixing ratio $(N_2+O_2)/Ar$ was varied within a range of 0 to 20%, thereby making a plurality of phase-change optical discs each having the recording layer formed under different atmospheric conditions.

It should be noted however that the atmospheric condition of which the mixing ratio $(N_2+O_2)/Ar$ is 0% is an Ar gas atmosphere not containing $N_2$ and $O_2$ gases and it is not included in the recording layer forming conditions adopted in the optical recording medium manufacturing method of the present invention.

Next, a second dielectric layer 5 of ZnS—$SiO_2$ having a thickness of 15 nm and a light-reflective layer 6 of Al alloy having a thickness of 150 nm were formed in this order by sputtering on each of the recording layers 4 formed under the different conditions, and then a protective layer 7 was formed on the light-reflective layer 6 by applying an ultraviolet-curable resin, to make a phase-change optical disc 1.

Figure 2:
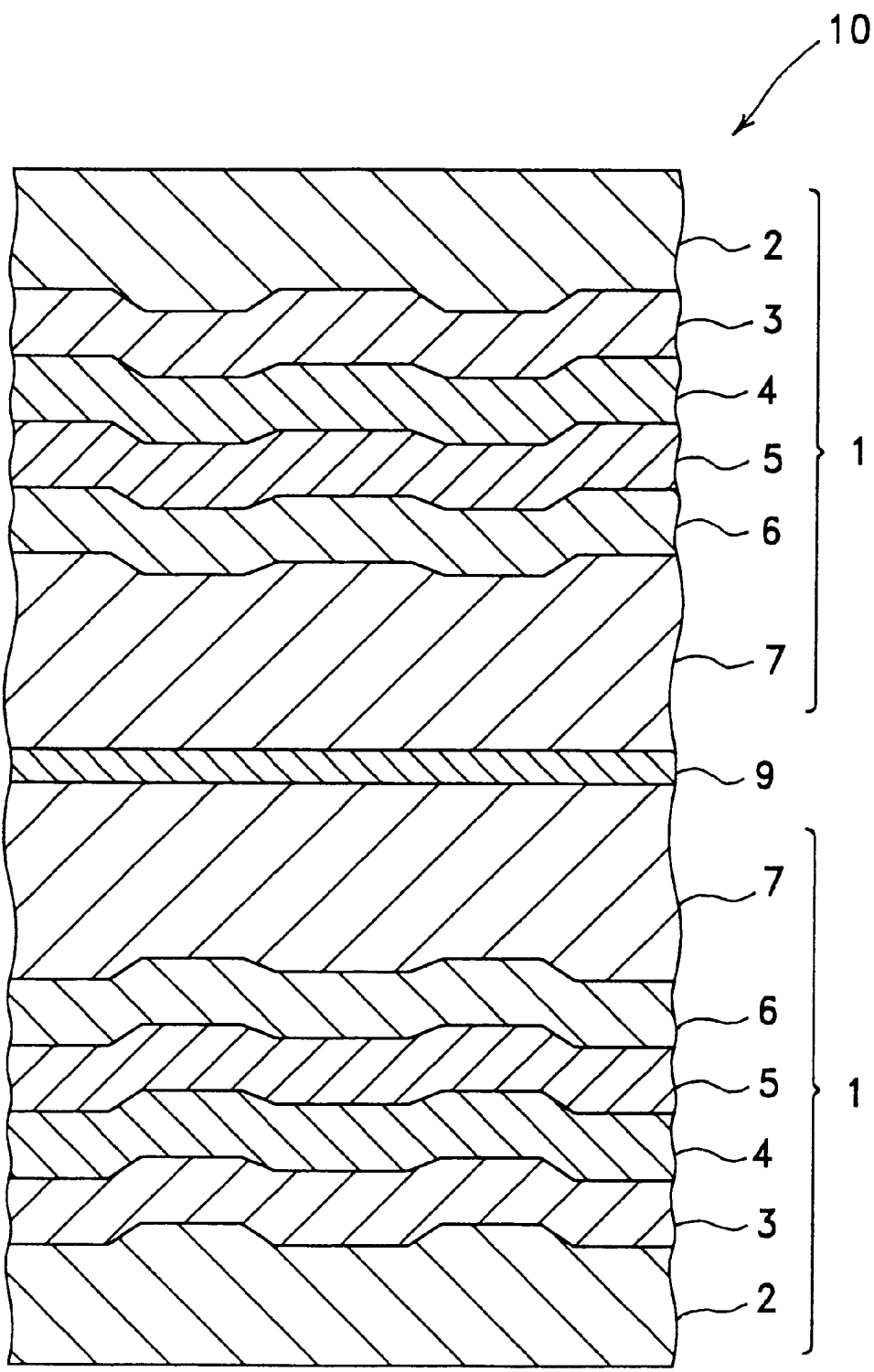
FIG. 2 is an elevated cross-sectional view, enlarged in scale, of another essential part of the optical recording medium of the present invention.

Each type of the phase-change optical discs 1 thus made was duplicated. The two phase-change optical discs 1 of each type thus obtained were bonded to each other with their light-reflective layers 6 facing each other with an adhesive 9 applied between the layers 6. Finally, a double-sided phase-change optical disc 10 of 120 mm in diameter and 1.2 mm in thickness as shown in FIG. 2 was made in which write and record can be done with respect to both sides thereof. Note that this phase-change optical disc 10 has a track pitch of about 0.8 µm and a recording capacity of about 3.0 GB per side.

Each of the plurality of phase-change optical discs made under different recording layer forming conditions were initialized by crystallizing the recording layers 4 under the focused spot of a high-powered laser beam.

Figure 3:
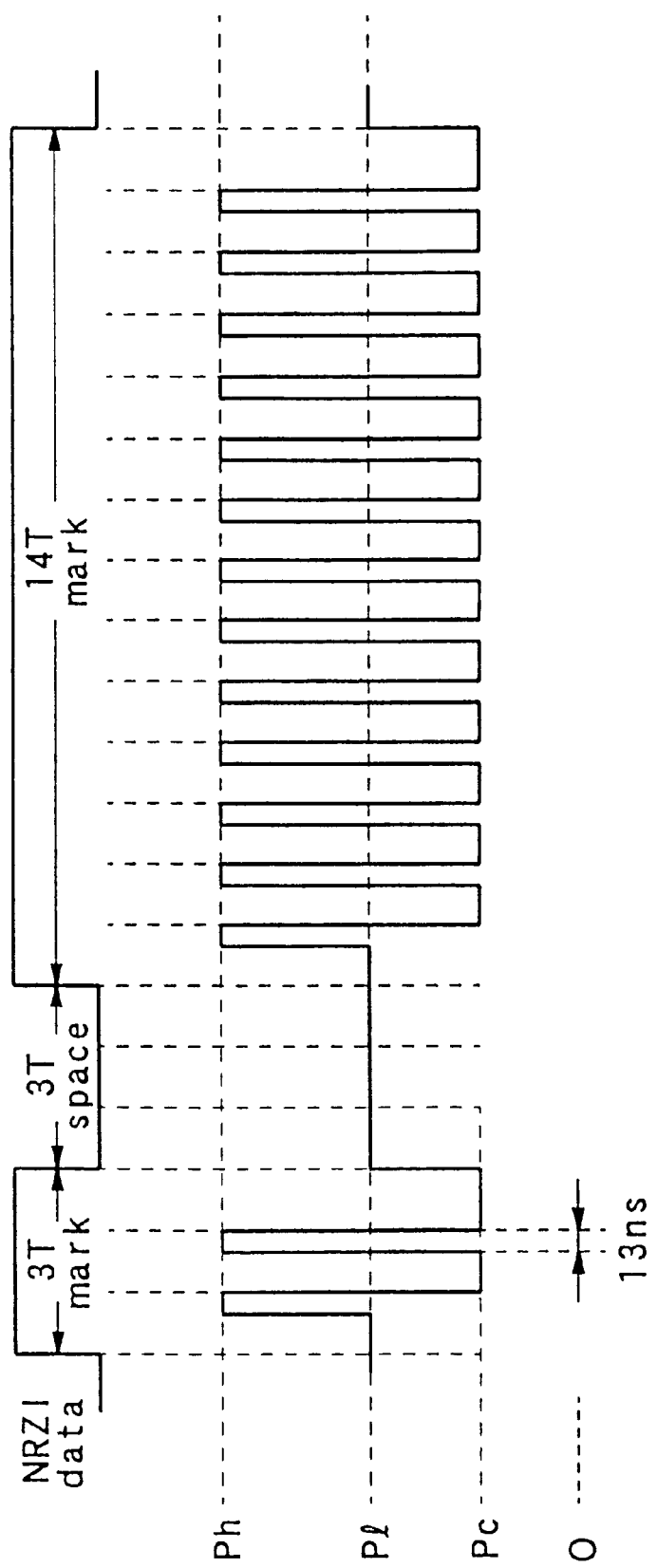
FIG. 3 is a lighting pattern diagram used in the experiment to record information signal.

Then, a lighting pattern as shown in FIG. 3 was used to record a random EFM signal using a channel clock of 27.7 MHZ on each of these initialized phase-change optical discs. In FIG. 3, the recording power is indicated with a reference Ph, erasing power is with a reference P1, and the cooling power is with a reference Pc. In the lighting pattern shown in FIG. 3, one clock is indicated with 1T, and the pulse length of one lighting pulse is with 13 ns.

At this time, a recording/reproducing apparatus, or a disc drive, was used in which the linear velocity was 4.8 m/s, the recording power Ph is 14.5 mW, the erasing power P1 was 5.8 mW, and the cooling power Pc was 1.5 mW. The disc drive is provided with a laser which generates a laser beam of 650 nm in wavelength.

Under these conditions, a signal was recorded repeatedly 2 times to each of the phase-change optical discs.

Then, to evaluate the relation between the mixing ratio between $N_2$ and $O_2$ used in forming the recording layer and the characteristic of read signal, jitter of a signal read from each of the phase-change optical discs after being repeatedly recorded 2 times, was measured.

Figure 4:
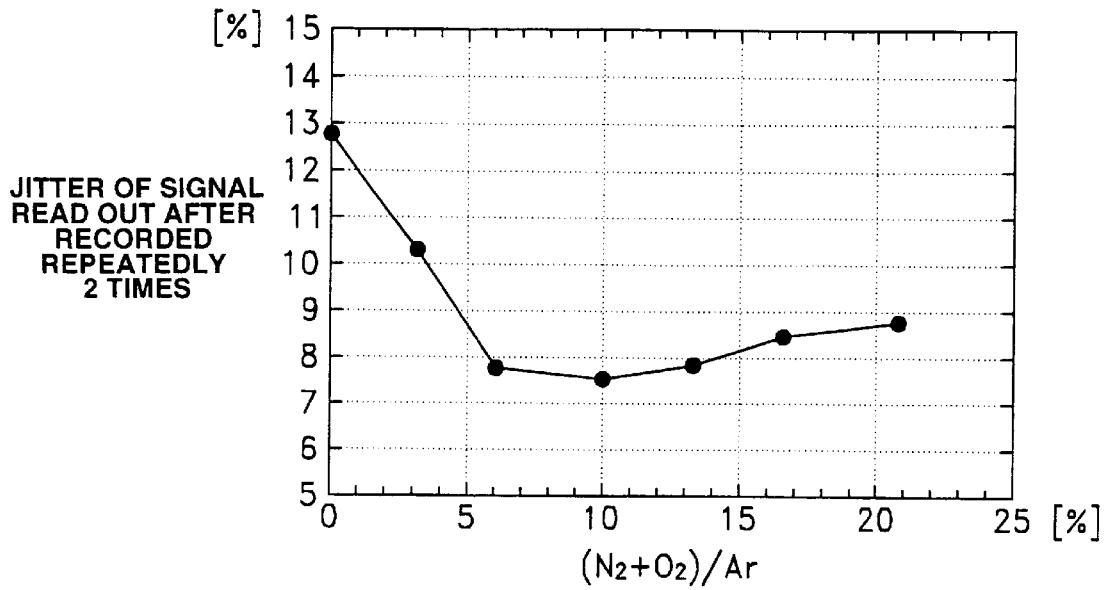
FIG. 4 graphically illustrates the relation between the mixing ratio $(N_2+O_2)/Ar$ in the recording layer forming atmosphere and read signal jitter when the layer forming speed is 0.42 nm/s.

The measurement results are shown in FIG. 4 in which the horizontal axis indicates the mixing ratio $(N_2+O_2)/Ar$ while the vertical axis indicates the jitter of a signal read from the optical disc after being repeatedly recorded 2 times on a same recording track.

For a jitter of a quality signals read out after being repeatedly recorded a small number of times such as 2 times, 10% is taken here as a reference value for an acceptable media.

In the above experiments, the jitter of a signal read out after being repeatedly recorded 2 times, was measured for the following reason. That is, the jitter of a signal read out after being repeatedly recorded 2 times is normally the highest and the read signal jitter tends to be gradually smaller as the repetition of recording is repeated up to 10,000 times. That is why the jitter of a signal read out after recorded repeatedly 2 times was measured.

As seen from the experiment results shown in FIG. 4, the jitter is the highest as 12.7% when the mixing ratio $(N_2+O_2)/Ar$ is 0%, namely, when no $N_2$ and $O_2$ gases are contained in the Ar gas. It decreases as the content of $N_2$ and $O_2$ increases. The jitter is the lowest when the mixing ratio $(N_2+O_2)/Ar$ is 6 to 10%. As the the mixing ratio $(N_2+O_2)/Ar$ is further increased, the jitter is also increased gradually.

Therefore, the experiment results showed as seen from FIG. 4 that for the jitter of a signal read out after being repeatedly recorded to be under 10% at which a signal quality can be assured, the recording layer should preferably be formed in an Ar gas atmosphere in which the mixing ratio $(N_2+O_2)/Ar$ is over 6%.

Relation Between Recording Layer Forming Atmospheric Conditions and Groove Reflectivity Next, for evaluation of the relation between atmospheric conditions under which the recording layer is formed and the groove reflectivity of each of the discs, the recording layer was formed under varied atmospheric conditions as in the experiment shown in FIG. 4 and each phase-change optical disc thus made was initialized. The groove reflectivity of each phase-change optical disc was measured.

Figure 5:
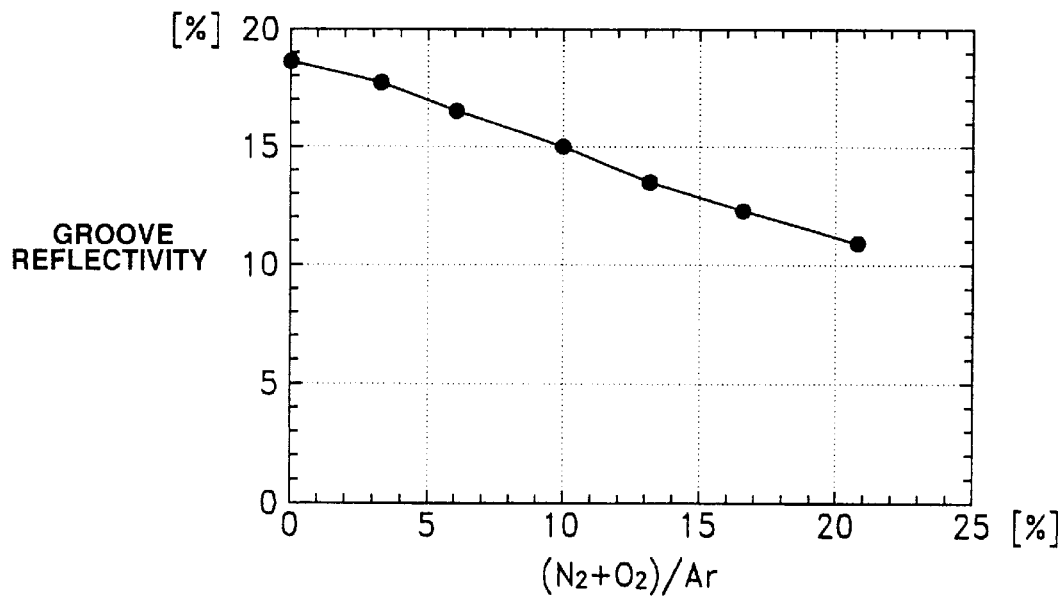
FIG. 5 graphically illustrates the relation between the mixing ratio $(N_2+O_2)/Ar$ in the recording layer forming atmosphere and groove reflectivity when the recording layer forming speed is 0.42 nm/s.

The experiment results are shown in FIG. 5 of which the horizontal axis indicates the mixing ratio $(N_2+O_2)/Ar$ and the vertical axis indicates the groove reflectivity.

As seen from the experiment results in FIG. 5, the groove reflectivity decreases in a substantially linear manner as the mixing ratio $(N_2+O_2)/Ar$ is increased. When the mixing ratio $(N_2+O_2)/Ar$ is over 21.0%, the groove reflectivity is under 11%, so that signal modulation is not satisfactory.

Therefore, it was shown from the experiment results that for a satisfactory signal modulation, the mixing ratio $(N_2+O_2)/Ar$ should be under 21.0% in the atmosphere in which the recording layer is formed.

Atmospheric Conditions Meeting Both Read Signal Characteristic and Groove Reflectivity Requirements As having been described in the above, the experiment results shown in FIGS. 4 and 5 reveals that in the optical recording medium and manufacturing method for the optical recording medium according to the present invention, when the recording layer forming speed is 0.42 nm/s and the mixing ratio $O_2/(N_2+O_2)$ is 20%, the recording layer should be formed in an Ar gas atmosphere of which the mixing ratio $(N_2+O_2)/Ar$ is 6 to 21.0% in order to satisfy both the requirements for the read signal jitter and groove reflectivity.

FIGS. 4 and 5 show the results of the experiments conducted on the optical discs having their respective recording layers formed at the speed of 0.42 nm/s. Therefore, to obtain similar read signal characteristics to those shown in FIGS. 4 and 5 when the recording layer forming speed varied, it is necessary to vary the mixing ratio $(N_2+O_2)/Ar$ as well.

Relation Among Atmospheric Conditions with the Recording Layer Forming Speed Changed, Read Signal Characteristic and Groove Reflectivity Next, a study was made on the mixing ratio $(N_2+O_2)/Ar$ meeting both the requirements for read signal jitter and groove reflectivity when the recording layer forming speed was varied.

Figure 6:
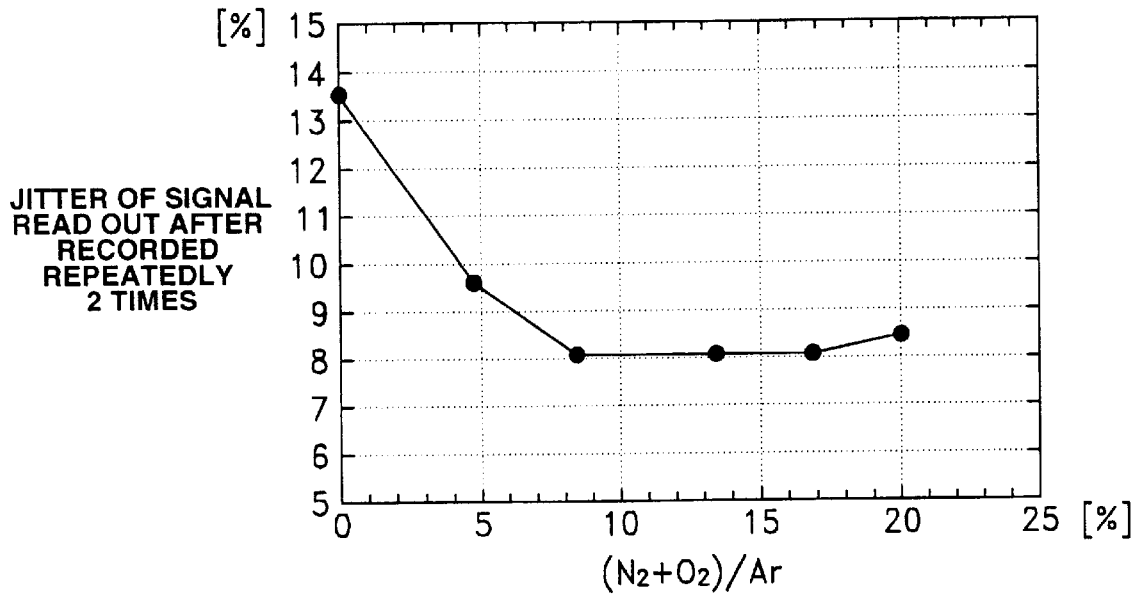
FIG. 6 graphically illustrates the relation between the mixing ratio $(N_2+O_2)/Ar$ in the recording layer forming atmosphere and read signal jitter when the recording layer forming speed is 0.1 nm/s.

First, an optical disc was made under similar conditions to those in the experiment of which the results are shown in FIG. 4 except that the applied voltage to the target of $Ge_2Sb_2Te_5$ was varied, recording layer forming speed was 0.1 nm/s and the mixing ratio $(N_2+O_2)/Ar$ was varied in a range of 0 to 20%. As in the experiment of which the results are shown n FIG. 4, the jitter of a signal read out after being recorded repeatedly 2 times to the optical disc was measured. The measurement results are shown in FIG. 6. In this experiment, the mixing ratio $O_2/(N_2+O_2)$ was fixed to 20%.

Figure 7:
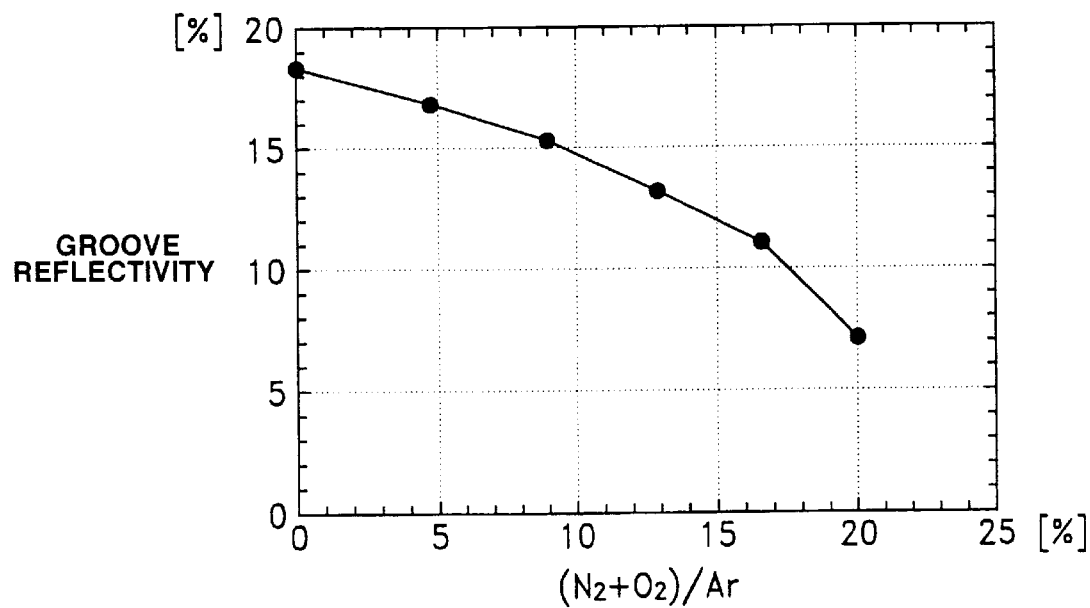
FIG. 7 graphically illustrates the relation between the mixing ratio $(N_2+O_2)/Ar$ in the recording layer forming atmosphere and groove reflectivity when the recording layer forming speed is 0.1 nm/s.

Also, the optical disc thus made was initialized under the recording layer forming atmospheric conditions varied as in the above with the recording layer forming speed of 0.1 nm/s. The groove reflectivity of the optical disc after thus initialized was measured in the same manner as in the experiment of which the results are shown in FIG. 5. The measurement results are shown in FIG. 7.

Similarly, an optical disc was made under similar conditions to those in the experiment of which the results are shown in FIG. 4 except that the recording layer forming speed was 1.6 nm/s and the mixing ratio $(N_2+O_2)/Ar$ was varied in a range of 0 to 45%. As in the experiments of which the results are shown in FIGS. 4 and 5, the jitter of a signal read out after being recorded repeatedly 2 times to the optical disc and groove reflectivity after the optical disc was initialized, were measured. The measurement results are shown in FIGS. 8 and 9.

Similarly, an optical disc was made under similar conditions to those in the experiment of which the results are shown in FIG. 4 except that the recording layer forming speed was 5.0 nm/s and the mixing ratio $(N_2+O_2)/Ar$ was varied in a range of 0 to 90%. As in the experiments of which the results are shown in FIGS. 4 and 5, the jitter of a signal read out after being recorded repeatedly 2 times to the optical disc and groove reflectivity after the optical disc was initialized, were measured. The measurement results are shown in FIGS. 10 and 11.

Figure 8:
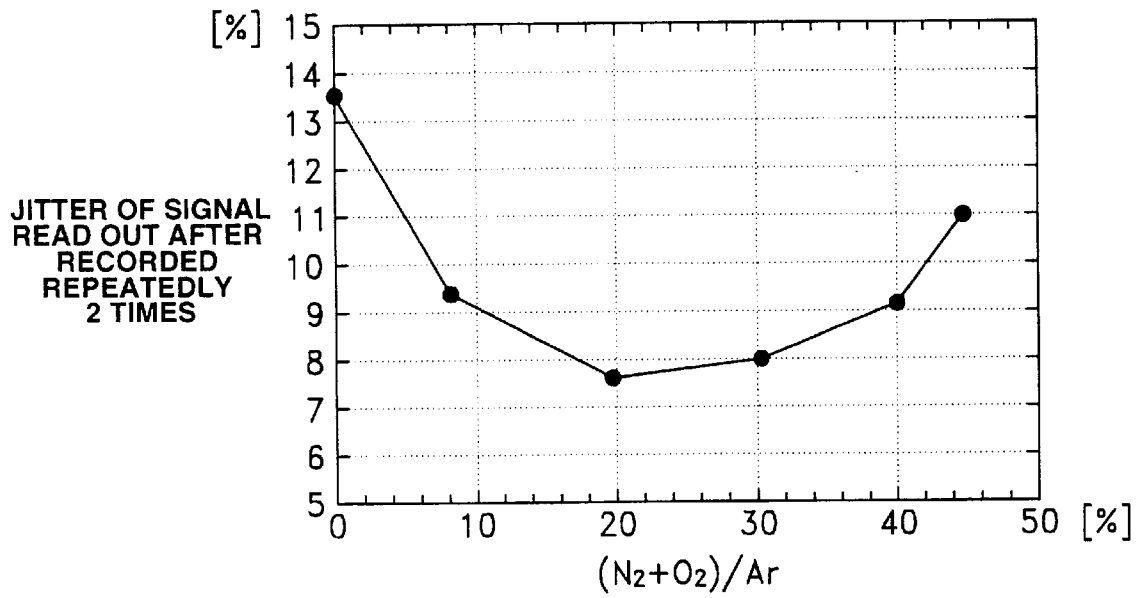
FIG. 8 graphically illustrates the relation between the mixing ratio $(N_2+O_2)/Ar$ in the recording layer forming atmosphere and read signal jitter when the recording layer forming speed is 1.6 nm/s.
Figure 10:
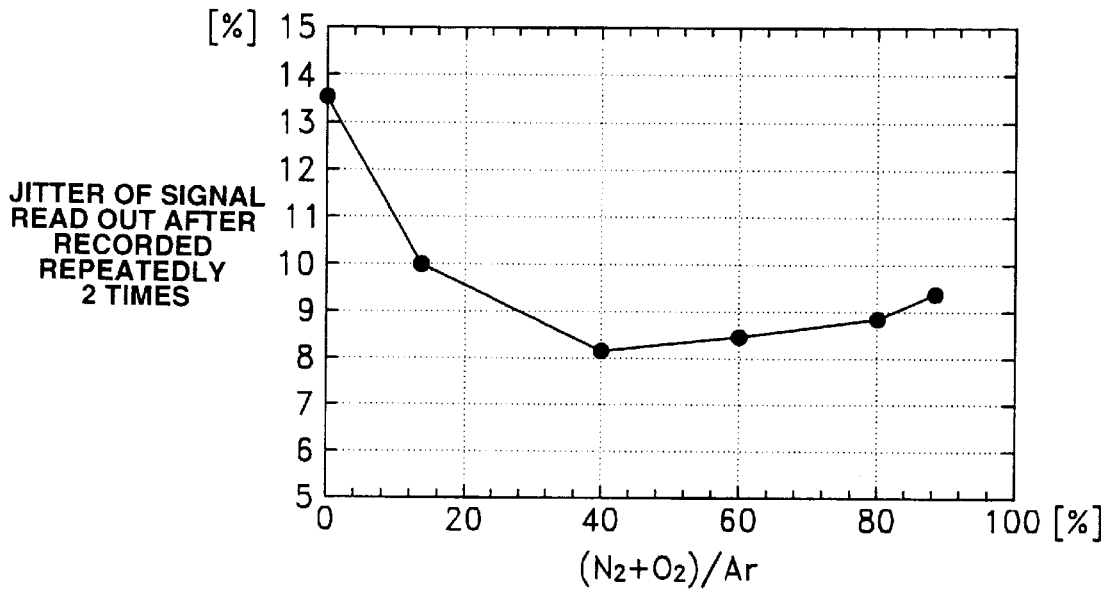
FIG. 10 graphically illustrates the relation between the mixing ratio $(N_2+O_2)/Ar$ in the recording layer forming atmosphere and read signal jitter when the recording layer forming speed is 5.0 nm/s.

It was revealed from the experiment results in FIGS. 6, 8 and 10 that in the optical discs having their respective recording layers formed at the speeds of 0.1 nm/s, 1.6 nm/s and 5.0 nm/s, respectively, the mixing ratios $(N_2+O_2)/Ar$ resulting in a read signal jitter of under 10% are over 5, 8 and 14%, respectively.

Figure 9:
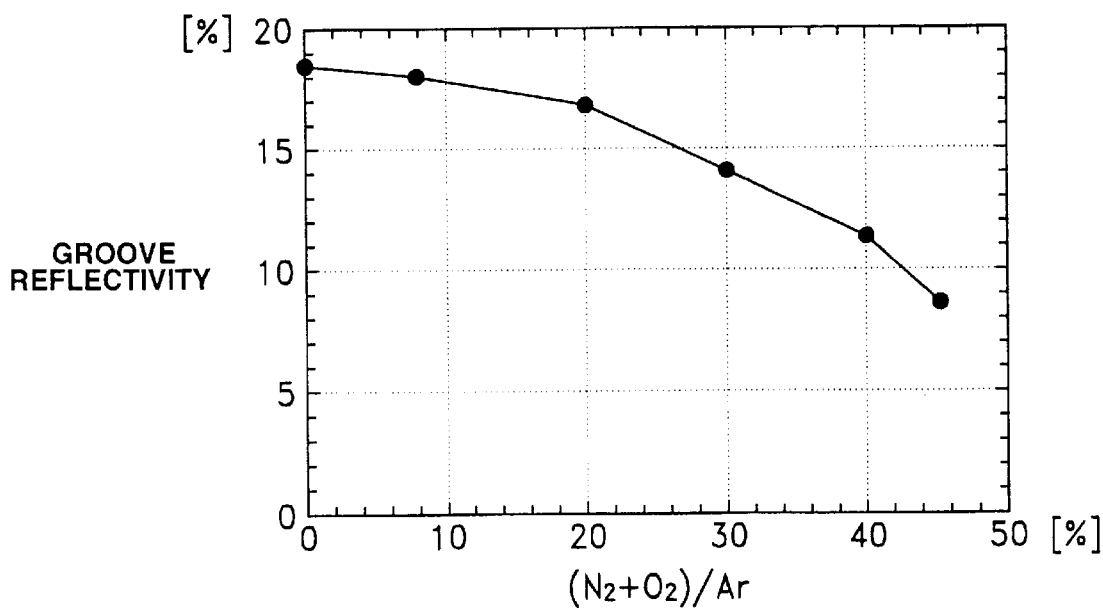
FIG. 9 graphically illustrates the relation between the mixing ratio $(N_2+O_2)/Ar$ in the recording layer forming atmosphere and groove reflectivity when the recording layer forming speed is 1.6 nm/s.
Figure 11:
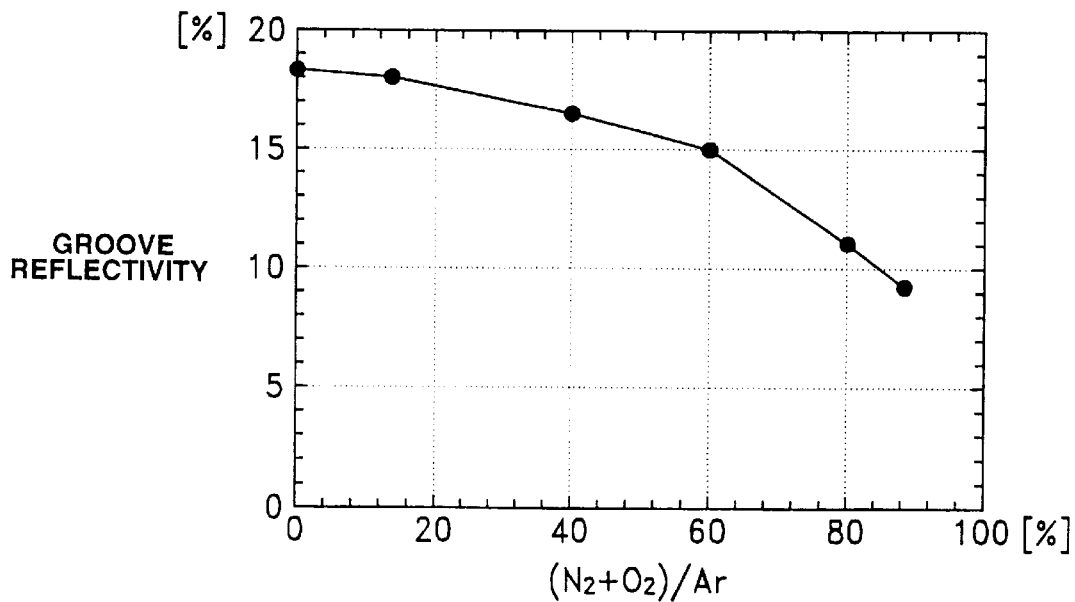
FIG. 11 graphically illustrates the relation between the mixing ratio $(N_2+O_2)/Ar$ in the recording layer forming atmosphere and groove reflectivity when the recording layer forming speed is 5.0 nm/s.

Also, as seen from the experiment results in FIGS. 7, 9 and 11, in the optical discs having their respective recording layers formed at the speeds of 0.1 nm/s, 1.6 nm/s and 5.0 nm/s, respectively, the mixing ratios $(N_2+O_2)/Ar$ resulting in a read signal jitter of over 11% are under 17, 40 and 80%, respectively.

Recording Layer Forming Conditions Meeting Both Read Signal Characteristic and Groove Reflectivity Requirements As mentioned above, the experiment results shown in FIGS. 4, 6, 8 and 10 reveal that in the optical discs having their respective recording layers formed at the speeds of 0.42 nm/s, 0.1 nm/s, 1.6 nm/s and 5.0 nm/s, respectively, the mixing ratios $(N_2+O_2)/Ar$ resulting in a read signal jitter of under 10% are 6, 5, 8 and 14%, respectively. The results are graphically traced as in FIG. 12 with the recording layer forming speed indicated along the horizontal axis and the mixing ratio $(N_2+O_2)/Ar$ indicated along the vertical axis, thus delineating a straight line α.

Figure 12:
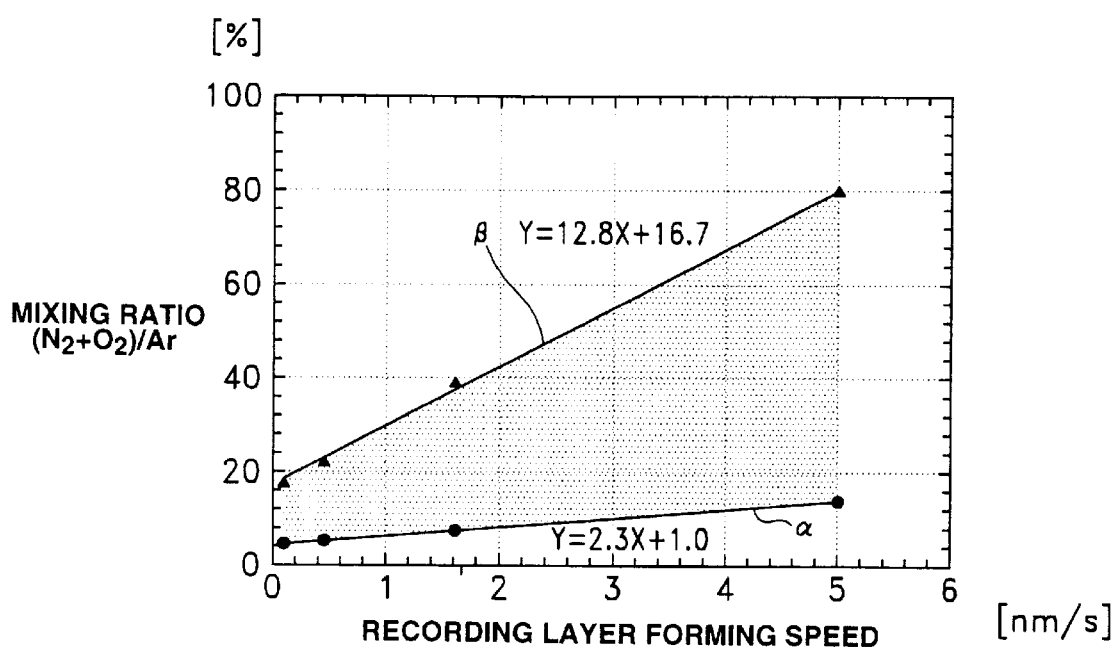
FIG. 12 graphically illustrates the relation between the recording layer forming speed and mixing ratio $(N_2+O_2)/Ar$ in the recording layer forming atmosphere.

In FIG. 12, the horizontal axis indicates the recording layer forming speed X (nm/s) while the vertical axis indicates the mixing ratios $(N_2+O_2)/Ar$ as Y(%). The line a is expressed by Y=2.3X+1.0. In the area under the line α, the read signal jitter is over 10% and thus no quality read signal can be provided.

On the other hand, as described in the foregoing, the experiment results shown in FIGS. 5, 7, 9 and 11 reveal that in the optical discs having their respective recording layers formed at the speeds of 0.42 nm/s, 0.1 nm/s, 1.6 nm/s and 5.0 nm/s, respectively, the mixing ratios $(N_2+O_2)/Ar$ result in a read signal jitter of over 11% are 21, 17, 40 and 80%, respectively. The results are graphically traced as in FIG. 12 with the recording layer forming speed indicated along the horizontal axis and the mixing ratio $(N_2+O_2)/Ar$ indicated along the vertical axis, thus delineating a straight line β.

The line β is expressed by Y=12.8X+16.7. In the area above the line β, the groove reflectivity is under 11% and thus no satisfactory signal modulation is possible.

If the recording layer forming speed X is higher than 5.0 nm/s, it is too high to assure a recording layer forming time long enough to adjust the recording layer thickness. If the speed X is slower than 0.1 nm/s, the recording layer forming takes a longer time, which is an inconvenience for the practice of manufacture. Therefore, the recording layer forming speed should preferably be $0.1 \leq X \leq 5.0$ (relation (6)).

As evident from the foregoing description, the phase-change optical disc 1 according to the present invention should preferably have a recording layer of GeSbTe alloy formed by sputtering at a speed X (nm/s) in an Ar gas atmosphere containing $N_2$ and $O_2$ gases of which the mixing ratio $(N_2+O_2)/Ar$ among the $N_2$, $O_2$ and Ar gases is Y(%) and the ratio $O_2/(N_2+O_2)$ of $O_2$ gas with the mixture of $N_2$ and $O_2$ gases is Z(%), the parameters X, Y and Z meeting the following relations (1) and (2):

$$Y \geq 2.3X+1.0 \tag{1}$$

$$Y \leq 12.8X+16.7 \tag{2}$$

At this time, the recording layer 4 should preferably be formed at a speed X of $0.1 \leq X \leq 5.0$ as previously mentioned for the phase-change optical disc 1 according to the present invention.

Appropriate Mixing Ratio $O_2/(N_2+O_2)$ for Forming the Recording Layer

Next, the optimum mixing ratio $O_2/(N_2+O_2)$ will be considered.

As one parameter included in the atmospheric conditions under which the recording layer is formed, an appropriate mixing ratio $O_2/(N_2+O_2)$ was studied from the standpoint of a read signal characteristic and a power level of a laser beam (will be referred to as "recording power margin" hereinafter) used for signal read-out, as will be discussed below. The reason why the mixing ratio $O_2/(N_2+O_2)$ as Z(%) was set to $10 \leq Z \leq 60$ (relation (3)) for the present invention is based on the results of the experiments conducted as will be described below.

Relation Between Read Signal Characteristic and Mixing Ratio $O_2/(N_2+O_2)$

First, a double-sided optical disc was made in a similar manner to the experiment of which the results are shown in FIG. 4, except that the recording layer was formed from a $Ge_2Sb_2Te_5$ alloy by sputtering at a speed of 0.42 nm/s in an Ar gas atmosphere of which the mixing ratio $(N_2+O_2)/Ar$ was 10% with the mixing ratio $O_2/(N_2+O_2)$ varied in a range of 0 to 100%.

Figure 13:
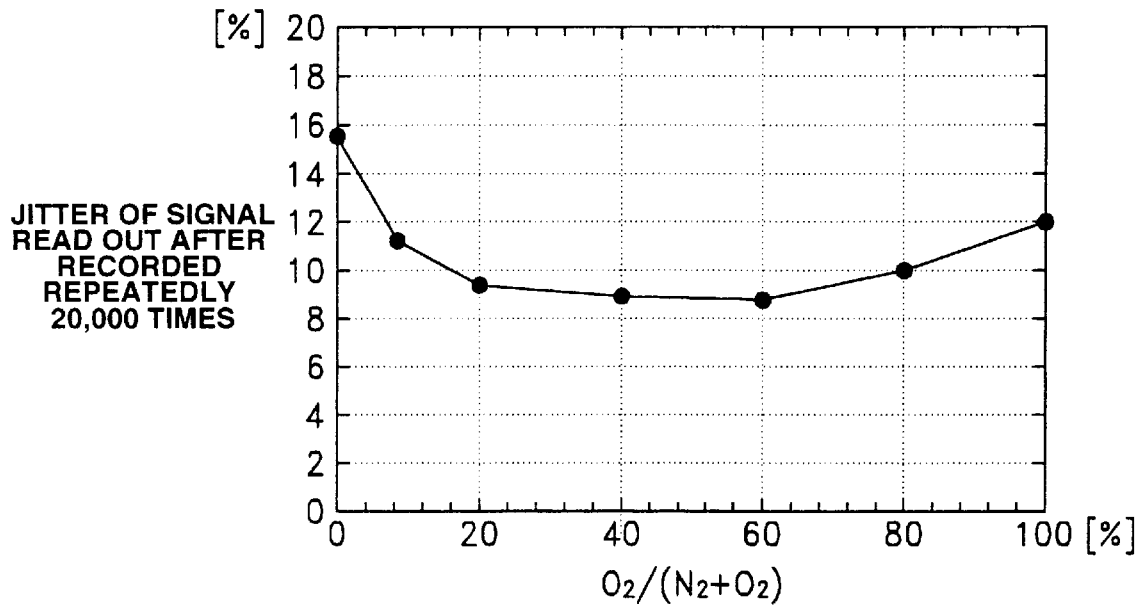
FIG. 13 graphically illustrates the relation between the mixing ratio $O_2/(N_2+O_2)$ in the recording layer forming atmosphere and read signal jitter.

The optical disc thus made was initialized, and a signal was recorded repeatedly 20,000 times to the optical disc. The jitter of the signal read out after being recorded repeatedly 20,000 times using a lighting pattern as shown in FIG. 3, was measured. The measurement results are shown in FIG. 13 of the horizontal axis indicates the mixing ratio $O_2/(N_2+O_2)$ and the vertical axis indicates the measured jitter of the signal read out after being recorded repeatedly 20,000 times. The "0%" on the horizontal axis of FIG. 13 indicates that the recording layer forming atmosphere contains no $O_2$ gas.

For a jitter of a quality signal read out after recorded repeatedly a large number of times such as 20,000 times, 12.5% is taken here as a reference value for an acceptable media.

As seen from the measurement results shown in FIG. 13, as the mixing ratio $O_2/(N_2+O_2)$ increases, the read signal jitter decreases gradually. When the mixing ratio $O_2/(N_2+O_2)$ exceeds 10%, the read signal jitter is under 12.5%, so that a satisfactorily good read signal can be provided even after the signal has been recorded repeatedly a large number of times.

Relation Between Recording Power Margin and Mixing Ratio $O_2/(N_2+O_2)$

First, an optical disc was made as in the experiment of which the results are shown in FIG. 13, and then left for 100 hours in a constant-temperature bath at a temperature of 90° C. for the purpose of an accelerated test.

Figure 14:
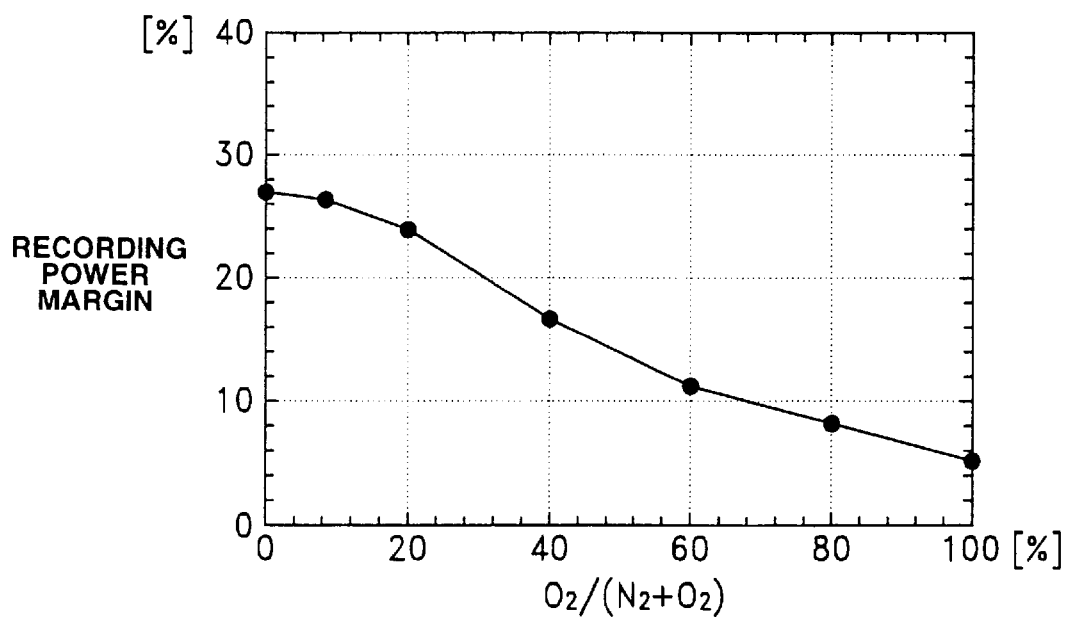
FIG. 14 graphically illustrates the relation between mixing ratio $O_2/(N_2+O_2)$ in the recording layer forming atmosphere and recording power margin.

Thereafter, a signal was recorded along a same track of the optical disc repeatedly 2 times, and a recording power margin for the recording was determined The measurement results are shown in FIG. 14. For a jitter of a quality signal read out after being recorded repeatedly a small number of times such as 2 times, 10% is taken here as a reference value for an acceptable media.

The recording power margin (Pw) is defined as follows taking the read signal jitter of 10% as a threshold level. A minimum value and maximum value of a recording power with which the jitter of a signal read out after being recorded repeatedly 2 times is 10% are assumed here as $P_{min}$ and $P_{max}$, respectively. The recording power margin is defined to be a result of a division of a difference ($P_{max}-P_{min}$) between the maximum and minimum values by a mean value ($P_{max}+P_{min}$)/2, that is, a value shown by the following relation (7) below:

$$Pw=(P_{max}-P_{min})/((P_{max}+P_{min})/2) \quad (7)$$

As apparent from the results shown in FIG. 14, as the ratio of $O_2$ increases, the recording power margin decreases, and as the mixing ratio $O_2/(N_2+O_2)$ exceeds 60%, the recording power margin is under 10%, so that it may be considered that an optical disc produced with a variation of the recording laser power and a change of the atmospheric conditions will be a one to which no satisfactory recording can be done.
Appropriate Mixing Ratio $O_2/(N_2+O_2)$ for Good Read Signal Characteristic and Recording Power Margin The results shown in FIGS. 13 and 14 reveal that for the jitter of a signal read out after being recorded repeatedly 20,000 times to be an acceptable signal detection level and to assure a minimum necessary recording power margin for a satisfactory recording even with a variation of the recording laser power, the mixing ratio $O_2/(N_2+O_2)$ should preferably be over 10% and under 60%.

As having been described in the foregoing, the optical recording medium according to the present invention has the recording layer 4 made of a phase-change material such as a GeSbTe alloy, the recording layer 4 being formed by sputtering in the Ar gas atmosphere containing $N_2$ and $O_2$ gases.

Furthermore, as evident from the results shown in FIGS. 4 to 14, the recording layer 4 in the optical recording medium according to the present invention should preferably be formed at a speed X (nm/s) in an Ar gas atmosphere containing $N_2$ and $O_2$ gases of which the mixing ratio $(N_2+O_2)/Ar$ is Y(%) and the mixing ratio $O_2/(N_2+O_2)$ is Z(%), the parameters X, Y and Z meeting the following relations (1) to (3):

$$Y \geq 2.3X+1.0 \quad (1)$$

$$Y \leq 12.8X+16.7 \quad (2)$$

$$10 \leq Z \leq 60 \quad (3)$$

Figure 15:
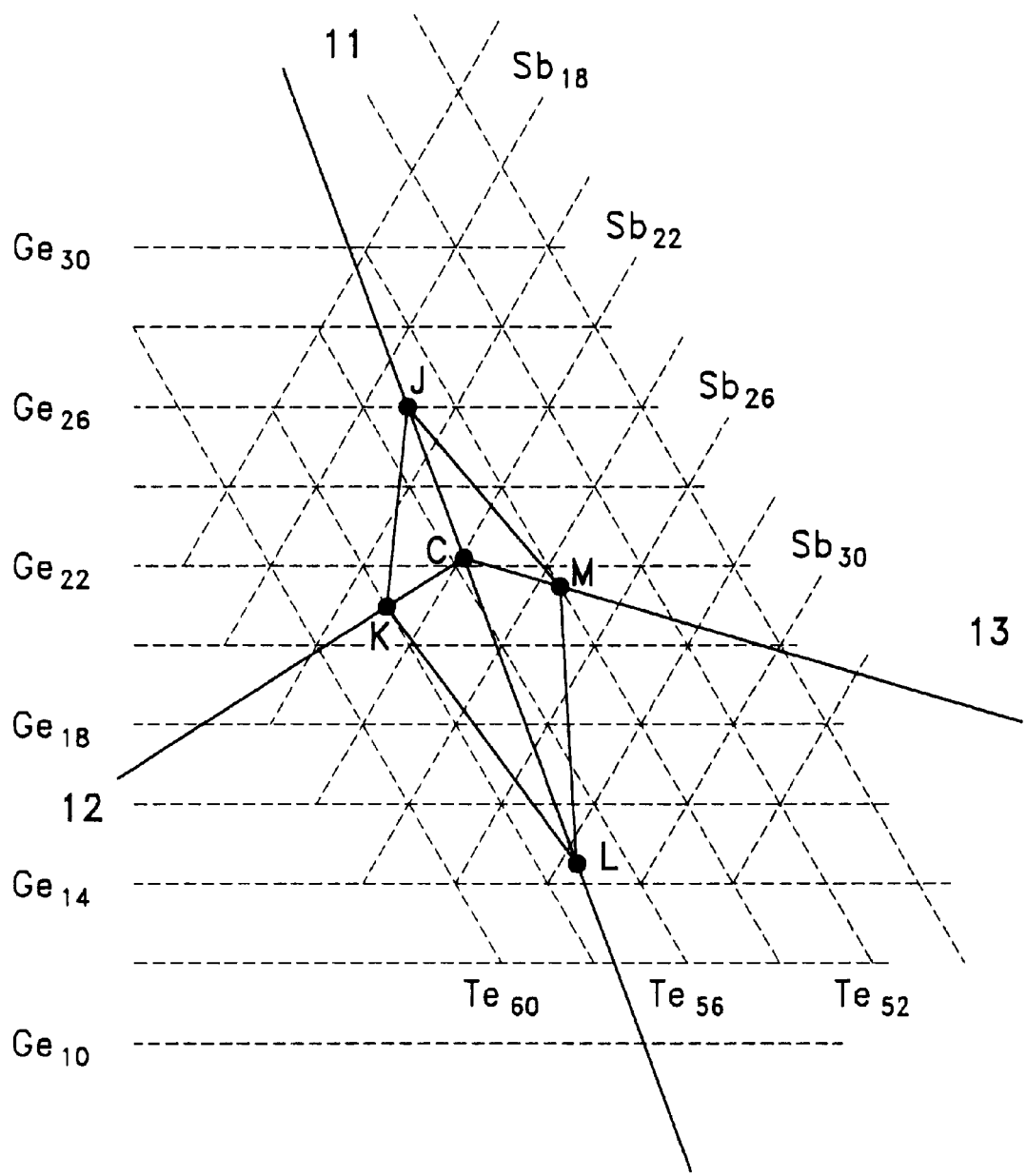
FIG. 15 shows a composition of the material for the recording layer of the optical recording disc of the present invention.

Thus, in the optical recording medium according to the present invention, since the forming conditions for the recording layer 4 are defined, the GeSbTe alloy forming the recording layer 4 is suitably nitrided and oxidized to optimize the physical properties of the recording layer 4 for the read/write and further improve the durability against repeated recording. Thereby the optical recording medium of the present invention is adapted to minimize the regional deterioration, such an increased jitter, of a signal read out after being recorded repeatedly a few times to tens of times and to provide a quality signal read out even after being recorded repeatedly more than tens of thousands of times. As a result, the optical recording medium of the present invention always keeps a stable and good write/read characteristic even after repetitions of signal recording.
Composition of Phase-Change Material for the Recording Layer FIG. 15 is a ternary composition diagram showing a composition of the material for the recording layer 4 for use in the present invention. In the ternary composition diagram (of the three elements Ge, Sb and Te), the GeSbTe alloy is a composition falling in an area defined by four points including J (26.0, 19.2, 54.8), K (21.0, 21.0, 58.0), L (14.3, 28.6, 57.1) and M (21.6, 24.4, 54.0).

As mentioned in the foregoing, the reason why the Ge—Sb—Te composition of the recording layer 4 is thus defined is based on the experiment results which will be described in detail below:
Composition on Line Connecting $Ge_{50}Te_{50}$ and $Sb_{40}Te_{60}$ in Ternary Composition Diagram of Three Elements Ge, Sb and Te First, a first dielectric layer 3 of ZnS—$SiO_2$ having a thickness of 120 nm was formed on a substrate 2 by sputtering.

Next, a recording layer 4 of GeSbTe having a thickness of 25 nm was formed on the first dielectric layer 3 by sputtering at a speed of 0.42 nm/s in an Ar gas atmosphere of which the mixing ratio $(N_2+O_2)/Ar$ was 10% and the mixing ratio $O_2/(N_2+O_2)$ was 20%.

At this time, the recording layer 4 was formed by sputtering using targets of $Ge_2Sb_2Te_5$, target of Ge, target of Sb and a target of Te.

Figure 16:
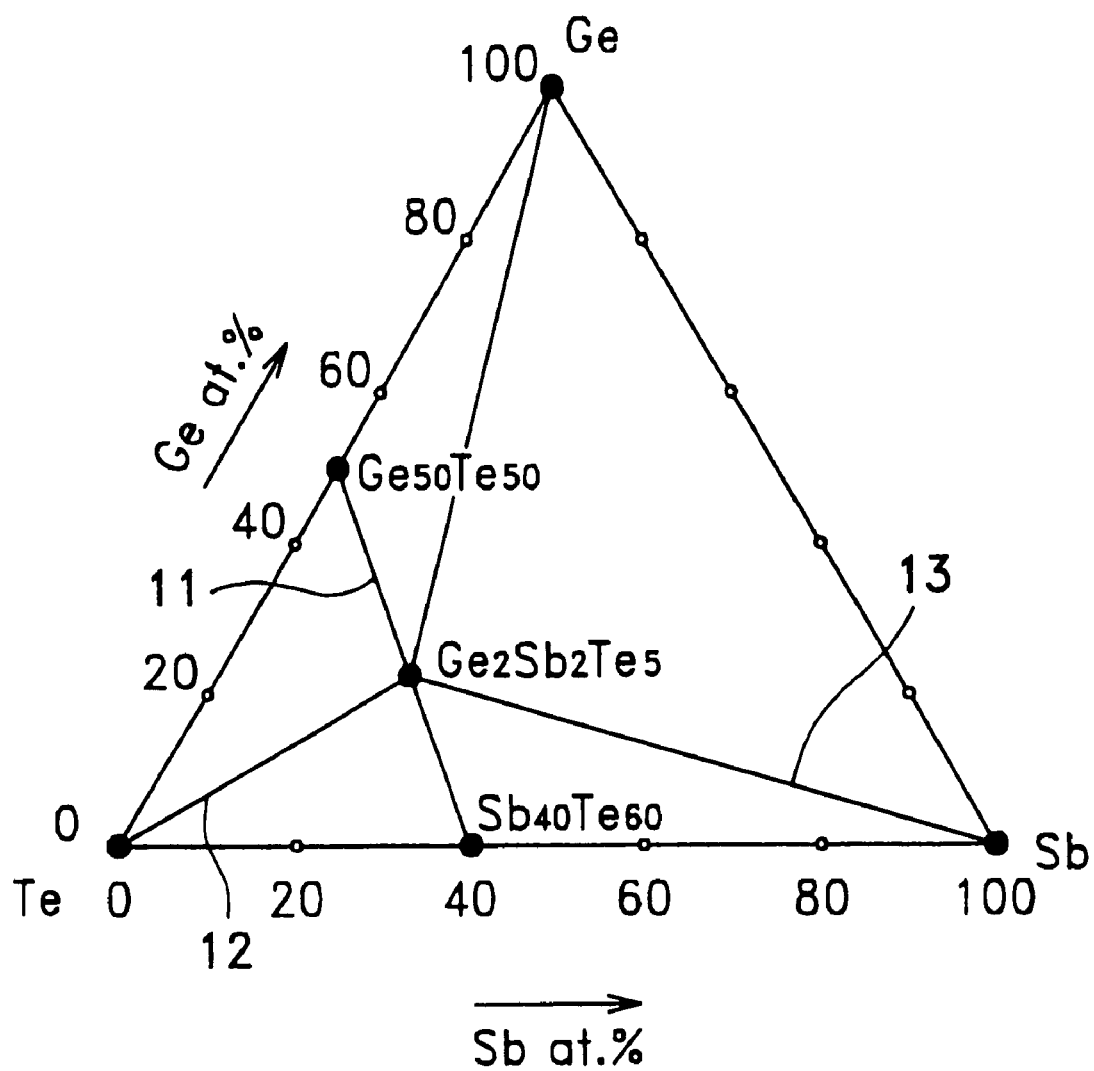
FIG. 16 is a ternary composition diagram of the GeSbTe alloy as the material for the recording layer of the optical recording disc according to the present invention.

First, consideration was made of a phase-change optical disc having a recording layer made of a composition on a straight line 11 connecting the points $Ge_{50}Te_{50}$ and $Sb_{40}Te_{60}$ about the point C (2, 2, 5) as shown in FIG. 16 being also a ternary composition diagram of the Ge, Sb and Te elements. More specifically, the $Ge_2Sb_2Te_5$ target was co-sputtered while the ratio between the forming speeds for the Ge and Te targets was being kept at 1, to form a recording layer 4 from a composition between points $Ge_{50}Te_{50}$ and $Ge_2Sb_2Te_5$ as in FIG. 16.

Then, a second dielectric layer 5 of ZnS—$SiO_2$ having a thickness of 15 nm and a light-reflective layer 6 of Al alloy having a thickness of 150 nm were formed in this order by sputtering onto the recording layer 4, and thereafter, an ultraviolet resin or similar was applied to the light-reflective layer 6 to form a protective layer 7, thereby providing a phase-change optical disc 1.

Finally, two pieces of these phase-change optical discs 1 were produced. The two phase-change optical discs 1 thus obtained were bonded to each other with their light-reflective layers 6 facing each other with an adhesive 9 applied between the layers 6, to provide a double-sided phase-change optical disc of 120 mm in diameter and 1.2 mm in thickness.

Similarly, a phase-change optical disc was made of which only the recording layer 4 was made of a different material from the above-mentioned. More specifically, the $Ge_2Sb_2Te_5$, Sb and Te targets were co-sputtered while the forming speeds for the Sb and Te targets were kept at 0.67 nm/s to form a recording layer 4 made of a composition between points $Sb_{40}Te_{60}$ and $Ge_2Sb_2Te_5$ as in FIG. 16.

The lighting pattern shown in FIG. 3 was used to record a signal once to the phase-change optical disc thus having the recording layer 4 made of a composition on a straight line 11 shown in FIG. 16 under the similar conditions to those in the experiment of which the results are shown in FIG. 4, and the jitter of the signal read out from the phase-change optical disc was measured.

Figure 17:
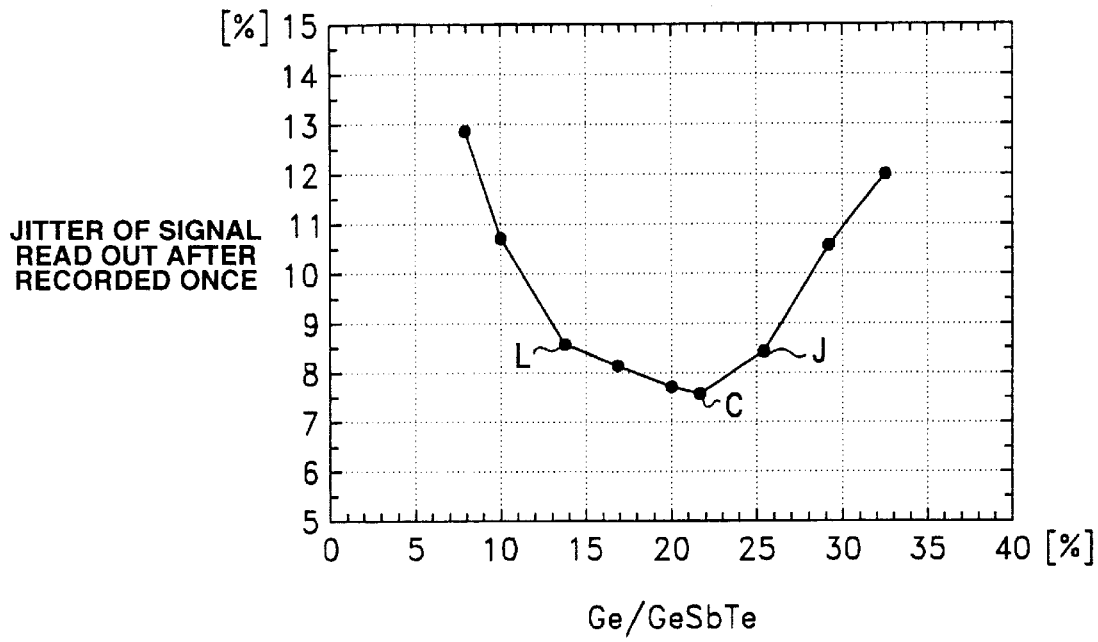
FIG. 17 graphically illustrates the relation between the Ge content in the GeSbTe alloy as the material for the recording layer and read signal jitter.

The measurement results are shown in FIG. 17 of the horizontal axis indicates the mixing ratio of Ge in a composition on the straight line 11 connecting points $Ge_{50}Te_{50}$ and $Sb_{40}Te_{60}$ and the vertical axis indicates the jitter of the signal read out after recorded once. It should be noted that the points J, L and C in FIG. 17 correspond to the points J (26.0, 19.2, 54.8), L (14.3, 28.6, 57.1) and C (2, 2, 5), respectively, in FIG. 15.

As apparent from the results shown in FIG. 17, when the recording layer 4 is made of a composition having a larger Ge content than at the point J (26.0, 19.2, 54.8) in the ternary composition diagram of the elements Ge, Sb and Te, the jitter is over 10%, and when the recording layer 4 is made of a composition having a smaller Ge content than at the point L (14.3, 28.6, 57.1), the jitter is over 10%. Therefore, the composition on the straight line 11 connecting the points $Ge_{50}Te_{50}$ and $Sb_{40}Te_{60}$ should preferably be a one on the line connecting the points J and L as shown in FIG. 15.

Composition Having Larger Te Content than at Point C (2, 2, 5) in Ternary Composition Diagram of Elements Ge, Sb and Te Next, a phase-change optical disc was made having a recording layer made of a composition having a larger Te content than at the point C (2, 2, 5). More particularly, $Ge_2Sb_2Te_5$ and Te targets were co-sputtered to make a phase-change optical disc having a recording layer 4 formed from a composition on a straight line 12 from the point C.

For the phase-change optical disc having the recording layer 4 thus formed from the composition on the straight line 12, the jitter of a signal read out after recorded once was measured as in the experiment of which the results are shown in FIG. 17.

Figure 18:
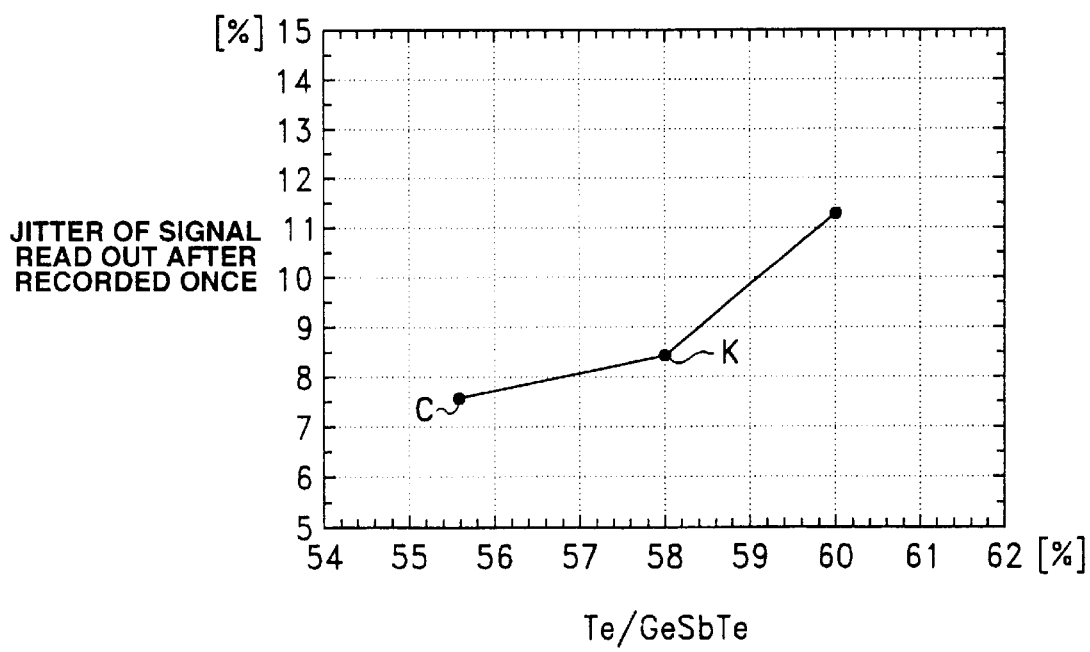
FIG. 18 graphically illustrates the relation between the Te content in the GeSbTe alloy as the material for the recording layer and read signal jitter.

The measurement results are shown in FIG. 18 of which the horizontal axis indicates the mixing ratio of Te in the composition on the straight line 12 connecting the points $Ge_2Sb_2Te_5$ and Te and the vertical axis indicate the jitter of a signal read out after being recorded once. It should be noted that the points C and K in FIG. 18 correspond to the points C (2, 2, 5) and K (21.0, 21.0, 58.0) shown in FIG. 15.

As revealed from the results shown in FIG. 18, the recording layer 4 should preferably be formed from a composition on the line connecting the points C (2, 2, 5) and K (21.0, 21.0, 58.0) as shown in FIG. 15 for the jitter to be under 10%.

Composition Having Larger Sb Content than at Point C (2, 2, 5) in Ternary Composition Diagram of Elements Ge, Sb and Te Next, a phase-change optical disc was made which having a recording layer made of a composition having a larger Sb content than at the point C (2, 2, 5). More particularly, $Ge_2Sb_2Te_5$ and Sb targets were co-sputtered to make a phase-change optical disc having a recording layer 4 formed from a composition on a straight line 13 from the point C.

Figure 19:
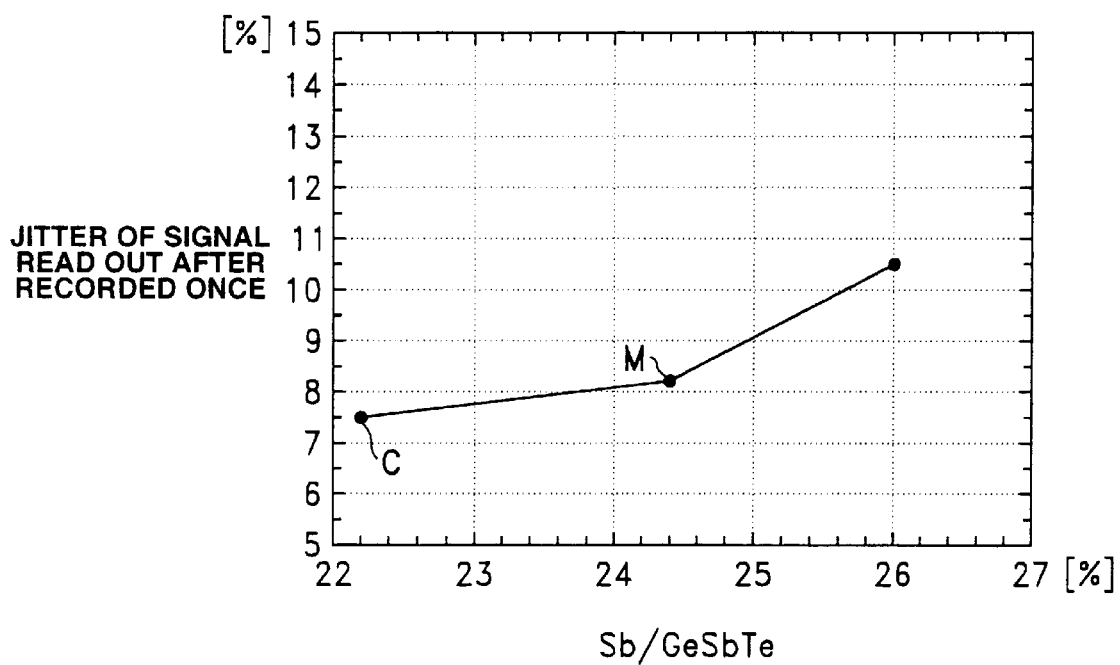
FIG. 19 graphically illustrates the relation between the Sb content in the GeSbTe alloy as the material for the recording layer and read signal jitter.

For the phase-change optical disc having the recording layer 4 thus formed from the composition on the straight line 13, the jitter of a signal read out after being recorded once was measured as in the experiment of which the results are shown in FIG. 19.

The measurement results are shown in FIG. 19 of which the horizontal axis indicates the mixing ratio of Sb in the composition on the straight line 13 connecting the points $Ge_2Sb_2Te_5$ and Sb and the vertical axis indicate the jitter of a signal read out after being recorded once. It should be noted that the points M and C in FIG. 19 correspond to the points M (21.6, 24.4, 54.0) and C (2, 2, 5) shown in FIG. 15.

As revealed from the results shown in FIG. 19, the recording layer 4 should preferably be formed from a composition on the line connecting the points M (21.6, 24.4, 54.0) and C (2, 2, 5) as shown in FIG. 15 for the jitter to be under 10%.

Suitable Composition for the Recording Layer in the Present Invention

The aforementioned results showed that the composition of the GeSbTe alloy as the material of the recording layer in the phase-change optical disc 1 according to the present invention should preferably fall in an area defined by the four points including J (26.0, 19.2, 54.8), K (21.0, 21.0, 58.0), L (14.3, 28.6, 57.1) and M (21.6, 24.4, 54.0) as shown in FIG. 15.

Since the composition of a phase-change material for the recording layer 4 in the phase-change optical disc 1 of the present invention is defined as in the above, the durability against repeated recording and write/read characteristic of the recording layer are optimized, thus effectively assuring a high quality of a signal even after being repeatedly recorded.

Suitable Thickness of the Recording Layer

The recording layer 4 in the present invention should preferably be 18 to 30 nm for the reasons based on the following experiment results:

Suitable Thickness of the Recording Layer in the Present Invention

First, a first dielectric layer 3 of ZnS—$SiO_2$ having a thickness of 120 nm was formed on a substrate 2 by sputtering.

Then, a recording layer of $Ge_2Sb_2Te_5$ was formed on the first dielectric layer 3 by sputtering at a speed of 0.42 nm/s in an Ar gas atmosphere of which the mixing ratio ($N_2$+$O_2$)/Ar was 10% and mixing ratio $O_2/(N_2+O_2)$ was 20%. The recording layer 4 was formed with the thickness varied in a range of 15 to 40 nm, and thus there were made a plurality of substrates 2 with the recording layers 4 having different thicknesses from each other.

Next, a second dielectric layer 5 of ZnS—$SiO_2$ of 15 nm and a light-reflective layer 6 of Al alloy having a thickness of 150 nm were formed in this order by sputtering on each of the recording layers 4 different in thickness from one to another, and thereafter a protective layer 7 was formed by applying an ultraviolet-curable resin to the light-reflective layer 6, thereby forming a phase-change optical disc 1.

The plurality of phase-change optical discs thus formed with the recording layers 4 different in thickness from one to another were initialized, and a lighting pattern as shown in FIG. 3 was used to record random EFM signal repeatedly to the phase-change optical discs and the jitter of the read-out random EFM signal was measured. At this time, the linear velocity was 4.8 m/s, and the recording power Ph, erasing power Pl and cooling power Pc were set for a minimum jitter of the signal read out after recorded once.

The above experiment showed that since the recording layer 4 having a thickness of less than 18 nm in the phase-change optical disc 1 thus made is weak, a high-powered laser beam of a recording power Ph of 15 mW cannot be used to make repetitions of recording with respect to such a recording layer 4. In a phase-change optical disc 1 with a recording layer 4 having a thickness of more than 30 nm, the jitter of signal read out after being recorded repeatedly 10,000 times is over 12.5%, namely, the durability against repeated recording is insufficient. Therefore, the recording layer 4 should preferably be 18 to 30 nm.

According to the present invention, the first dielectric layer 3 is formed on the substrate 2. The dielectric layer 3 is provided for protection of the recording layer 4 against oxidization as well as for an amplification of laser beam due to a multi-interference.

The first dielectric layer 3 is made of a material selected from ZnS, $SiO_X$, $Al_2O_3$, $ZrO_3$, $Ta_2O_5$, $Si_3N_4$, $SiN_X$, $AlN_X$, MoO$_3$, WO$_3$, ZrO$_2$, BN, TiN, ZrN, PbF$_2$, MgF$_2$ and the like. One of the materials may be singly used or more than one material may be used as a mixture. Among others, the material for the first dielectric layer 3 should preferably contain at least ZnS, and more preferably be ZnS—SiO$_2$.

Further, the first dielectric layer 3 should preferably be 80 to 140 nm thick as will be discussed below concerning the experiment results.

First, the first dielectric layer 3 of ZnS—SiO$_2$ was formed on the substrate 2 by sputtering. At this time, the thickness of the first dielectric layer 3 was varied in a range of 70 to 150 nm to make a plurality of substrates 2 having first dielectric layers different in thickness from one to another.

Next, a recording layer 4 of Ge$_2$Sb$_2$Te$_5$ having a thickness of 25 nm was formed by sputtering on each of the first dielectric layers 3 different in thickness from one to another at a speed of 0.42 nm/s in an Ar gas atmosphere of which the mixing ratio (N$_2$+O$_2$)/Ar was 10% and mixing ratio O$_2$/(N$_2$+O$_2$) was 20%.

Next, a second dielectric layer 5 of ZnS—SiO$_2$ of 15 nm and a light-reflective layer 6 of Al alloy having a thickness of 150 nm were formed in this order by sputtering on each of the recording layers 4, and thereafter a protective layer 7 was formed by applying an ultraviolet-curable resin to the light-reflective layer 6, thereby forming a phase-change optical disc 1.

The phase-change optical discs thus formed was initialized, and the groove reflectivity was measured. Further, a lighting pattern as shown in FIG. 3 was used to record random EFM signal repeatedly to the phase-change optical disc and the jitter of the read-out random EFM signal was measured. At this time, the linear velocity was 4.8 m/s, and the recording power Ph, erasing power P1 and cooling power Pc were set for a minimum jitter of the signal read out after recorded once.

The above experiment showed that since the first dielectric layer 3 having a thickness of less than 80 nm in a phase-change optical disc 1 thus made shows a lower groove reflectivity, so that no quality read signal can be obtained. In a phase-change optical disc 1 with a first dielectric layer 3 having a thickness of more than 140 nm, the jitter of signal read out after being recorded repeatedly 10,000 times is over 12.5%, namely, the durability against repeated recording is insufficient. Therefore, the first dielectric layer 3 should preferably be 80 to 140 nm.

Note that the first dielectric layer 3 may be formed by a well-known method such as a vapor deposition or sputtering method such as an ion beam sputtering, DC sputtering, RF sputtering or the like.

The second dielectric layer 5 is formed, on the recording layer 4, from a similar material and in a similar manner to those for the first dielectric layer 3. Similar to the first dielectric layer 3, the second dielectric layer 5 is provided for protection of the recording layer 4 against oxidization as well as for an amplification of laser beam due to a multi-interference.

The second dielectric layer 5 should preferably be 10 to 30 nm thick. If the thickness of the second dielectric layer 5 is under 10 nm, the heat developed by the laser beam is easily conducted to the light-reflective layer 6 and deteriorates the function of preventing water from penetrating from outside. If the second dielectric layer 5 is thicker than 30 nm, the heat of the recording layer 4 of which the temperature is elevated by the laser beam is hardly conducted to the light-reflective layer 6, so that the recording layer 4 will remarkably be deteriorated as recording is repeatedly done to the phase-change optical disc.

The light-reflective layer 6 is formed on the second dielectric layer 5. The light-reflective layer 6 reflects a light incident from on the substrate 2 and serves also as a heat sink to prevent the head from being excessively confined inside the recording layer 4.

The light-reflective layer 6 should preferably be made of a metallic, metalloid or semiconductive element singly or in combination. It may be a metallic element such as Al, Au, Ni, Fe, Cr or an alloy of them, for example.

The light-reflective layer 6 should preferably be 50 to 300 nm thick. If the thickness is smaller than 50 nm, the light-reflective layer 6 will have a structure from which the heat can hardly be dissipated, so that the recording layer 4 will more quickly be deteriorated as recording is repeatedly done to the phase-change optical disc. If the light-reflective layer 6 is thicker than 300 nm, it needs a longer time for manufacture and thus its productivity is lower. The light-reflective layer 6 may be formed by a well-known method such as a vapor deposition or sputtering method such as an ion beam sputtering, DC sputtering, RF sputtering or the like.

The protective layer 7 is formed on the light-reflective layer 6. It is formed from an ultraviolet-curable resin applied by the spin coating to the light-reflective layer 6, or from a resin, glass or metal plate bonded to the light-reflective layer 6 with an adhesive.

A phase-change optical disc has been proposed in which two substrates of 120±0.3 mm in diameter and 0.6±0.03 mm are laminated to each other, functional layers such as a recording layer are formed on either side of the laminated substrates, track pitch is 0.8±0.01 µm, recording is made in grooves by an optical system of which a ratio λ/NA between the numerical aperture NA and wavelength λ of light source is (1.083−0.086) to (1.083+0.167) µm and the recording capacity is 3.0 GB/side. The present invention is suitably applicable to such a double-sided phase-change optical disc.

The phase-change optical disc 1 having the above-mentioned construction is produced as will be described by way of example in the following:

First, a substrate 2 having predetermined grooves formed thereon is formed from polycarbonate by injection molding. Then, a first dielectric layer 3 of ZnS—SiO$_2$ is formed on the substrate 2 by RF sputtering.

Next, a recording layer 4 of GeSbTe alloy is formed by DC sputtering on the first dielectric layer 3. At this time, the GeSbTe alloy as a phase-change material is used to form the recording layer 4 by sputtering in an Ar gas atmosphere containing N$_2$ and O$_2$ gases.

The recording layer 4 should preferably be formed at a speed X (nm/s) in the Ar gas atmosphere containing the N$_2$ and O$_2$ gases of which the mixing ratio (N$_2$+O$_2$)/Ar between the mixture of N$_2$ and O$_2$ gases and the Ar gas is Y(%) and the mixing ratio O$_2$/(N$_2$+O$_2$) of the O$_2$ gas with the mixture of N$_2$ and O$_2$ gases is Z(%), the parameters X, Y and Z meeting the following relations (1) to (3):

$$Y \geq 2.3X + 1.0 \quad (1)$$

$$Y \leq 12.8X + 16.7 \quad (2)$$

$$10 \leq Z \leq 60 \quad (3)$$

Thus, in the optical recording medium manufacturing method according to the present invention, since the forming conditions for the recording layer 4 are defined, the GeSbTe alloy forming the recording layer 4 is suitably nitrided and oxidized. Thereby, the physical properties of the recording layer 4 for the read/write are optimized and the durability against repeated recording are further improved. Therefore, the optical recording medium manufacturing method of the present invention is adapted to minimize the regional deterioration, such an increased jitter, of a signal read out after being repeatedly recorded from a few times to tens of times and to provide a quality signal read out even after being recorded repeatedly more than tens of thousands of times. As a result, the optical recording medium of the present invention can be provided which always keeps a stable and good write/read characteristic even after repetitions of signal recording.

Note that the recording layer forming speed should preferably be over 0.1 nm/s and under 5.0 nm/s. Thus, the optical recording medium manufacturing method according to the present invention defines the recording layer forming speed as in the above to optimize the write/read characteristic of the recording layer 4, thereby implementing an optical recording medium which keeps a good write/read characteristic even after repetitions of signal recording.

The recording layer 4 is formed from a composition of GeSbTe alloy falling in an area defined, in a ternary composition diagram of the three elements Ge, Sb and Te, by four points including the points J (26.0, 19.2, 54.8), K (21.0, 19.0, 58.0), L (14.3, 28.6, 57.1) and M (21.6, 24.4, 54.0).

Since the recording layer 4 is formed from such a composition, there is provided an optical recording medium in which the write/read characteristic of the recording layer 4 is optimized so that deterioration of a read signal after being recorded repeatedly can be minimized.

Next, a second dielectric layer 5 of ZnS—$SiO_2$ is formed on the recording layer 4 by RF sputtering. Then, a light-reflective layer 6 is formed on the second dielectric layer 5 using an Al target.

Next, the light-reflective layer 6 is coated with an ultraviolet-curable resin by spin coating, thereby finally producing a phase-change optical disc 1 according to the present invention.

It should be noted that to produce a double-sided phase-change optical disc 10 as shown in FIG. 2, two pieces of the above-mentioned phase-change optical disc 1 may be made and bonded to each other with their light-reflective layers 6 facing each other with an adhesive applied between the layers 6, by way of example.

The phase-change optical disc 1 having the construction having been described in the foregoing will be initialized, and information signal is written, erased, or read out with respect to the phase-change optical disc 1, as will be discussed below.

The phase-change optical disc 1 is composed of the first dielectric layer 3, recording layer 4, second dielectric layer 5, light-reflective layer 6 and the protective layer 7 formed in this order on the substrate 2 as having previously been described. The phase-change optical disc 1 is processed to initialize the recording layer 4.

The initialization is such that the recording layer having any information signal not yet written thereon is processed to have a uniformly crystalline state. More particularly, a predetermined laser beam is irradiated evenly on the entire phase-change optical disc 1. At this time, the recording layer 4 is heated to a temperature below the melting point, and above the crystallization point, of the phase-change material. Thereafter, the recording layer 4 is cooled to a uniformly crystalline state. Thus, the recording layer 4 is initialized.

Information signal will be written, erased or read out with respect to the initialized phase-change optical disc 1 set in a disc drive and being spun at a predetermined linear velocity.

First, to record an information signal on the phase-change optical disc 1, a beam of a high-powered laser is focused onto the recording layer 4 of the substrate 2. Thus, a portion of the recording layer 4 under the focused spot of the laser beam is quickly heated to a higher temperature than the melting point and then quickly cooled to get an amorphous state. In the phase-change optical disc 1, the information signal is written as an amorphous recording mark on the crystalline recording layer 4.

To erase information written in the phase-change optical disc 1, a weaker laser than is used for the writing of the information signal is focused at least onto the recording mark formed in the substrate 2. A portion of the recording layer 4 under the focused spot of the laser beam is heated to a temperature above the crystallization point and below the melting point and then annealed to restore a crystalline state, irrespectively of its precedent state. Namely, the amorphous recording mark associated with the information signal is changed back to the crystalline phase, thereby erasing the information signal.

To read out an information signal written on the phase-change optical disc 1 in which the information signal has been written and/or erased, a light beam having a power low enough to cause no phase change in the recording layer 4 is focused onto the recording layer 4 from on the substrate 2 and a return light of the incident light is detected.

In the phase-change optical disc 1, the reflectivity of the recording layer 4 in the crystalline state is higher than that in the amorphous state. Therefore, the disc drive will receive the return light from the recording layer 4 to detect a difference in reflectivity between the crystalline and amorphous states of the recording layer 4, thereby reproducing the recorded information signal.

Second Embodiment

Similar to the phase-change optical disc 1 shown in FIG. 1, the phase-change optical disc according to the second embodiment of the present invention comprises a substrate 2, first dielectric layer 3, recording layer 4, second dielectric layer 5, light-reflective layer 6 and a protective layer 7 formed in this order on the substrate 2.

The phase-change optical disc according to the second embodiment is different only in the construction of the recording layer 4 from the first embodiment, having been described in the foregoing, while it comprises almost same component layers as the substrate 2, first dielectric layer 3, second dielectric layer 5, light-reflective layer 6 and the protective layer 7 of the phase-change optical disc 1 of the first embodiment. Therefore, the other component layers than the recording layer will not be described any longer but only the recording layer 4 will be discussed below.

The recording layer 4 is formed from a phase-change material changeable in state from crystalline to amorphous, or vice versa, under the focused spot of a laser beam or the like. Namely, the recoding layer 4 is an optical recording layer of which the phase can be changed under the focused spot of laser beam to write, erase or read an information signal.

Specifically, the phase-change material of the recording layer 4 in the present invention is a calcogenide containing a GeSbTe alloy. The recording layer 4 should preferably be 18 to 30 nm thick.

It should be noted that the recording layer 4 of the present invention should preferably be formed by sputtering at a speed X (nm/s) in an Ar gas atmosphere containing $O_2$ gas of which the mixing ratio $O_2$/Ar between the $O_2$ and Ar gases is Y(%), the parameters X and Y meeting the following relations (1) and (4):

$$Y \geq 2.3X+1.0 \qquad (1)$$

$$Y \leq 5.5X+2.7 \qquad (4)$$

Furthermore, the recording layer forming speed X should preferably be over 0.1 nm/s and under 5.0 nm/s. Namely, the speed X should preferably meet the following relation (6):

$$0.1 \leq X \leq 5 \qquad (6)$$

Note that the mixing ratio $O_2/Ar$ is a flow ratio between the $O_2$ and Ar gases, in other words, a volume ratio between $O_2$ and Ar gases.

Recording Layer Forming Atmospheric Conditions and Speed X

The mixing ratio $O_2/Ar$ of Y(%) between the $O_2$ and Ar gases and the recording layer forming speed X (nm/s) for forming the recording layer 4 in the optical recording medium and in the optical recording medium manufacturing method according to the present invention, are defined by the relations (1), (4) and (6) as in the above for the reasons based on the following experiment results having been conducted on the embodiments of the present invention and comparative examples:

Relation Between Recording Layer Forming Atmosphere and Read Signal Characteristics First, a phase-change optical disc was made as will be discussed below:

First, a substrate 2 of 120 nm in diameter and 0.6 mm in thickness was made. Then a first dielectric layer 3 of $ZnS-SiO_2$ having a thickness of 90 nm was formed on the substrate 2 by sputtering.

Next, a target of $Ge_2Sb_2Te_5$ was used on the first dielectric layer 3 and a recording layer 4 of GeSbTe having a thickness of 25 nm was formed by sputtering at a speed of 0.42 nm/s in an Ar gas atmosphere in which $O_2$ gas was mixed.

At this time, in the Ar gas atmosphere having mixed therein the $O_2$ gas, the mixing ratio $O_2/Ar$ was varied within a range of 0 to 10%, thereby making a plurality of phase-change optical discs each having the recording layer formed under different atmospheric conditions.

Next, a second dielectric layer 5 of $ZnS-SiO_2$ having a thickness of 15 nm and a light-reflective layer 6 of Al alloy having a thickness of 150 nm were formed in this order by sputtering on each of the recording layers 4 formed under the different conditions, and then a protective layer 7 was formed on the light-reflective layer 6 by applying an ultraviolet-curable resin, to make a phase-change optical disc 1.

Each type of the phase-change optical discs 1 thus made was duplicated. The two phase-change optical discs 1 of each type thus obtained were bonded to each other with their light-reflective layers 6 facing each other with an adhesive 9 applied between the layers 6. Finally, a double-sided phase-change optical disc 10 of 120 mm in diameter and 1.2 mm in thickness as shown in FIG. 2 was made in which write and record can be done with respect to both sides thereof. Note that this phase-change optical discs 1 and 10 has a track pitch of about 0.8 μm.

Each of the plurality of phase-change optical discs made under different recording layer forming conditions were initialized by crystallizing the recording layers 4 under the focused spot of a high-powered laser beam.

Then, a lighting pattern as shown in FIG. 3 was used to record a random EFM signal using a channel clock of 27.7 MHZ on each of these initialized phase-change optical discs. In FIG. 3, the recording power is indicated with a reference Ph, erasing power is with a reference P1, and the cooling power is with a reference Pc. In the lighting pattern shown in FIG. 3, one clock is indicated with 1T, and the pulse length of one lighting pulse is with 13 ns.

At this time, a recording/reproducing apparatus, or a disc drive, was used in which the linear velocity was 4.8 m/s, the recording power Ph is 140 mW, the erasing power P1 was 5.6 mW, and the cooling power Pc was 1.5 mW. The disc drive is provided with a laser which generates a laser beam of 650 nm in wavelength.

Under these conditions, a signal was recorded repeatedly 20,000 times to each of the phase-change optical discs.

Then, to evaluate the relation between the mixing ratio between $O_2$ and Ar gases used in forming the recording layer and the characteristic of read signal, jitter of a signal read from each of the phase-change optical discs after being recorded repeatedly 20,000 times, was measured.

Figure 20:
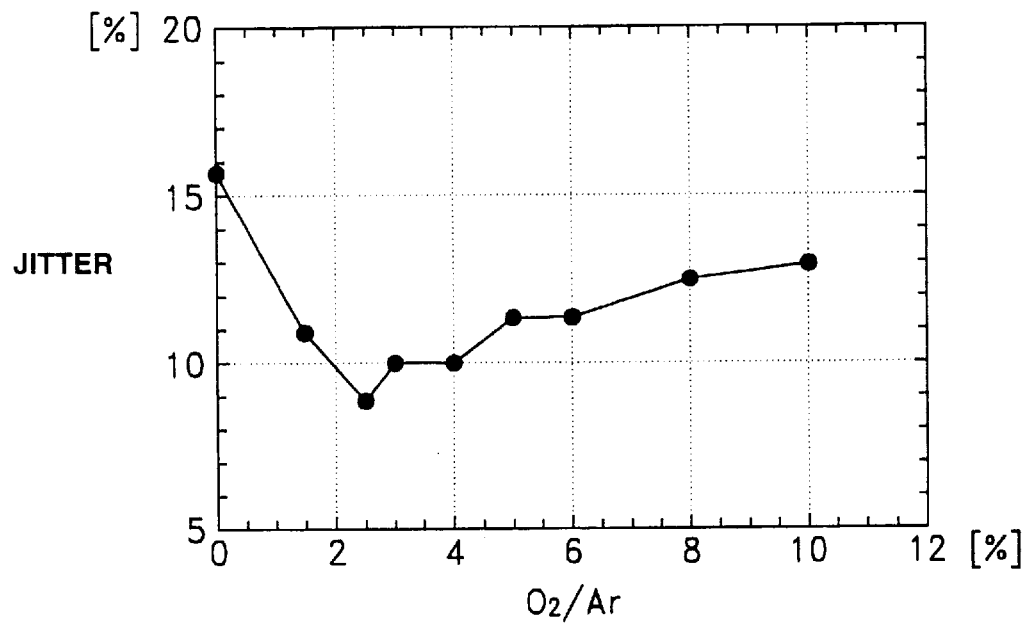
FIG. 20 graphically illustrates the relation between the mixing ratio $O_2/Ar$ in the recording layer forming atmosphere and read signal jitter when the recording layer forming speed is 0.42 nm/s.

The measurement results are shown in FIG. 20 of which the horizontal axis indicates the mixing ratio $O_2/Ar$ while the vertical axis indicates the jitter of a signal read from the optical disc after recorded repeatedly 20,000 times on a same recording track. As a correctable jitter, 12.5% is taken here as a reference value for an acceptable media.

As seen from the experiment results shown in FIG. 20, the jitter is the highest as 15.8% when the mixing ratio $O_2/Ar$ is 0%, namely, when no $O_2$ gas is contained in the Ar gas. It decreases as the $O_2$ content increases. The jitter is the lowest when the mixing ratio $O_2/Ar$ is 1.5 to 4%. As the the mixing ratio $O_2/Ar$ is further increased, the jitter is also increased gradually.

Therefore, the experiment results showed as seen from FIG. 20 that for the jitter of a signal read out after recorded repeatedly to be under 12.5% at which a jitter can be corrected, the recording layer should preferably be formed in an Ar gas atmosphere of which the mixing ratio $O_2/Ar$ is over 1.5%, preferably between 1.5 to 6% and especially preferably is 2 to 4%.

Relation Between Atmospheric Conditions for Forming the Recording Layer and Groove Reflectivity Next, for evaluation of the relation between atmospheric conditions including a mixing ratio between $O_2$ and Ar gases under which the recording layer is formed and the groove reflectivity of each of the discs, the recording layer was formed under varied atmospheric conditions and each phase-change optical disc thus made was initialized. The groove reflectivity of each phase-change optical disc was measured.

Figure 21:
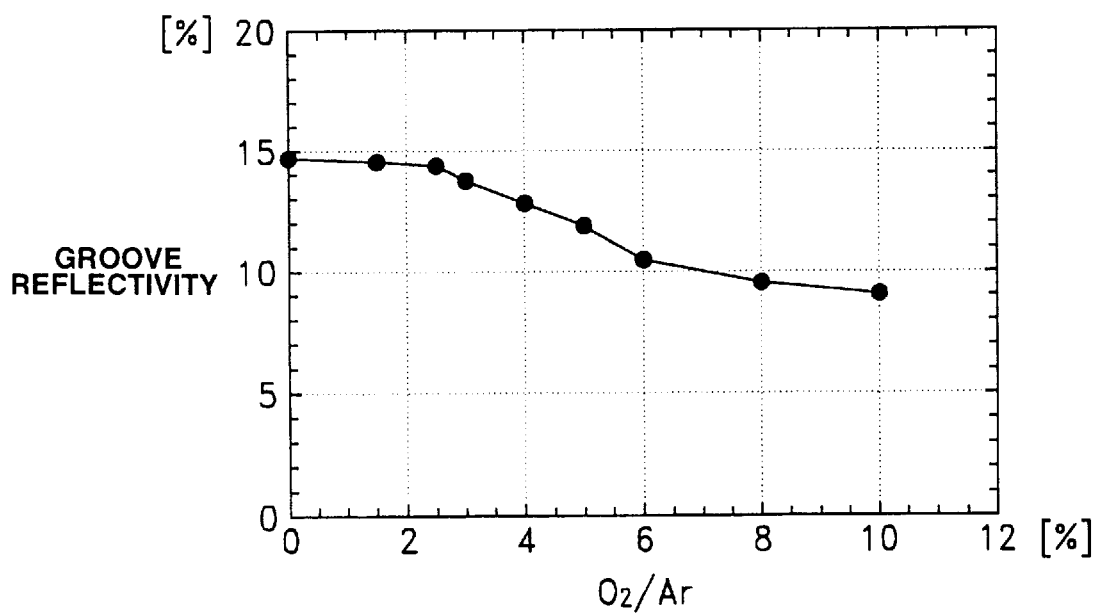
FIG. 21 graphically illustrates the relation between the mixing ratio $O_2/Ar$ in the recording layer forming atmosphere and groove reflectivity when the recording layer forming speed is 0.42 nm/s.

The experiment results are shown in FIG. 21 of which the horizontal axis indicates the mixing ratio $O_2/Ar$ and the vertical axis indicates the groove reflectivity.

As seen from the experiment results in FIG. 21, the groove reflectivity decreases monotonously as the mixing ratio $O_2/Ar$ is increased. When the mixing ratio $O_2/Ar$ is over 5.0%, the groove reflectivity is under 11%, so that no sufficient read output or no satisfactory modulation is possible.

Therefore, it is apparent from the experiment results shown in FIG. 21 that for a satisfactory signal modulation, the mixing ratio $O_2/Ar$ should be under 5.0% in the atmosphere in which the recording layer is formed.

Atmospheric Conditions Meeting Both Read Signal Characteristic and Groove Reflectivity Requirements As having been described in the above, the experiment results shown in FIGS. 20 and 21 reveal that in the optical recording medium and manufacturing method for the optical recording medium according to the present invention, when the recording layer is formed at a speed of 0.42 nm/s in an Ar gas atmosphere of which the mixing ratio $O_2/Ar$ should be 1.5 to 5.0% in order to satisfy both the requirements for the read signal jitter and groove reflectivity.

FIGS. 20 and 21 show the results of the experiments conducted on the optical discs having their respective recording layers formed at the speed of 0.42 nm/s. Therefore, to obtain similar read signal characteristics to those shown in FIGS. 20 and 21 when the recording layer forming speed varied, it is necessary to vary the mixing ratio $O_2/Ar$ as well.

Relation Among Atmospheric Conditions with the Recording Layer Forming Speed Changed, Read Signal Characteristic and Groove Reflectivity Next, a study was made on the mixing ratio $O_2/Ar$ meeting both the requirements for read signal jitter and groove reflectivity when the recording layer forming speed was varied.

Figure 22:
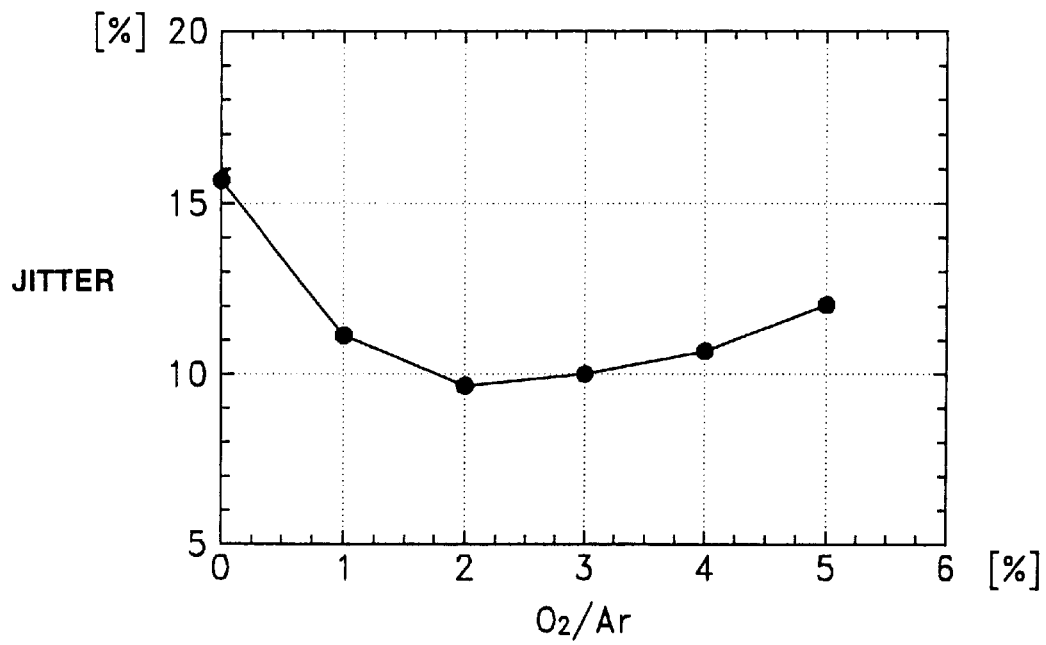
FIG. 22 graphically illustrates the relation between the mixing ratio $O_2/Ar$ in the recording layer forming atmosphere and read signal jitter when the recording layer forming speed is 0.1 nm/s.

First, a double-sided optical disc was made under similar conditions to those in the experiment of which the results are shown in FIG. 20 except that the applied voltage to the target of $Ge_2Sb_2Te_5$ was varied, recording layer forming speed was 0.1 nm/s and the mixing ratio $O_2/Ar$ was varied in a range of 0 to 5%. As in the experiment of which the results are shown in FIG. 20, the jitter of a signal read out after being recorded repeatedly 20,000 times to the optical disc was measured. The measurement results are shown in FIG. 22. Also, the optical disc thus made was initialized under the atmospheric conditions varied as in the above with the recording layerforming speed of 0.1 nm/s. The groove reflectivity of the optical disc after being thus initialized was measured in the same manner as in the experiment of which the results are shown in FIG. 21. The measurement results are shown in FIG. 23.

Similarly, a phase-change optical disc was made by forming the recording layer at a speed of 1.6 nm/s in an Ar gas atmosphere of which the mixing ratio $O_2/Ar$ was varied in a range of 0 to 20%. The jitter of a signal read out after recorded repeatedly 20,000 times to the optical disc and groove reflectivity after the optical disc was initialized, were measured. The measurement results are shown in FIGS. 24 and 25.

Similarly, a phase-change optical disc was made by forming the recording layer at a speed of 5.0 nm/s in an Ar gas atmosphere of which the mixing ratio $O_2/Ar$ was varied in a range of 0 to 40%. The jitter of a signal read out after being recorded repeatedly 20,000 times to the optical disc and groove reflectivity after the optical disc was initialized, were measured. The measurement results are shown in FIGS. 26 and 27.

Figure 23:
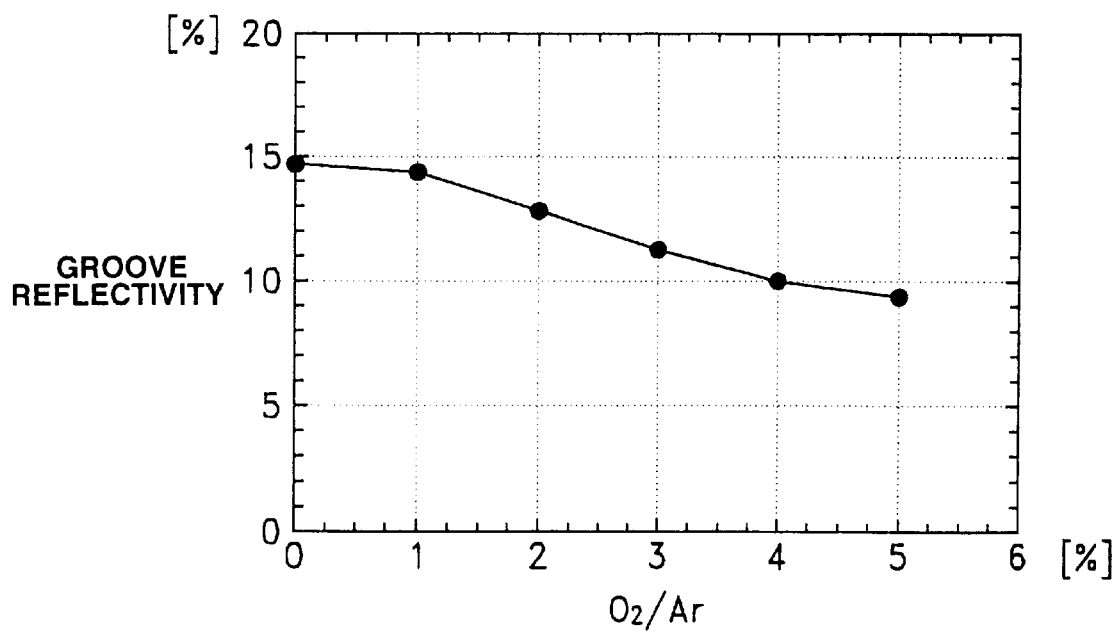
FIG. 23 graphically illustrates the relation between the mixing ratio $O_2/Ar$ in the recording layer forming atmosphere and groove reflectivity when the recording layer forming speed is 0.1 nm/s.
Figure 24:
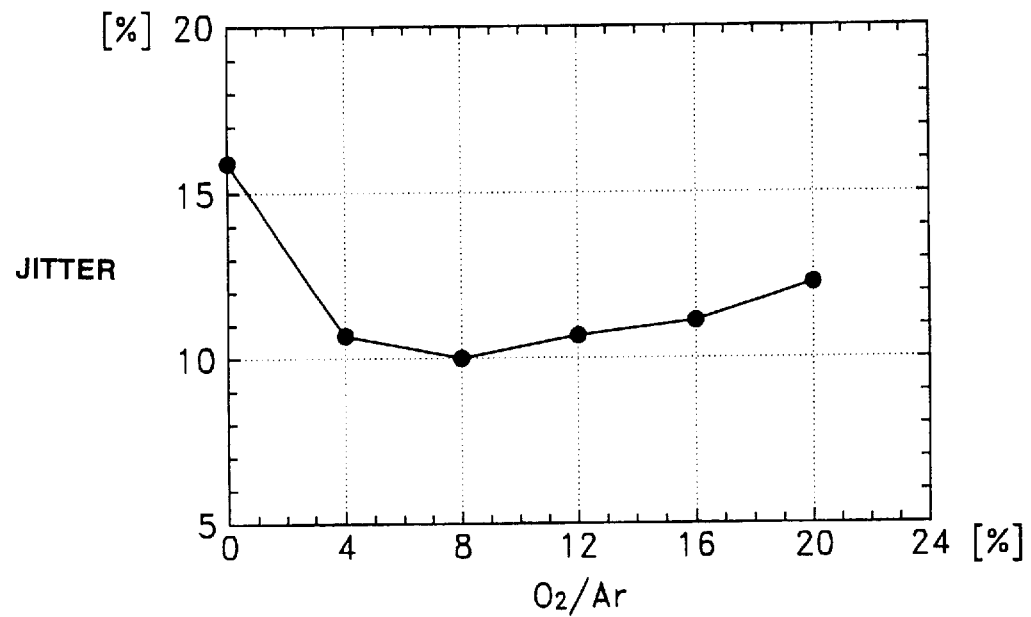
FIG. 24 graphically illustrates the relation between the mixing ratio $O_2/Ar$ in the recording layer forming atmosphere and read signal jitter when the recording layer forming speed is 1.6 nm/s.
Figure 25:
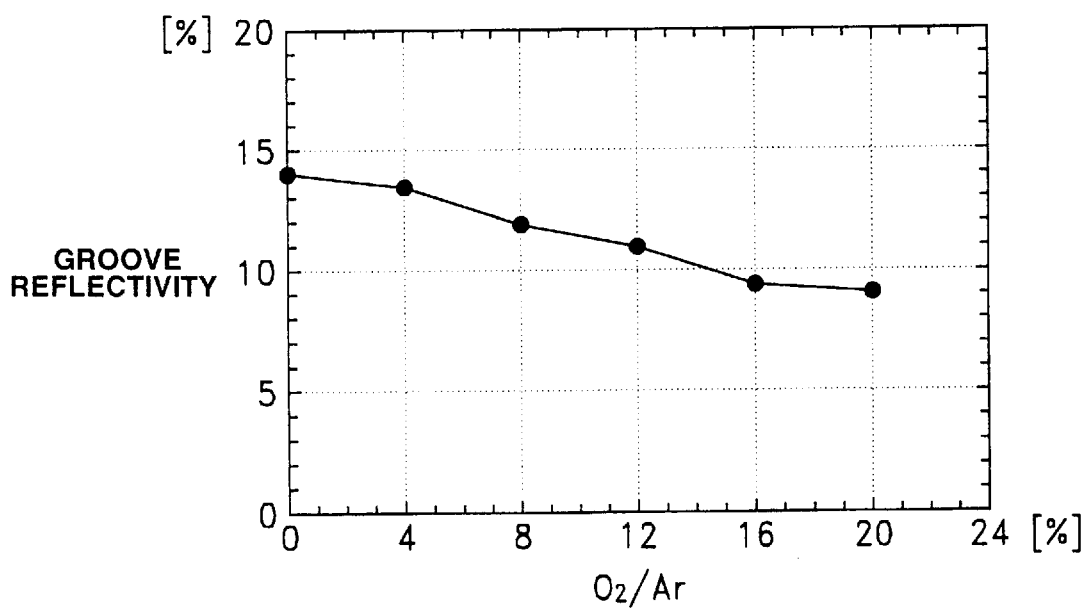
FIG. 25 graphically illustrates the relation between the mixing ratio $O_2/Ar$ in the recording layer forming atmosphere and groove reflectivity when the recording layer forming speed is 1.6 nm/s.
Figure 26:
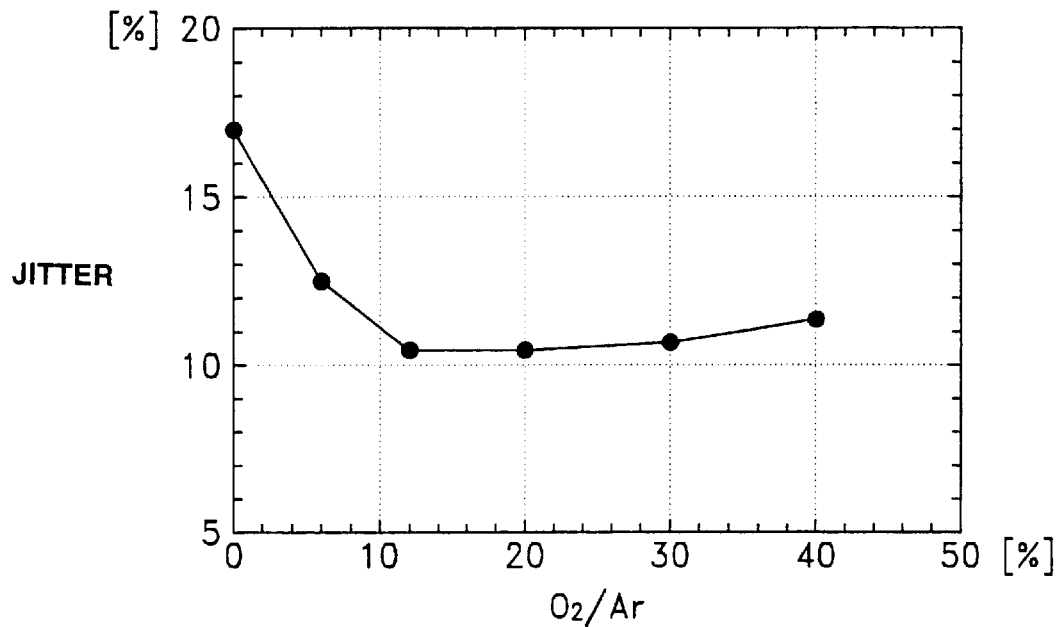
FIG. 26 graphically illustrates the relation between the mixing ratio $O_2/Ar$ in the recording layer forming atmosphere and read signal jitter when the recording layer forming speed is 5.0 nm/s.
Figure 27:
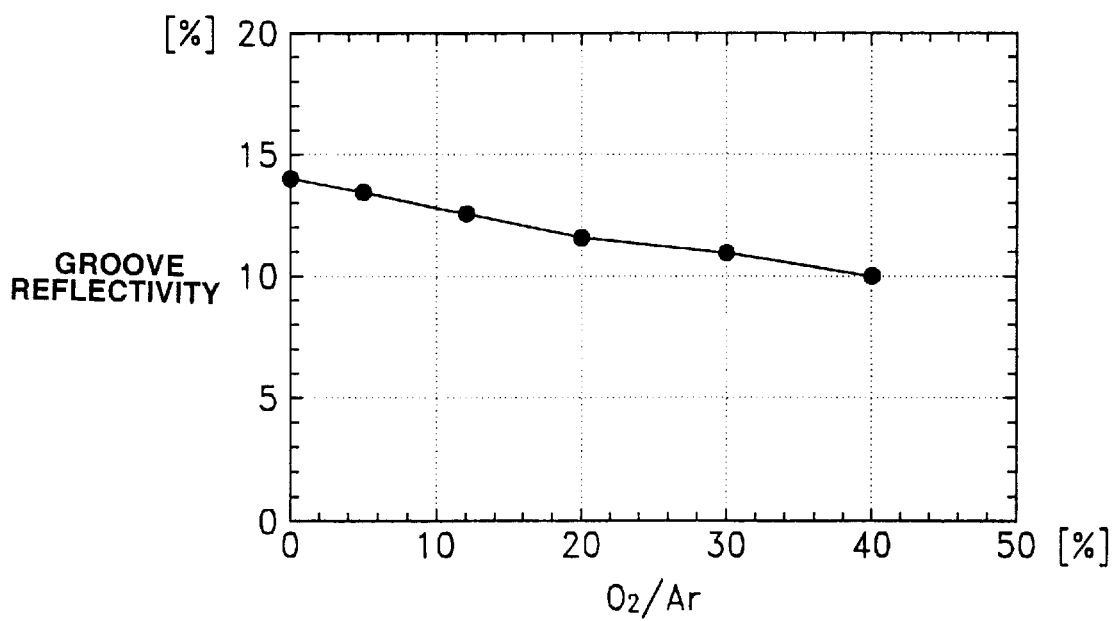
FIG. 27 graphically illustrates the relation between the mixing ratio $O_2/Ar$ in the recording layer forming atmosphere and groove reflectivity when the recording layer forming speed is 5.0 nm/s.

It was revealed from the experiment results in FIGS. 23, 24 and 26 that in the optical discs having their respective recording layers formed at the speeds of 0.1 nm/s, 1.6 nm/s and 5.0 nm/s, respectively, the mixing ratios $O_2/Ar$ resulting in a read signal jitter of under 12.5% are over 1, 4 and 12%, respectively.

Also, as seen from the experiment results in FIGS. 26, 27 and 28, in the optical discs having their respective recording layers formed at the speeds of 0.1 nm/s, 1.6 nm/s and 5.0 nm/s, respectively, the mixing ratios $O_2/Ar$ resulting in a groove reflectivity of over 11% are below 3, 12 and 30%, respectively.

Recording Layer Forming Conditions Meeting Both Read Signal Characteristic and Groove Reflectivity Requirements As mentioned above, the experiment results shown in FIGS. 20, 22, 24 and 26 reveal that in the optical discs having their respective recording layers formed at the speeds of 0.42 nm/s, 0.1 nm/s, 1.6 nm/s and 5.0 nm/s, respectively, the mixing ratios $O_2/Ar$ resulting in a read signal jitter of under 10% are 1.5, 1, 4 and 12%, respectively. The results are graphically illustrated in FIG. 28 with the recording layer forming speed indicated along the horizontal axis and the mixing ratio $O_2/Ar$ indicated along the vertical axis to define a straight line α.

Figure 28:
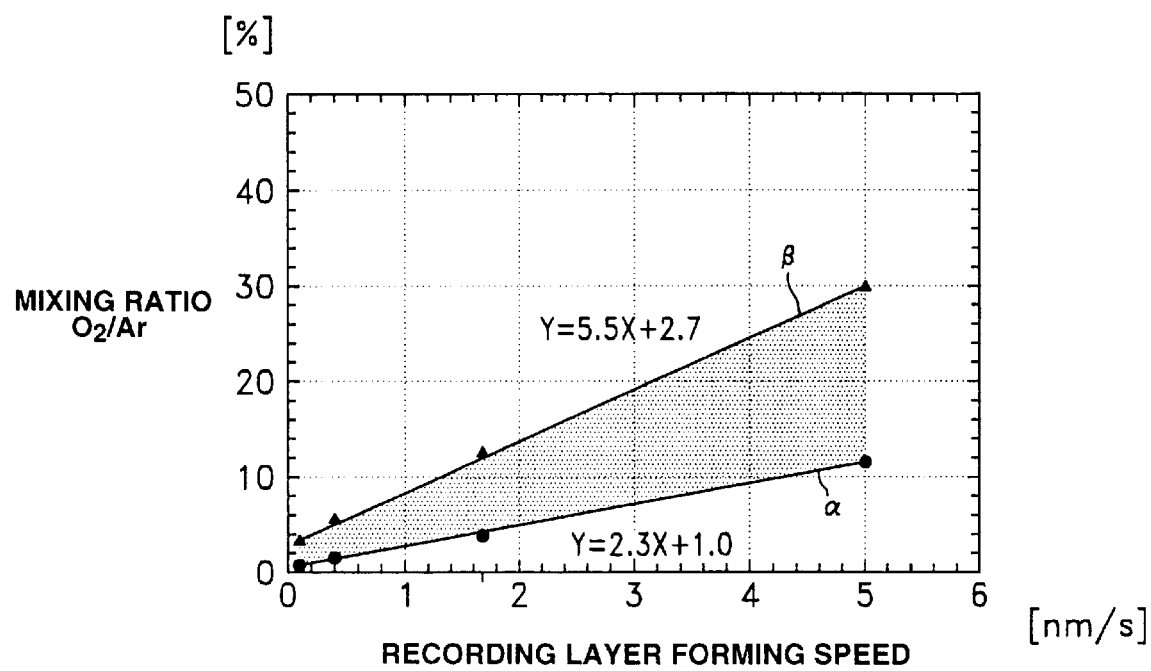
FIG. 28 graphically illustrates the relation between the mixing ratio $O_2/Ar$ in the recording layer forming atmosphere and read signal jitter.

In FIG. 28, the horizontal axis indicates the recording layer forming speed X (nm/s) while the vertical axis indicates the mixing ratios $O_2/Ar$ as Y(%). The line α is expressed by Y=2.3X+1.0. In the area under the line α, the read signal jitter is over 12.5% and thus no quality read signal can be provided.

On the other hand, as described in the foregoing, the experiment results shown in FIGS. 21, 23, 25 and 27 reveal that in the optical discs having their respective recording layers formed at the speeds of 0.42 nm/s, 0.1 nm/s, 1.6 nm/s and 5.0 nm/s, respectively, the mixing ratios $O_2/Ar$ result in a groove reflectivity of over 11% are 5, 3, 12 and 30%, respectively. The results are graphically illustrated in FIG. 28 with the recording layer forming speed indicated along the horizontal axis and the mixing ratio $O_2/Ar$ indicated along the vertical axis to define a straight line β.

The line β is expressed by Y=5.5X+2.7. In the area above the line β, the groove reflectivity is under 11% and thus no satisfactory signal modulation is possible.

If the recording layer forming speed X is higher than 5.0 nm/s, it is too high to assure a recording layer forming time long enough to adjust the recording layer thickness. If the speed X is slower than 0.1 nm/s, the recording layer forming takes a longer time, which is an inconvenience for the practice of manufacture. Therefore, the recording layer forming speed should preferably be $0.1 \leq X \leq 5.0$ (relation (6)).

As evident from the foregoing description, the phase-change optical disc 1 according to the present invention should preferably have a recording layer of GeSbTe formed by sputtering at a speed X (nm/s) in an Ar gas atmosphere containing $O_2$ gas of which the mixing ratio $O_2/Ar$ between the $O_2$ and Ar gases is Y(%), the parameters X and Y meeting the following relations (1) and (4). Thus the GeSbTe alloy forming the recording layer 4 will be suitably oxidized so that the write/read characteristic of the recording layer 4 is optimized. As a result, the phase-change optical disc 1 according to the present invention meets both the requirements for the read signal jitter and groove reflectivity to minimize the deterioration of a signal read out even after being recorded repeatedly and thus to always keep a good write/read characteristic.

$$Y \geq 2.3X+1.0 \qquad (1)$$

$$Y \leq 5.5X+2.7 \qquad (4)$$

At this time, the recording layer 4 should preferably be formed at a speed X of $0.1 \leq X \leq 5.0$ as previously mentioned for the phase-change optical disc 1 according to the present invention.

FIG. 15 is a ternary composition diagram showing a composition of the material for the recording layer 4 for use in the present invention. In the ternary composition diagram (of the three elements Ge, Sb and Te), the GeSbTe alloy is a composition falling in an area defined by four points including J (26.0, 19.2, 54.8), K (21.0, 21.0, 58.0), L (14.3, 28.6, 57.1) and M (21.6, 24.4, 54.0).

Composition of Phase-Change Material for the Recording Layer

As mentioned in the foregoing, the reason why the Ge—Sb—Te composition of the recording layer 4 is thus defined is based on the experiment results which will be described in detail below:

Composition on Line Connecting $Ge_{50}Te_{50}$ and $Sb_{40}T_{60}$ in Ternary Composition Diagram of Three Elements Ge, Sb and Te First, a first dielectric layer 3 of ZnS—$SiO_2$ having a thickness of 90 nm was formed on a substrate 2 by sputtering.

Next, a recording layer 4 of GeSbTe having a thickness of 25 nm was formed on the first dielectric layer 3 by sputtering at a speed of 0.42 nm/s in an Ar gas atmosphere of which the mixing ratio $O_2/Ar$ was 2.5%.

At this time, the recording layer 4 was formed by sputtering using a target of $Ge_2Sb_2Te_5$, target of Ge and a target of Sb.

First, consideration was made of a phase-change optical disc having a recording layer made of a composition on a straight line 11 connecting the points $Ge_{50}Te_{50}$ and $Sb_{40}Te_{60}$ about the point C (2, 2, 5) as shown in FIG. 16 being also a ternary composition diagram of the Ge, Sb and Te elements. More specifically, the $Ge_2Sb_2Te_5$ target was co-sputtered while the mixing ratio between the forming speeds for the Ge and Te targets was being kept at 1, to form a recording layer 4 from a composition between points $Ge_{50}Te_{50}$ and $Ge_2Sb_2Te_5$ as in FIG. 16.

Then, a second dielectric layer 5 of ZnS—$SiO_2$ having a thickness of 15 nm and a light-reflective layer 6 of Al alloy having a thickness of 150 nm were formed in this order by sputtering onto the recording layer 4, and thereafter, an ultraviolet resin or similar was applied to the light-reflective layer 6 to form a protective layer 7, thereby providing a phase-change optical disc 1.

Finally, two pieces of this phase-change optical discs 1 were produced. The two phase-change optical discs 1 thus obtained were bonded to each other with their light-reflective layers 6 facing each other with an adhesive applied between the light-reflective layer 6, to provide a double-sided phase-change optical disc of 120 mm in diameter and 1.2 mm in thickness.

Similarly, a phase-change optical disc was made of which only the recording layer 4 was made of a different material from the above-mentioned. More specifically, the $Ge_2Sb_2Te_5$, Ge and Te targets were co-sputtered while the forming speeds for the Ge and Te targets were kept at 0.67 nm/s to form a recording layer 4 made of a composition between points $Sb_{40}Te_{60}$ and $Ge_2Sb_2Te_5$ as in FIG. 16.

The lighting pattern shown in FIG. 3 was used to record a signal repeatedly 20,000 times to the phase-change optical disc thus having the recording layer 4 made of a composition on a straight line 11 under the similar conditions to those in the experiment of which the results are shown in FIG. 20, and the jitter of the signal read out from the phase-change optical disc was measured. The recorded signal was a random EFM signal having a channel clock of 27.7 MHZ.

Figure 29:
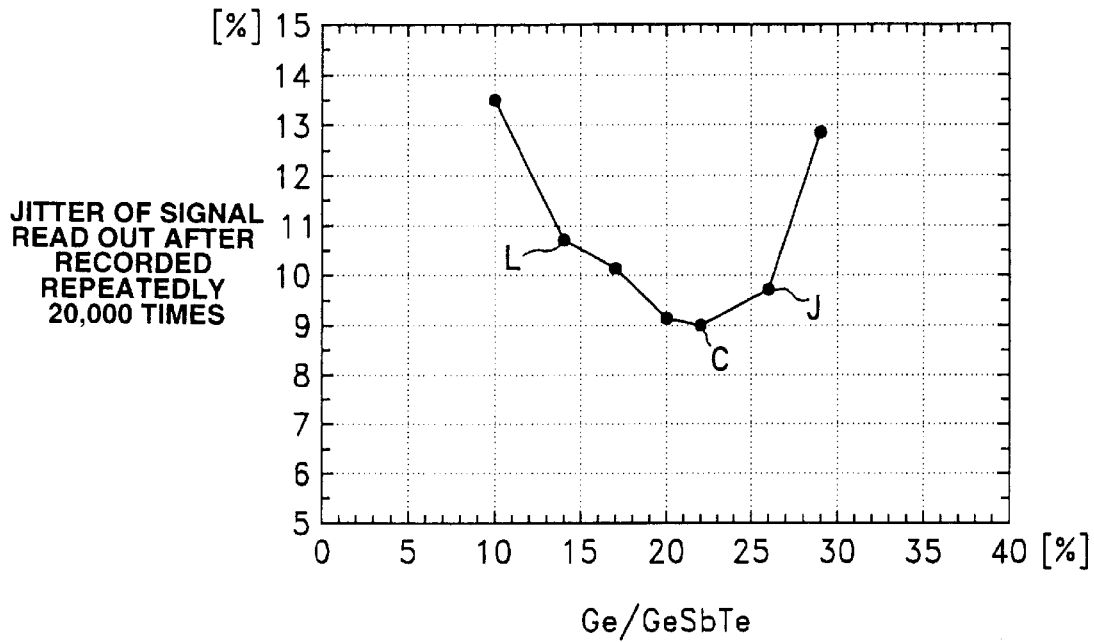
FIG. 29 graphically illustrates the relation between the Ge content in the GeSbTe alloy as the material for the recording layer and read signal jitter.

The measurement results are shown in FIG. 29 of the horizontal axis indicates the mixing ratio of Ge in a composition on the straight line 11 connecting points $Ge_{50}Te_{50}$ and $Sb_{40}Te_{60}$ and the vertical axis indicates the jitter of the signal read out after being recorded once. It should be noted that the points J, L and C in FIG. 29 correspond to the points J (26.0, 19.2, 54.8), L (14.3, 28.6, 57.1) and C (2, 2, 5), respectively, in FIG. 15.

As apparent from the results shown in FIG. 29, when the recording layer 4 is made of a composition having a larger Ge content than at the point J (26.0, 19.2, 54.8) in the ternary composition diagram of the elements Ge, Sb and Te, the jitter is over 12.5%, and when the recording layer 4 is made of a composition having a smaller Ge content than at the point L (14.3, 28.6, 57.1), the jitter is over 12.5%. Therefore, the composition on the straight line 11 connecting the points $Ge_{50}Te_{50}$ and $Sb_{40}Te_{60}$ should preferably be a one on the line connecting the points J and L as shown in FIG. 15.

Composition Having Larger Te Content than at Point C (2, 2, 5) in Ternary Composition Diagram of Elements Ge, Sb and Te Next, a phase-change optical disc was made which having a recording layer made of a composition having a larger Te content than at the point C (2, 2, 5). More particularly, $Ge_2Sb_2Te_5$ and Te targets were co-sputtered to make a phase-change optical disc having a recording layer 4 formed from a composition on a straight line 12 from the point C.

For the phase-change optical disc having the recording layer 4 thus formed from the composition on the straight line 12, the jitter of a signal read out after being recorded repeatedly 20,000 times was measured as in the experiment of which the results are shown in FIG. 29.

Figure 30:
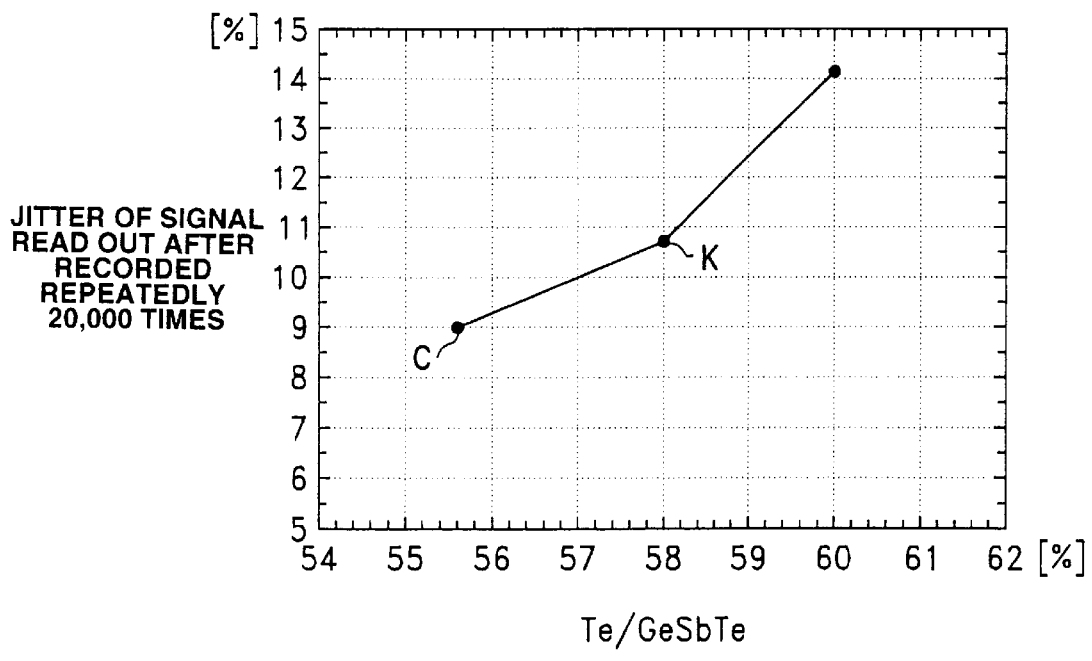
FIG. 30 graphically illustrates the relation between the Te content in the GeSbTe alloy as the material for the recording layer and read signal jitter.

The measurement results are shown in FIG. 30 of which the horizontal axis indicates the mixing ratio of Te in the composition on the straight line 12 connecting the points $Ge_2Sb_2Te_5$ and Te and the vertical axis indicate the jitter of a signal read out after being recorded 20,000 times. It should be noted that the points C and K in FIG. 30 correspond to the points C (2, 2, 5) and K (21.0, 21.0, 58.0) shown in FIG. 15.

As revealed from the results shown in FIG. 30, the recording layer 4 should preferably be formed from a composition on the line connecting the points C (2, 2, 5) and K (21.0, 21.0, 58.0) as shown in FIG. 15 for the jitter to be under 12.5%.

Composition Having Larger Sb Content than at Point C (2, 2, 5) in Ternary Composition Diagram of Elements Ge, Sb and Te Next, a phase-change optical disc was made which having a recording layer made of a composition having a larger Sb content than at the point C (2, 2, 5). More particularly, $Ge_2Sb_2Te_5$ and Sb targets were co-sputtered to make a phase-change optical disc having a recording layer 4 formed from a composition on a straight line 13 from the point C.

For the phase-change optical disc having the recording layer 4 thus formed from the composition on the straight line 13, the jitter of a signal read out after being recorded repeatedly 20,000 times was measured as in the experiment of which the results are shown in FIG. 29.

Figure 31:
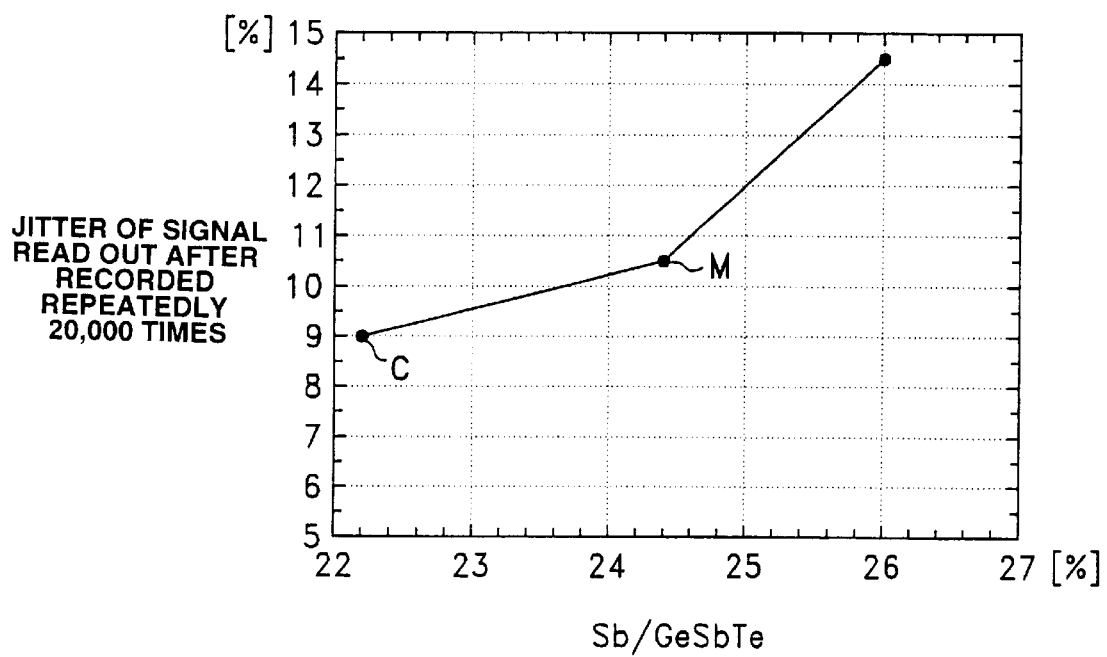
FIG. 31 graphically illustrates the relation between the Sb content in the GeSbTe alloy as the material for the recording layer and read signal jitter.

The measurement results are shown in FIG. 31 of which the horizontal axis indicates the mixing ratio of Sb in the composition on the straight line 13 connecting the points $Ge_2Sb_2Te_5$ and Sb and the vertical axis indicate the jitter of a signal read out after being recorded repeatedly 20,000 times. It should be noted that the points M and C in FIG. 31 correspond to the points M (21.6, 24.4, 54.0) and C (2, 2, 5) shown in FIG. 15.

As revealed from the results shown in FIG. 31, the recording layer 4 should preferably be formed from a composition on the line connecting the points M (21.6, 24.4, 54.0) and C (2, 2, 5) as shown in FIG. 15 for the jitter to be under 12.5%.

Suitable Composition for the Recording Layer in the Present Invention

The aforementioned results showed that the composition of the GeSbTe alloy as the material of the recording layer in the phase-change optical disc 1 according to the present invention should preferably fall in an area defined the four points including J (26.0, 19.2, 54.8), K (21.0, 21.0, 58.0), L (14.3, 28.6, 57.1) and M (21.6, 24.4, 54.0) as shown in FIG. 15.

Since the composition of a phase-change material for the recording layer 4 in the phase-change optical disc 1 of the present invention is defined as in the above, and write/read characteristic of the recording layer 4 is optimized, the durability against repeated recording is improved, and deterioration of signal read out after being recorded repeatedly is minimized, thus effectively assuring a quality of a signal read out after being repeatedly recorded.

The recording layer 4 in the present invention should preferably be 18 to 30 nm for the reasons based on the following experiment results:

First, a first dielectric layer 3 of ZnS—SiO$_2$ having a thickness of 90 nm was formed on a substrate 2 by sputtering.

Then, a recording layer of Ge$_2$Sb$_2$Te$_5$ was formed on the first dielectric layer 3 by sputtering at a speed of 0.42 nm/s in an Ar gas atmosphere of which the mixing ratio (N$_2$+O$_2$)/Ar was 2.5%. The recording layer 4 was formed with the thickness varied in a range of 15 to 40 nm, and thus there were made a plurality of substrates 2 with the recording layers 4 different in thickness from one to another.

Next, a second dielectric layer 5 of ZnS—SiO$_2$ having a thickness of 15 nm and a light-reflective layer 6 of Al alloy having a thickness of 150 nm were formed in this order by sputtering on each of the recording layers 4 different in thickness from one to another, thereby forming a phase-change optical disc 1.

The plurality of phase-change optical discs thus formed with the recording layers 4 different in thickness from one to another were initialized, and a lighting pattern as shown in FIG. 3 was used to record random EFM signal repeatedly to the phase-change optical discs and the jitter of the read-out random EFM signal was measured. At this time, the linear velocity was 4.8 m/s, and the recording power Ph, erasing power Pl and cooling power Pc were set for a minimum jitter of the signal read out after being recorded once.

The above experiment showed that since the recording layer 4 having a thickness of less than 18 nm in the phase-change optical disc 1 thus made is weak, a high-powered laser beam of a recording power Ph of 15 mW cannot be used to make repetitions of recording with respect to such a recording layer 4. In a phase-change optical disc 1 with a recording layer 4 having a thickness of more than 30 nm, the jitter of signal read out after recorded repeatedly 20,000 times is over 12.5%, namely, the durability against repeated recording is insufficient. Therefore, the recording layer 4 should preferably be 18 to 30 nm.

The phase-change optical disc 1 having the above-mentioned construction is produced as will be described by way of example in the following:

First, a substrate 2 having predetermined grooves formed thereon is formed from polycarbonate by injection molding. Then, a first dielectric layer 3 of ZnS—SiO$_2$ is formed on the substrate 2 by RF sputtering.

In the phase-change optical disc 1 according to the present invention, the first dielectric layer 3 should preferably be 70 to 130 nm thick. If the first dielectric layer 3 is thinner than 70 nm, the groove reflectivity will be low, so that no sufficient read signal can be provided. If the first dielectric layer 3 is thicker than 130 nm, the jitter of a signal read out after being recorded repeatedly 20,000 times is higher than 12.5%, so that the durability against repeated recording is insufficient. Therefore, the first dielectric layer 3 should preferably be 70 to 130 nm thick so that a sufficient read signal and durability against repeated recording can be assured.

Next, a recording layer 4 is formed on the first dielectric layer 3 by DC sputtering. In the manufacturing method according to the present invention, the recording layer 4 is formed from a GeSbTe alloy as the phase-change material at a speed X (nm/s) in an Ar gas atmosphere containing O$_2$ gas of which the mixing ratio O$_2$/Ar is Y(%), the parameters X and Y should preferably meet the following relations (1) and (4):

$Y \geq 2.3X+1.0$  (1)

$Y \leq 5.5X+2.7$  (4)

Thus, in the optical recording medium manufacturing method according to the present invention, since the forming conditions for the recording layer 4 are defined, the GeSbTe alloy forming the recording layer 4 is suitably oxidized. Thereby, the physical properties of the recording layer 4 are optimized for repeated recording and the durability against repeated recording are further improved. Therefore, the optical recording medium can be provided which is adapted to minimize the regional deterioration of a signal read out after being repeatedly recorded many times and to always keep a good write/read characteristic.

Note that the recording layer forming speed should preferably be over 0.1 nm/s and under 5.0 nm/s. Thus, the optical recording medium manufacturing method according to the present invention defines the recording layer forming speed as in the above to optimize the write/read characteristic of the recording layer 4, thereby providing an optical recording medium which keeps a good write/read characteristic even after repetitions of signal recording.

The recording layer 4 is formed from a composition of GeSbTe alloy falling in an area defined, in a ternary composition diagram of the three elements Ge, Sb and Te, by four points including the points J (26.0, 19.2, 54.8), K (21.0, 21.0, 58.0), L (14.3, 28.6, 57.1) and M (21.6, 24.4, 54.0).

Since the recording layer 4 is formed from such a composition, there is provided an optical recording medium in which the write/read characteristic of the recording layer 4 is optimized so that deterioration of a read signal after being recorded repeatedly can be minimized.

Next, a second dielectric layer 5 is formed on the recording layer 4 by RF sputtering. Then, a light-reflective layer 6 is formed on the second dielectric layer 5 using an Al target.

Next, the light-reflective layer 6 is coated with an ultraviolet-curable resin by spin coating, thereby finally producing a phase-change optical disc 1 according to the present invention.

It should be noted that to produce a double-sided phase-change optical disc 10 as shown in FIG. 2, two pieces of the above-mentioned phase-change optical disc 1 may be made and bonded to each other with their light-reflective layers 6 facing each other with an adhesive applied between the layers 6, by way of example.

Third embodiment

Similar to the phase-change optical disc 1 shown in FIG. 1, the phase-change optical disc according to the second embodiment of the present invention comprises a substrate 2, first dielectric layer 3, recording layer 4, second dielectric layer 5, light-reflective layer 6 and a protective layer 7 formed in this order on the substrate 2.

The phase-change optical disc according to the second embodiment is different only in the construction of the recording layer 4 from the first embodiment, having been described in the foregoing, while it comprises almost same component layers as the substrate 2, first dielectric layer 3, second dielectric layer 5, light-reflective layer 6 and the protective layer 7 of the phase-change optical disc 1 of the first embodiment. Therefore, the other component layers than the recording layer will not be described any longer but only the recording layer 4 will be discussed below.

The recording layer 4 is formed from a phase-change material changeable in state from crystalline to amorphous, or vice versa, under the focused spot of a laser beam or the like. Namely, the recoding layer 4 is an optical recording layer of which the phase can be changed under the focused spot of laser beam to write, erase or read information signal.

Specifically, the phase-change material of the recording layer 4 in the present invention is a calcogenide containing a GeSbTe alloy. The recording layer 4 should preferably be 18 to 30 nm thick.

It should be noted that the recording layer 4 of the present invention should preferably be formed by sputtering at a speed X (nm/s) in an Ar gas atmosphere containing $N_2$ gas of which the mixing ratio $N_2/Ar$ between the $N_2$ and Ar gases is Y(%), the parameters X and Y meeting the following relations (2) and (5):

$$Y \leq 12.8X + 16.7 \quad (2)$$

$$Y \geq 1.8X + 5.0 \quad (5)$$

Furthermore, the recording layer forming speed X should preferably be over 0.1 nm/s and under 5.0 nm/s. Namely, the speed X should preferably meet the following relation (6):

$$0.1 \leq X \leq 5 \quad (6)$$

Note that the mixing ratio $N_2/Ar$ is a flow ratio between the $N_2$ and Ar gases, in other words, a volume ratio between $N_2$ and Ar gases.

Recording Layer Forming Atmospheric Conditions and Speed X

The mixing ratio $N_2/Ar$ of Y(%) between the $N_2$ and Ar gases and the recording layer forming speed X (nm/s) for forming the recording layer 4 in the optical recording medium and in the optical recording medium manufacturing method according to the present invention, are defined by the relations (2), (5) and (6) as in the above for the reasons based on the following experiment results having been conducted on the embodiments of the present invention and comparative examples:

Relation Between Recording Layer Forming Atmospheric Conditions and Read Signal Characteristic First, a phase-change optical disc was made as will be discussed below:

First, a substrate 2 of 120 nm in diameter having a thickness of 0.6 mm was made. Then a first dielectric layer 3 of ZnS—$SiO_2$ having a thickness of 120 nm was formed on the substrate 2 by sputtering.

Next, a target of $Ge_2Sb_2Te_5$ was used on the first dielectric layer 3 and a recording layer 4 of GeSbTe having a thickness of 25 nm was formed by sputtering at a speed of 0.42 nm/s in an Ar gas atmosphere in which $N_2$ gas was mixed.

At this time, in the Ar gas atmosphere having mixed therein the $N_2$ gas, the mixing ratio $N_2/Ar$ was varied within a range of 0 to 20%, thereby making a plurality of phase-change optical discs each having the recording layer formed under different atmospheric conditions.

Next, a second dielectric layer 5 of ZnS—$SiO_2$ having a thickness of 15 nm and a light-reflective layer 6 of Al alloy having a thickness of 150 nm were formed in this order by sputtering on each of the recording layers 4 formed under the different conditions, and then a protective layer 7 was formed on the light-reflective layer 6 by applying an ultraviolet-curable resin, to make a phase-change optical disc 1.

Each type of the phase-change optical discs 1 thus made was duplicated. The two phase-change optical discs 1 of each type thus obtained were bonded to each other with their light-reflective layers 6 facing each other with an adhesive 9 applied between the layers 6. Finally, a double-sided phase-change optical disc 10 as shown in FIG. 2 was made in which write and record can be done with respect to either side thereof. Note that this phase-change optical discs 1 and 10 has a recording capacity of 3.0 GB per side and a track pitch of about 0.8 μm.

Each of the plurality of phase-change optical discs made under different recording layer forming conditions were initialized by crystallizing the recording layers 4 under the focused spot of a high-powered laser beam.

Then, a lighting pattern as shown in FIG. 3 was used to record a random EFM signal using a channel clock of 27.7 MHZ on each of these initialized phase-change optical discs. In FIG. 3, the recording power is indicated with a reference Ph, erasing power is with a reference P1, and the cooling power is with a reference Pc. In the lighting pattern shown in FIG. 3, one clock is indicated with 1T, and the pulse length of one lighting pulse is with 13 ns.

At this time, a recording/reproducing apparatus, or a disc drive, was used in which the linear velocity was 4.8 m/s, the recording power Ph is 14.5 mW, the erasing power P1 was 5.8 mW, and the cooling power Pc was 1.5 mW. The disc drive is provided with a laser which generates a laser beam of 650 nm in wavelength.

Under these conditions, a signal was recorded repeatedly 2 times to each of the phase-change optical discs.

Then, to evaluate the relation between the mixing ratio between $N_2$ and Ar gases used in forming the recording layer and the characteristic of read signal, jitter of a signal read from each of the phase-change optical discs after being recorded repeatedly 2 times, was measured.

Figure 32:
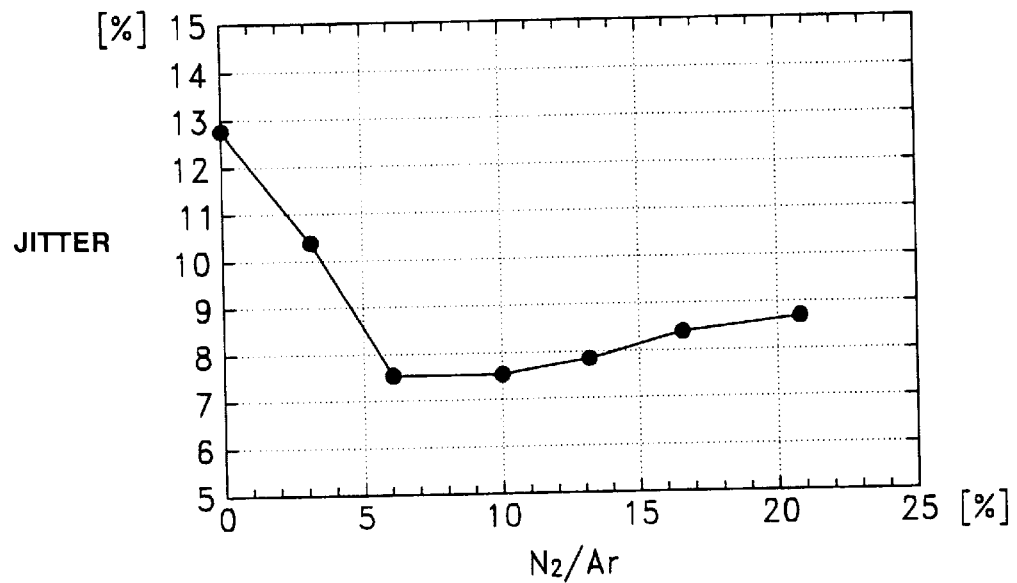
FIG. 32 graphically illustrates the relation between the mixing ratio $N_2/Ar$ in the recording layer forming atmosphere and read signal jitter when the recording layer forming speed is 0.42 nm/s.

The measurement results are shown in FIG. 32 of which the horizontal axis indicates the mixing ratio $N_2/Ar$ while the vertical axis indicates the jitter of a signal read from the optical disc after being recorded repeatedly 2 times on a same recording track. As a correctable jitter, 10% is taken here as a reference value for an acceptable media.

In the above-mentioned experiment, the jitter of a signal read out after being recorded repeatedly 2 times was measured for the following reasons. That is, the jitter of a signal read after being recorded 2 times is normally the highest and it tends to decrease gradually down to the 10,000th repetition of recording. That is why the jitter was measured on a signal read out after being recorded repeatedly 2 times.

As seen from the experiment results shown in FIG. 32, the jitter is the highest at 12.7% when the mixing ratio $N_2/Ar$ is 0%, namely, when no $N_2$ gas is contained in the Ar gas. It decreases as the $N_2$ content increases. The jitter is the lowest when the mixing ratio $N_2/Ar$ is 6 to 10%. As the the mixing ratio $N_2/Ar$ is further increased, the jitter is also increased gradually.

Therefore, the experiment results showed as seen from FIG. 32 that for the jitter of a signal read out after being recorded repeatedly to be under 10% at which a good read signal is obtained, the recording layer should preferably be formed in an Ar gas atmosphere of which the mixing ratio $N_2/Ar$ is over 6%.

Relation Between Recording Layer Forming Atmospheric Conditions and Groove Reflectivity Next, for evaluation of the relation between atmospheric conditions including a mixing ratio between $N_2$ and Ar gases under which the recording layer is formed and the groove reflectivity of each of the discs, the recording layer was formed under varied atmospheric conditions and each phase-change optical disc thus made was initialized. The groove reflectivity of each phase-change optical disc was measured.

Figure 33:
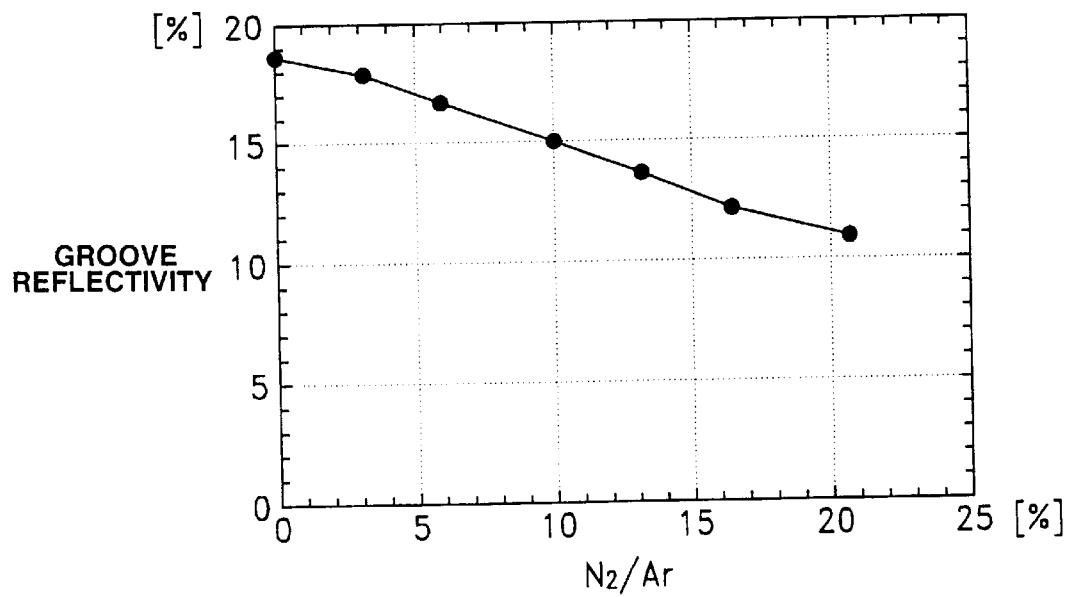
FIG. 33 graphically illustrates the relation between the mixing ratio $N_2/Ar$ in the recording layer forming atmosphere and groove reflectivity when the recording layer forming speed is 0.42 nm/s.

The experiment results are shown in FIG. 33 of which the horizontal axis indicates the mixing ratio $N_2/Ar$ and the vertical axis indicates the groove reflectivity.

As seen from the experiment results in FIG. 33, the groove reflectivity decreases monotonously as the mixing ratio $N_2/Ar$ is increased. When the mixing ratio $N_2/Ar$ is over 21%, the groove reflectivity is under 11%, so that no satisfactory modulation is possible.

Therefore, it is known from the experiment results shown in FIG. 33 that for a satisfactory signal modulation, the mixing ratio $N_2/Ar$ should be under 21% in the atmosphere in which the recording layer is formed.

Atmospheric Conditions Meeting Both Read Signal Characteristic and Groove Reflectivity Requirements As having been described in the above, the experiment results shown in FIGS. 32 and 33 reveal that in the optical recording medium and manufacturing method for the optical recording medium according to the present invention, when the recording layer is formed at a speed of 0.42 nm/s in an Ar gas atmosphere of which the mixing ratio $N_2/Ar$ should be 6 to 21% in order to satisfy both the requirements for the read signal jitter and groove reflectivity.

FIGS. 32 and 33 show the results of the experiments conducted on the optical discs having their respective recording layers formed at the speed of 0.42 nm/s. Therefore, to obtain similar read signal characteristics to those shown in FIGS. 32 and 33 when the recording layer forming speed varied, it is necessary to vary the mixing ratio $N_2/Ar$ as well.

Relation Among Atmospheric Conditions with the Recording Layer Forming Speed Changed, Read Signal Characteristic and Groove Reflectivity Next, a study was made on the mixing ratio $N_2/Ar$ meeting both the requirements for read signal jitter and groove reflectivity when the recording layer forming speed was varied.

Figure 34:
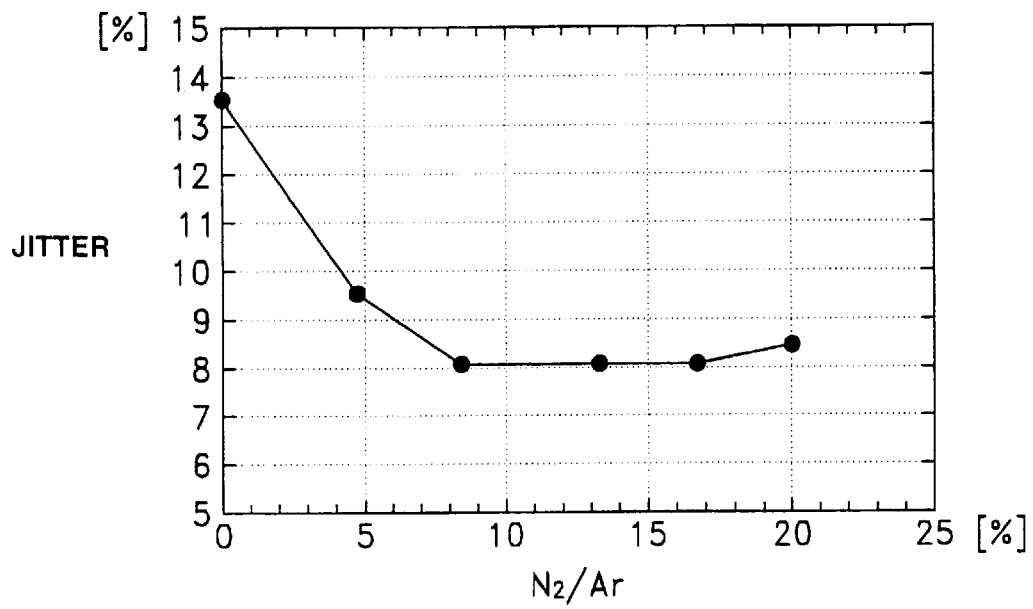
FIG. 34 graphically illustrates the relation between the mixing ratio $N_2/Ar$ in the recording layer forming atmosphere and read signal jitter when the recording layer forming speed is 0.1 nm/s.
Figure 35:
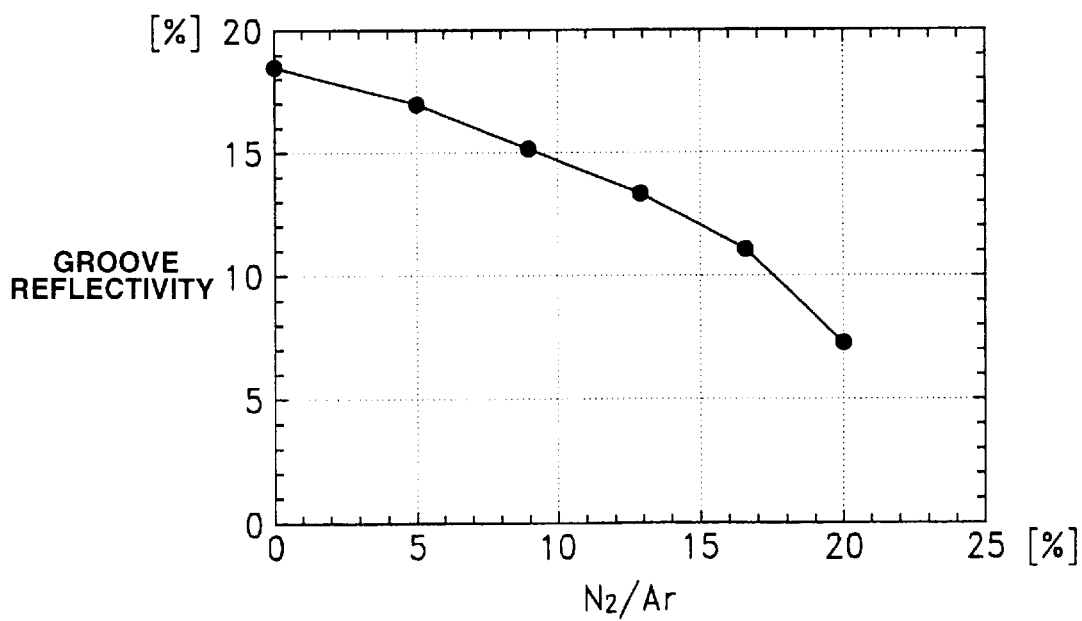
FIG. 35 graphically illustrates the relation between the mixing ratio $N_2/Ar$ in the recording layer forming atmosphere and groove reflectivity when the recording layer forming speed is 0.1 nm/s.

First, a double-sided optical disc was made under similar conditions to those in the experiment of which the results are shown in FIG. 32 except that the applied voltage to the target of $Ge_2Sb_2Te_5$ was varied, recording layer forming speed was 0.1 nm/s and the mixing ratio $N_2/Ar$ was varied in a range of 0 to 20%. As in the experiment of which the results are shown n FIG. 32, the jitter of a signal read out after being recorded repeatedly 2 times to the optical disc was measured. The measurement results are shown in FIG. 34. Also, the optical disc thus made was initialized under the atmospheric conditions varied as in the above with the recording layer forming speed of 0.1 nm/s. The groove reflectivity of the optical disc after being thus initialized was measured in the same manner as in the experiment of which the results are shown in FIG. 33. The measurement results are shown in FIG. 35.

Similarly, a phase-change optical disc was made by forming the recording layer at a speed of 1.6 nm/s in an Ar gas atmosphere of which the mixing ratio $N_2/Ar$ was varied as in the above. The jitter of a signal read out after being recorded repeatedly 2 times to the optical disc and groove reflectivity after the optical disc was initialized, were measured. The measurement results are shown in FIGS. 36 and 37.

Similarly, a phase-change optical disc was made by forming the recording layer at a speed of 5.0 nm/s in an Ar gas atmosphere of which the mixing ratio $N_2/Ar$ was varied as in the above. The jitter of a signal read out after being recorded repeatedly 2 times to the optical disc and groove reflectivity after the optical disc was initialized, were measured. The measurement results are shown in FIGS. 38 and 39.

Figure 36:
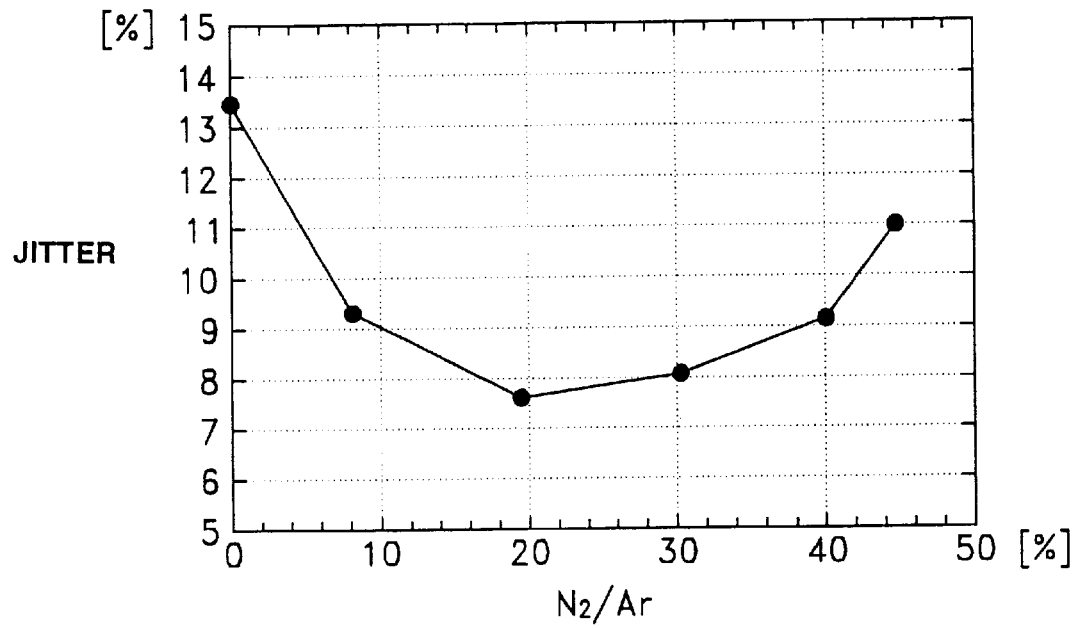
FIG. 36 graphically illustrates the relation between the mixing ratio $N_2/Ar$ in the recording layer forming atmosphere and read signal jitter when the recording layer forming speed is 1.6 nm/s.
Figure 37:
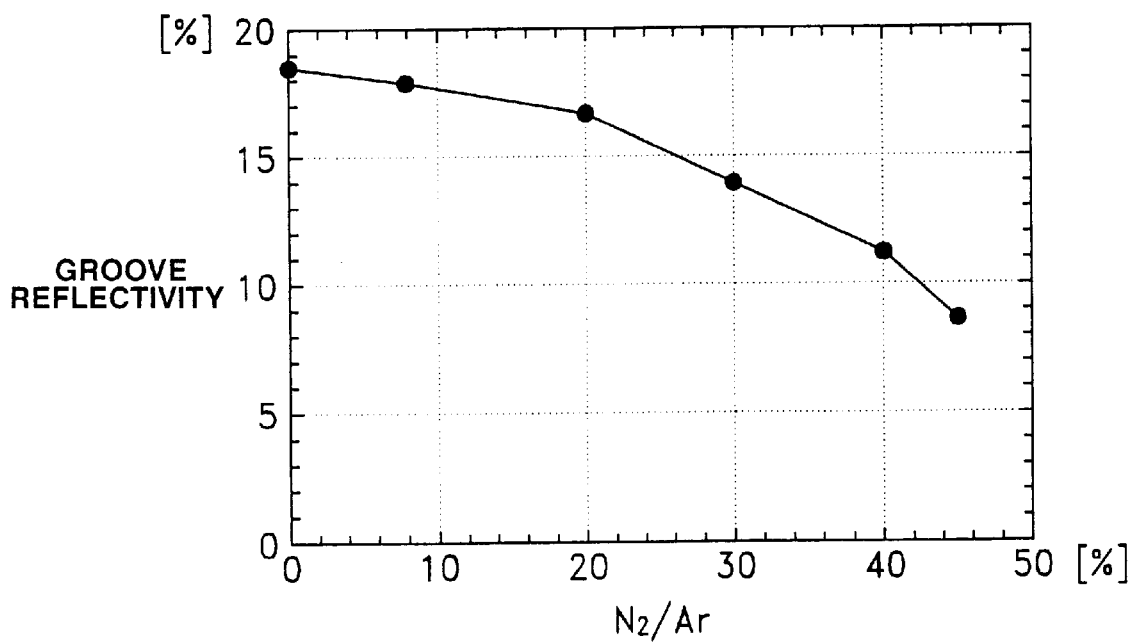
FIG. 37 graphically illustrates the relation between the mixing ratio $N_2/Ar$ in the recording layer forming atmosphere and groove reflectivity when the recording layer forming speed is 1.6 nm/s.
Figure 38:
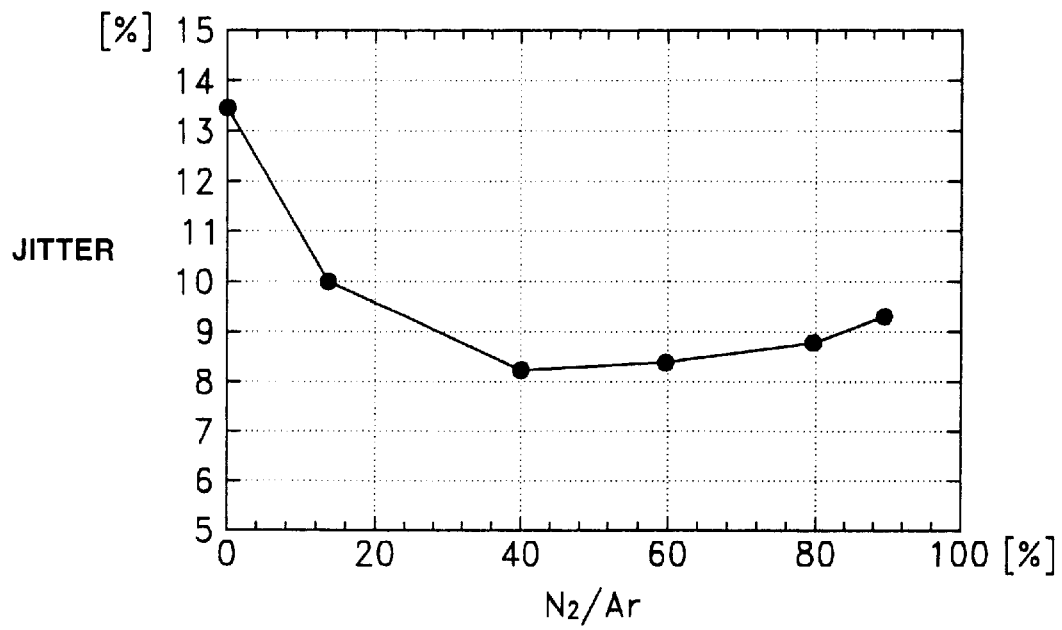
FIG. 38 graphically illustrates the relation between the mixing ratio $N_2/Ar$ in the recording layer forming atmosphere and read signal jitter when the recording layer forming speed is 5.0 nm/s.
Figure 39:
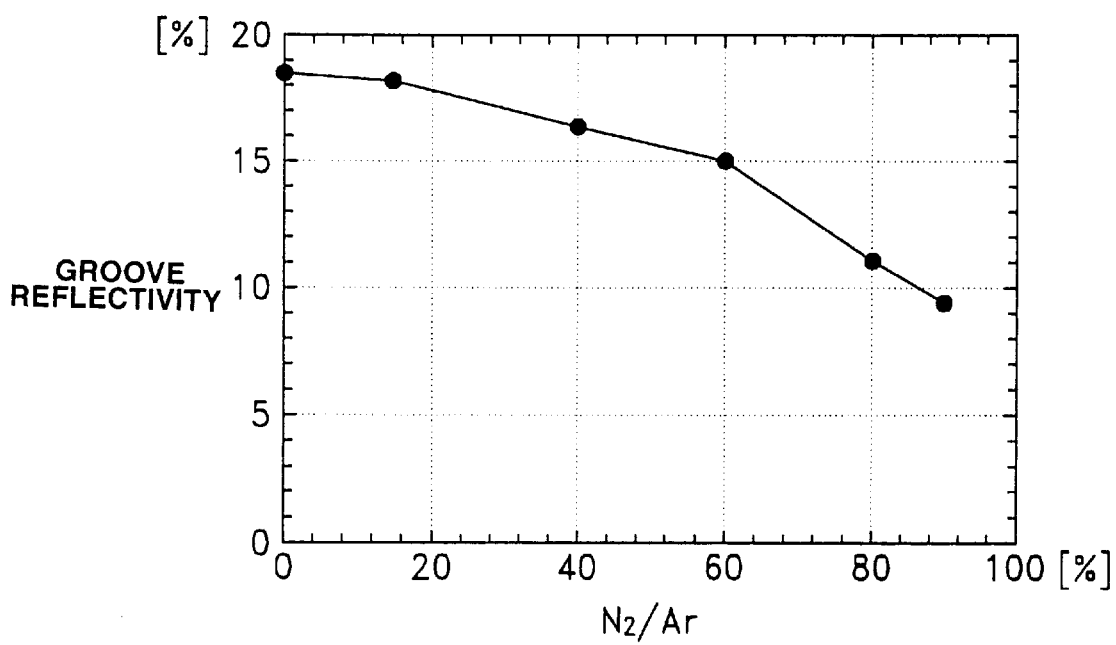
FIG. 39 graphically illustrates the relation between the mixing ratio $N_2/Ar$ in the recording layer forming atmosphere and groove reflectivity when the recording layer forming speed is 5.0 nm/s.

It was revealed from the experiment results in FIGS. 34, 36 and 38 that in the optical discs having their respective recording layers formed at the speeds of 0.1 nm/s, 1.6 nm/s and 5.0 nm/s, respectively, the mixing ratios $N_2/Ar$ resulting in a read signal jitter of under 10% at which a good rad signal can be obtained are over 5, 8 and 14%, respectively.

Also, as seen from the experiment results in FIGS. 35, 37 and 39, in the optical discs having their respective recording layers formed at the speeds of 0.1 nm/s, 1.6 nm/s and 5.0 nm/s, respectively, the mixing ratios $N_2/Ar$ resulting in a groove reflectivity of over 11% are below 17, 40 and 80%, respectively.

Recording Layer Forming Conditions Meeting Both Read Signal Characteristic and Groove Reflectivity Requirements As mentioned above, the experiment results shown in FIGS. 32, 34, 36 and 38 reveal that in the optical discs having their respective recording layers formed at the speeds of 0.42 nm/s, 0.1 nm/s, 1.6 nm/s and 5.0 nm/s, respectively, the mixing ratios $N_2/Ar$ resulting in a read signal jitter of under 10% are 6, 5, 8 and 14%, respectively. The results are graphically illustrated in FIG. 40 with the recording layer forming speed indicated along the horizontal axis and the mixing ratio $N_2/Ar$ indicated along the vertical axis to define a straight line $\alpha$.

Figure 40:
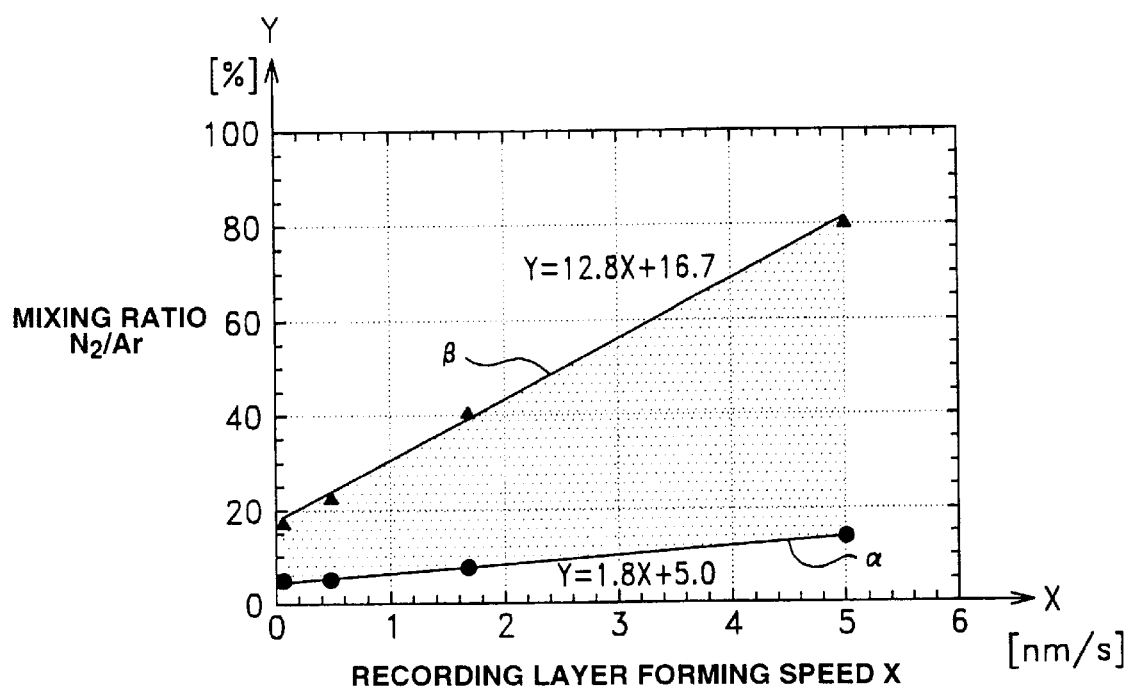
FIG. 40 graphically illustrates the relation between the recording layer forming speed and mixing ratio $N_2/Ar$ in the recording layer forming atmosphere.

In FIG. 40, the horizontal axis indicates the recording layer forming speed X (nm/s) while the vertical axis indicates the mixing ratios $N_2/Ar$ as Y(%). The line a is expressed by $Y=1.8X+5.0$. In the area under the line a, the read signal jitter is over 10% and thus no quality read signal can be provided.

On the other hand, as described in the foregoing, the experiment results shown in FIGS. 33, 35, 37 and 39 reveal that in the optical discs having their respective recording layers formed at the speeds of 0.42 nm/s, 0.1 nm/s, 1.6 nm/s and 5.0 nm/s, respectively, the mixing ratios $N_2/Ar$ result in a groove reflectivity of over 11% are 21, 17, 40 and 80%, respectively. The results are graphically illustrated in FIG. 40 with the recording layer forming speed indicated along the horizontal axis and the mixing ratio $N_2/Ar$ indicated along the vertical axis to define a straight line $\beta$.

The line $\beta$ is expressed by $Y=12.8X+16.7$. In the area above the line $\beta$, the groove reflectivity is under 11% and thus no satisfactory signal modulation is possible.

If the recording layer forming speed X is higher than 5.0 nm/s, it is too high to assure a recording layer forming time long enough to adjust the recording layer thickness. If the speed X is slower than 0.1 nm/s, the recording layer forming takes a longer time, which is an inconvenience for the practice of manufacture. Therefore, the recording layer forming speed should preferably be $0.1 \leq X \leq 5.0$ (relation (6)).

As evident from the foregoing description, the phase-change optical disc 1 according to the present invention should preferably have a recording layer of GeSbTe formed by sputtering at a speed X (nm/s) in an Ar gas atmosphere containing $N_2$ gas of which the mixing ratio $N_2/Ar$ between the $N_2$ and Ar gases is Y(%), the parameters X and Y meeting the following relations (2) and (5). Thus the GeSbTe alloy forming the recording layer 4 will be suitably nitrated so that the write/read characteristic of the recording layer 4 is optimized. As a result, the phase-change optical disc 1 according to the present invention meets both the requirements for the read signal jitter and groove reflectivity to minimize the deterioration of a signal read out even after recorded repeatedly and thus to always keep a stable write/read characteristic.

$$Y \leq 12.8X+16.7 \tag{2}$$

$$Y \geq 1.8X+5.0 \tag{5}$$

At this time, the recording layer 4 should preferably be formed at a speed X of $0.1 \leq X \leq 5.0$ as previously mentioned for the phase-change optical disc 1 according to the present invention.

FIG. 15 is a ternary composition diagram showing a composition of the material for the recording layer 4 for use in the present invention. In the ternary composition diagram (of the three elements Ge, Sb and Te), the GeSbTe alloy is a composition falling in an area defined by four points including J (26.0, 19.2, 54.8), K (21.0, 21.0, 58.0), L (14.3, 28.6, 57.1) and M (21.6, 24.4, 54.0).

Composition of Phase-Change Material for the Recording Layer

As mentioned in the foregoing, the reason why the Ge—Sb—Te composition of the recording layer 4 is thus defined is based on the experiment results which will be described in detail below:

Composition on Line Connecting $Ge_{50}$ and $Sb_{40}Te_{60}$ in Ternary Composition Diagram of Three Elements Ge, Sb and Te First, a first dielectric layer 3 of ZnS—$SiO_2$ having a thickness of 120 nm was formed on a substrate 2 by sputtering.

Next, a recording layer 4 of GeSbTe having a thickness of 25 nm was formed on the first dielectric layer 3 by sputtering at a speed of 0.42 nm/s in an Ar gas atmosphere of which the mixing ratio $N_2/Ar$ was 10%.

At this time, the recording layer 4 was formed by sputtering using a target of $Ge_2Sb_2Te_5$, target of Ge and a target of Sb.

First, consideration was made of a phase-change optical disc having a recording layer made of a composition on a straight line 11 connecting the points $Ge_{50}Te_{50}$ and $Sb_{40}Te_{60}$ about the point C (2, 2, 5) as shown in FIG. 16 being also a ternary composition diagram of the Ge, Sb and Te elements. More specifically, the $Ge_2Sb_2Te_5$ target was co-sputtered while the mixing ratio between the forming speeds for the Ge and Te targets was being kept at 1, to form a recording layer 4 from a composition between points $Ge_{50}Te_{50}$ and $Ge_2Sb_2Te_5$ as in FIG. 16.

Then, a second dielectric layer 5 of ZnS—$SiO_2$ having a thickness of 15 nm and a light-reflective layer 6 of Al alloy having a thickness of 150 nm were formed in this order onto the recording layer 4 by sputtering, and thereafter, an ultraviolet resin or similar was applied to the light-reflective layer 6 to form a protective layer 7, thereby providing a phase-change optical disc 1.

Finally, two pieces of phase-change optical discs 1 were produced. The two phase-change optical discs 1 thus obtained were bonded to each other with their light-reflective layers 6 facing each other with an adhesive applied between the light-reflective layer 6, to provide a double-sided phase-change optical disc of 120 mm in diameter and 1.2 mm in thickness.

Similarly, a phase-change optical disc was made of which only the recording layer 4 was made of a different material from the above-mentioned. More specifically, the $Ge_2Sb_2Te_5$, Sb and Te targets were co-sputtered while the forming speeds for the Sb and Te targets were kept at 0.67 nm/s to form a recording layer 4 made of a composition between points $Sb_{40}Te_{60}$ and $Ge_2Sb_2Te_5$ as in FIG. 16.

The lighting pattern shown in FIG. 3 was used to record a signal once to the phase-change optical disc thus having the recording layer 4 made of a composition on a straight line 11 under the similar conditions to those in the experiment of which the results are shown in FIG. 32, and the jitter of the signal read from the phase-change optical disc was measured. The recorded signal was a random EFM signal.

Figure 41:
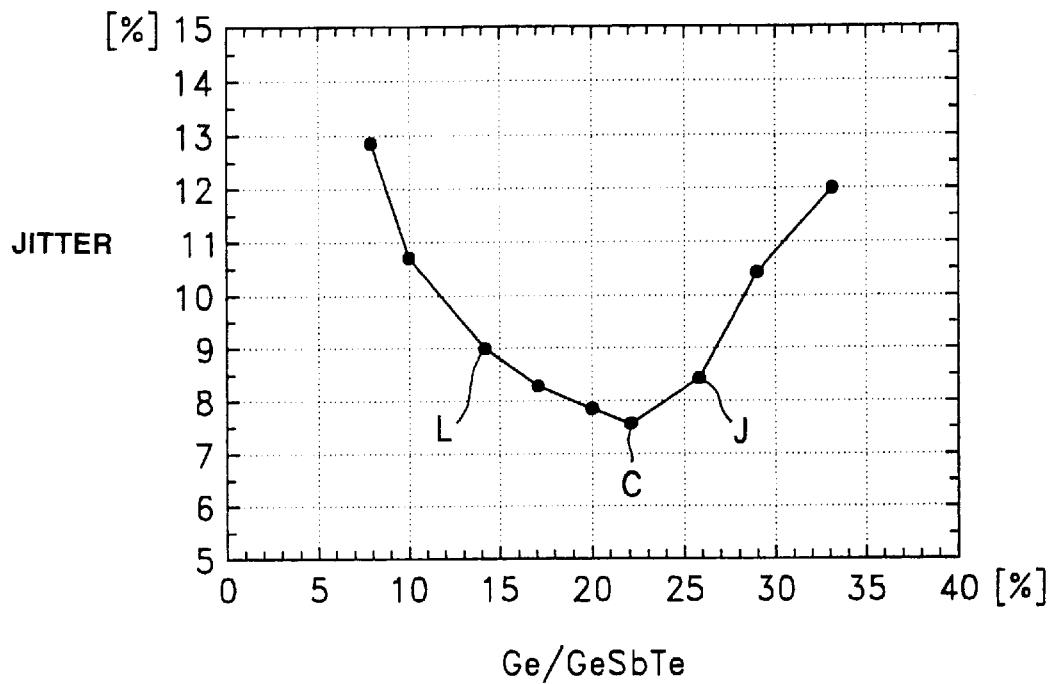
FIG. 41 graphically illustrates the relation between the Ge content in the GeSbTe alloy as the material for the recording layer and read signal jitter.

The measurement results are shown in FIG. 41 of the horizontal axis indicates the mixing ratio of Ge in a composition on the straight line 11 connecting points $Ge_{50}Te_{50}$ and $Sb_{40}Te_{60}$ and the vertical axis indicates the jitter of the signal read out after recorded once. It should be noted that the points J, L and C in FIG. 41 correspond to the points J (26.0, 19.2, 54.8), L (14.3, 28.6, 57.1) and C (2, 2, 5), respectively, in FIG. 15.

As apparent from the results shown in FIG. 41, when the recording layer 4 is made of a composition having a larger Ge content than at the point J (26.0, 19.2, 54.8) in the ternary composition diagram of the elements Ge, Sb and Te, the jitter is over 10%, and when the recording layer 4 is made of a composition having a smaller Ge content than at the point L (14.3, 28.6, 57.1), the jitter is over 10%. Therefore, the composition on the straight line 11 connecting the points $Ge_{50}Te_{50}$ and $Sb_{40}Te_{60}$ should preferably be one on the line connecting the points J and L as shown in FIG. 15.

Composition Having Larger Te Content than at Point C (2, 2, 5) in Ternary Composition Diagram of Elements Ge, Sb and Te Next, a phase-change optical disc was made which having a recording layer made of a composition having a larger Te content than at the point C (2, 2, 5). More particularly, $Ge_2Sb_2Te_5$ and Te targets were co-sputtered to make a phase-change optical disc having a recording layer 4 formed from a composition on a straight line 12 from the point C.

For the phase-change optical disc having the recording layer 4 thus formed from the composition on the straight line 12, the jitter of a signal read out after being recorded once was measured as in the experiment of which the results are shown in FIG. 41.

Figure 42:
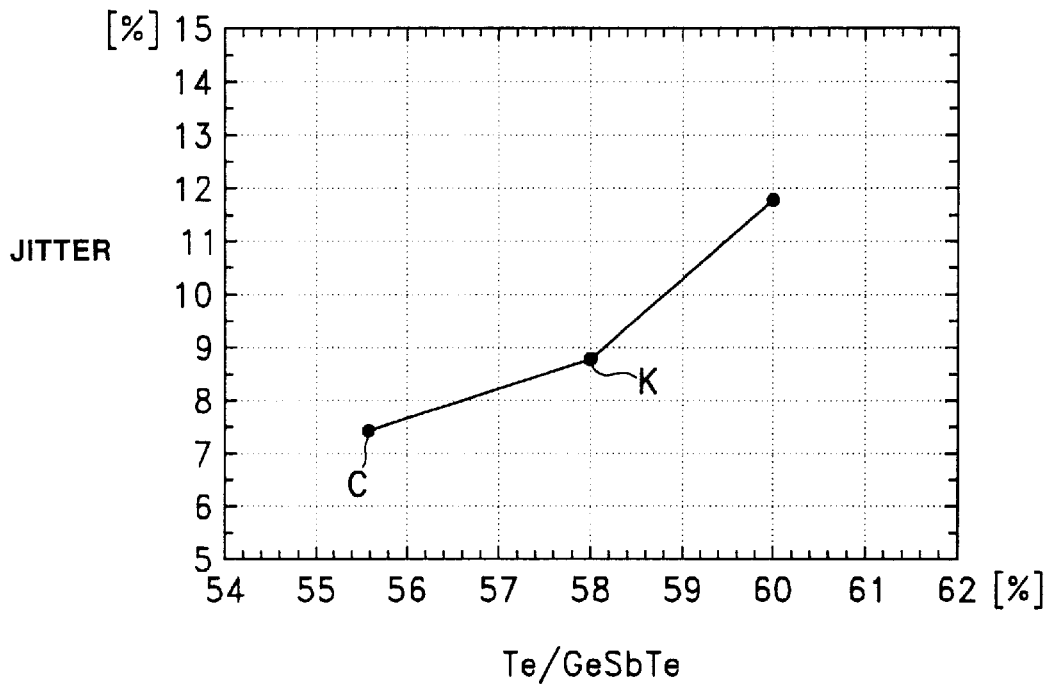
FIG. 42 graphically illustrates the relation between the Te content in the GeSbTe alloy as the material for the recording layer and read signal jitter.

The measurement results are shown in FIG. 42 of which the horizontal axis indicates the mixing ratio of Te in the composition on the straight line 12 connecting the points $Ge_2Sb_2Te_5$ and Te and the vertical axis indicate the jitter of a read signal. It should be noted that the points C and K in FIG. 42 correspond to the points C (2, 2, 5) and K (21.0, 21.0, 58.0) shown in FIG. 15.

As revealed from the results shown in FIG. 42, the recording layer 4 should preferably be formed from a composition on the line connecting the points C (2, 2, 5) and K (21.0, 21.0, 58.0) as shown in FIG. 15.

Composition Having Larger Sb Content than at Point C (2, 2, 5) in Ternary Composition Diagram of Elements Ge, Sb and Te Next, a phase-change optical disc was made having a recording layer made of a composition having a larger Sb content than at the point C (2, 2, 5). More particularly, $Ge_2Sb_2Te_5$ and Sb targets were co-sputtered to make a phase-change optical disc having a recording layer 4 formed from a composition on a straight line 13 from the point C.

Figure 43:
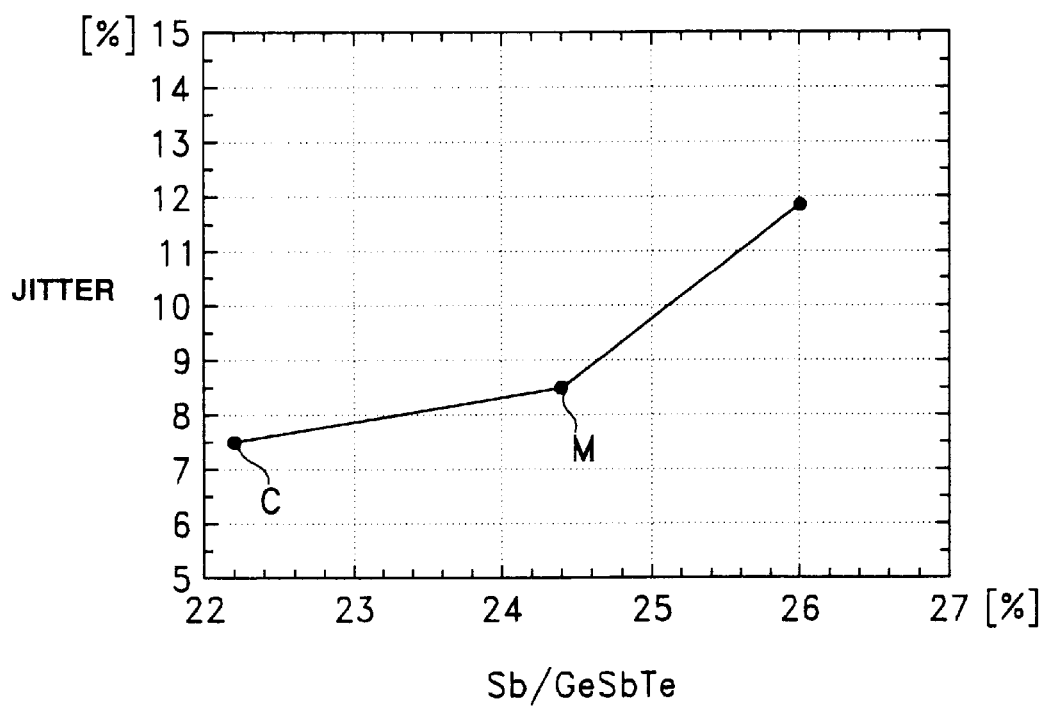
FIG. 43 graphically illustrates the relation between the Sb content in the GeSbTe alloy as the material for the recording layer and read signal jitter.

For the phase-change optical disc having the recording layer 4 thus formed from the composition on the straight line 13, the jitter of a signal read out after being recorded repeatedly 20,000 times was measured as in the experiment of which the results are shown in FIG. 41. The measurement results are shown in FIG. 43 of which the horizontal axis indicates the mixing ratio of Sb in the composition on the straight line 13 connecting the points $Ge_2Sb_2Te_5$ and Sb and the vertical axis indicate the jitter of a read signal. It should be noted that the points M and C in FIG. 43 correspond to the points M (21.6, 24.4, 54.0) and C (2, 2, 5) shown in FIG. 15.

As revealed from the results shown in FIG. 43, the recording layer 4 should preferably be formed from a composition on the line connecting the points M (21.6, 24.4, 54.0) and C (2, 2, 5) as shown in FIG. 15.

Suitable Composition for the Recording Layer in the Present Invention

The aforementioned results showed that the composition of the GeSbTe alloy as the material of the recording layer in the phase-change optical disc 1 according to the present invention should preferably fall in an area defined the four points including J (26.0, 19.2, 54.8), K (21.0, 21.0, 58.0), L (14.3, 28.6, 57.1) and M (21.6, 24.4, 54.0) as shown in FIG. 15.

Since the composition of a phase-change material for the recording layer 4 in the phase-change optical disc 1 of the present invention is defined as in the above, write/read characteristic of the recording layer 4 is optimized, the durability against repeated recording is improved, and thus deterioration of read signal is minimized. As a result, the phase-change optical disc 1 always keeps a stable write/read characteristic even after repetitions of signal recording.

The recording layer 4 in the present invention should preferably be 18 to 30 nm for the reasons based on the following experiment results:

First, a first dielectric layer 3 of ZnS—SiO$_2$ having a thickness of 120 nm was formed on a substrate 2 by sputtering.

Then, a recording layer of Ge$_2$Sb$_2$Te$_5$ was formed on the first dielectric layer 3 by sputtering at a speed of 0.42 nm/s in an Ar gas atmosphere of which the mixing ratio N$_2$/Ar was 10%. The recording layer 4 was formed with the thickness varied in a range of 15 to 40 nm, and thus there were made a plurality of substrates 2 with the recording layers 4 different in thickness from one to another.

Next, a second dielectric layer 5 of ZnS—SiO$_2$ of 15 nm and a light-reflective layer 6 of Al alloy having a thickness of 150 nm were formed in this order by sputtering on each of the recording layers 4 different in thickness from one to another and thereafter a protective layer was formed on the light-reflective layer by applying an ultraviolet-curable resin to the light-reflective layer, thereby forming a phase-change optical disc 1.

The plurality of phase-change optical discs thus formed with the recording layers 4 different in thickness from one to another were initialized, and a lighting pattern as shown in FIG. 3 was used to record random EFM signal to the phase-change optical discs and the jitter of the read-out random EFM signal was measured. At this time, the linear velocity was 4.8 m/s, and the recording power Ph, erasing power Pl and cooling power Pc were set for a minimum jitter of the signal read out after recorded once.

The above experiment results showed that since the recording layer 4 having a thickness of less than 18 nm in the phase-change optical disc 1 thus made is weak, a high-powered laser beam of a recording power Ph of 15 mW cannot be used to make repetitions of recording with respect to such a recording layer 4. In a phase-change optical disc 1 with a recording layer 4 having a thickness of more than 30 nm, the jitter of signal read out after being recorded repeatedly 10,000 times is over 12.5%, namely, the durability against repeated recording is insufficient. Therefore, the recording layer 4 should preferably be 18 to 30 nm.

The phase-change optical disc 1 having the above-mentioned construction is produced as will be described by way of example in the following:

First, a substrate 2 having predetermined grooves formed thereon is formed from polycarbonate by injection molding. Then, a first dielectric layer 3 of ZnS—SiO$_2$ is formed on the substrate 2 by RF sputtering.

Next, a recording layer 4 is formed on the first dielectric layer 3 by DC sputtering. In the manufacturing method according to the present invention, the recording layer 4 is formed from a GeSbTe alloy as the phase-change material at a speed X (nm/s) in an Ar gas atmosphere containing N$_2$ gas of which the mixing ratio N$_2$/Ar is Y(%), the parameters X and Y should preferably meet the following relations (2) and (5):

$$Y \leq 12.8X + 16.7 \quad (2)$$

$$Y \geq 1.8X + 5.0 \quad (5)$$

Thus, in the optical recording medium manufacturing method according to the present invention, since the forming conditions for the recording layer 4 are defined, the GeSbTe alloy forming the recording layer 4 is suitably nitrated. Thereby, the write/read characteristic of the recording layer 4 are optimized. As a result, in the manufacturing method for the optical recording medium according to the present invention, deterioration of read signal after being repeatedly recorded can be minimized. Namely, the present invention can provide an optical recording medium capable of always keeping a stable write/read characteristic even after repetitions of signal recording.

Note that the recording layer forming speed should preferably be over 0.1 nm/s and under 5.0 nm/s. Thus, the optical recording medium manufacturing method according to the present invention defines the recording layer forming speed as in the above to optimize the write/read characteristic of the recording layer 4, thereby providing an optical recording medium which keeps a stable write/read characteristic even after repetitions of signal recording.

The recording layer 4 is formed from a composition of GeSbTe alloy falling in an area defined, in a ternary composition diagram of the three elements Ge, Sb and Te, by four points including the points J (26.0, 19.2, 54.8), K (21.0, 21.0, 58.0), L (14.3, 28.6, 57.1) and M (21.6, 24.4, 54.0).

Since the recording layer 4 is formed from such a composition, there is provided an optical recording medium in which the write/read characteristic of the recording layer 4 is optimized so that deterioration of a signal read out after being recorded repeatedly can be minimized.

Next, a second dielectric layer 5 of ZnS—SiO$_2$ is formed on the recording layer 4 by RF sputtering. Then, a light-reflective layer 6 is formed on the second dielectric layer 5 using an Al target.

Next, the light-reflective layer 6 is coated with an ultraviolet-curable resin by spin coating, thereby finally producing a phase-change optical disc 1 according to the present invention.

It should be noted that to produce a double-sided phase-change optical disc 10 as shown in FIG. 2, two pieces of the above-mentioned phase-change optical disc 1 may be made and bonded to each other with their light-reflective layers 6 facing each other with an adhesive applied between the layers 6, by way of example.

EXPERIMENTS

The following experiments were conducted on the examples of the optical recording medium manufacturing method according to the present invention and comparative examples of optical recording medium in order to evaluate the effect of the manufacturing method:

First Experiment

In this experiment, the effect of the Ar gas containing N$_2$ and O$_2$ gases as a sputtering gas used in forming the recording layer was studied.

First Example

First, a substrate having grooves formed along recording tracks thereof was made from polycarbonate, and a first dielectric layer of ZnS—SiO$_2$ having a thickness of 120 nm was formed on the substrate.

Next, a recording layer of Ge$_2$Sb$_2$Te$_5$ having a thickness of 25 nm was formed on the first dielectric layer at a speed of 0.42 nm/s in an atmosphere of which the mixing ratio $(N_2+O_2)/Ar$ of $N_2$ and $O_2$ gases with Ar gas was 10% and the mixing ratio $O_2/(N_2+O_2)$ of the $O_2$ gas with the $N_2$ gas was 20%.

Thereafter, a second dielectric layer of $ZnS$—$SiO_2$ having a thickness of 15 nm, and a light-reflective layer of Al alloy having a thickness of 150 nm, were formed in this order on the recording layer by sputtering. Further an ultraviolet-curable resin was applied to the light-reflective layer by spin coating to form a protective layer of 10 μm in thickness, thereby providing a phase-change optical disc.

First Comparative Example

On the other hand, a phase-change optical disc was made by effecting a similar process to that for the first example except that an Ar gas atmosphere containing no $N_2$ and $O_2$ gases, namely, containing only Ar gas, was used for forming a recording layer therein.

The first example and first comparative example of phase-change optical disc were initialized. Thereafter, the lighting pattern shown in FIG. 3 was used to record a random EFM signal repeatedly to these phase-change optical discs and the jitters of the signal read out at appropriate times from the optical discs were measured.

Figure 44:
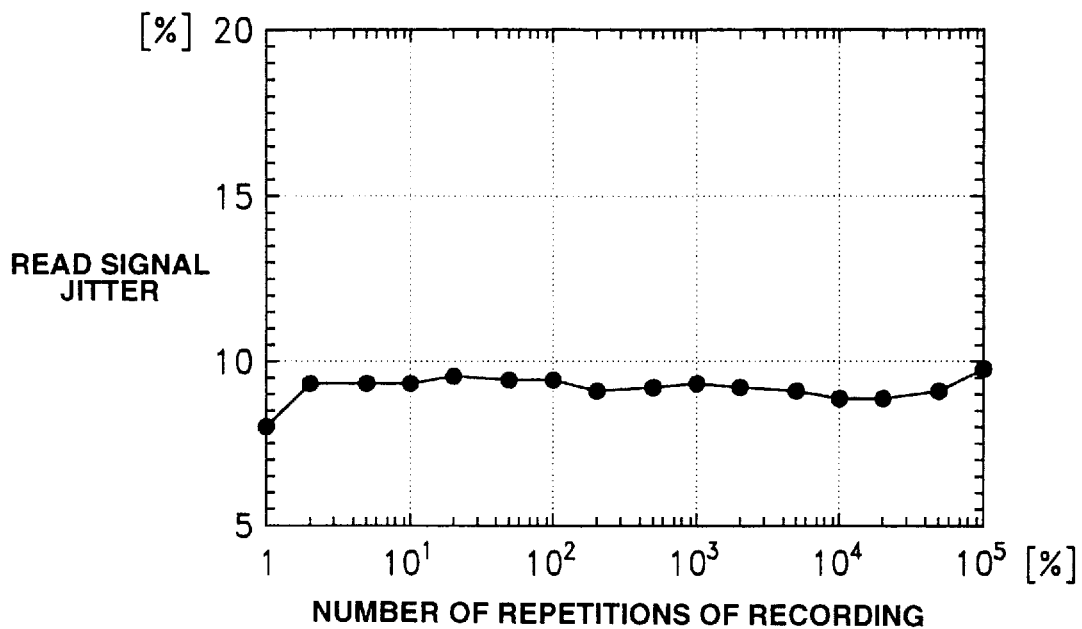
FIG. 44 graphically illustrates the relation between the number of repetitions of recording and read signal jitter in an example of the first experimental embodiment of the phase-change optical disc according to the present invention.
Figure 45:
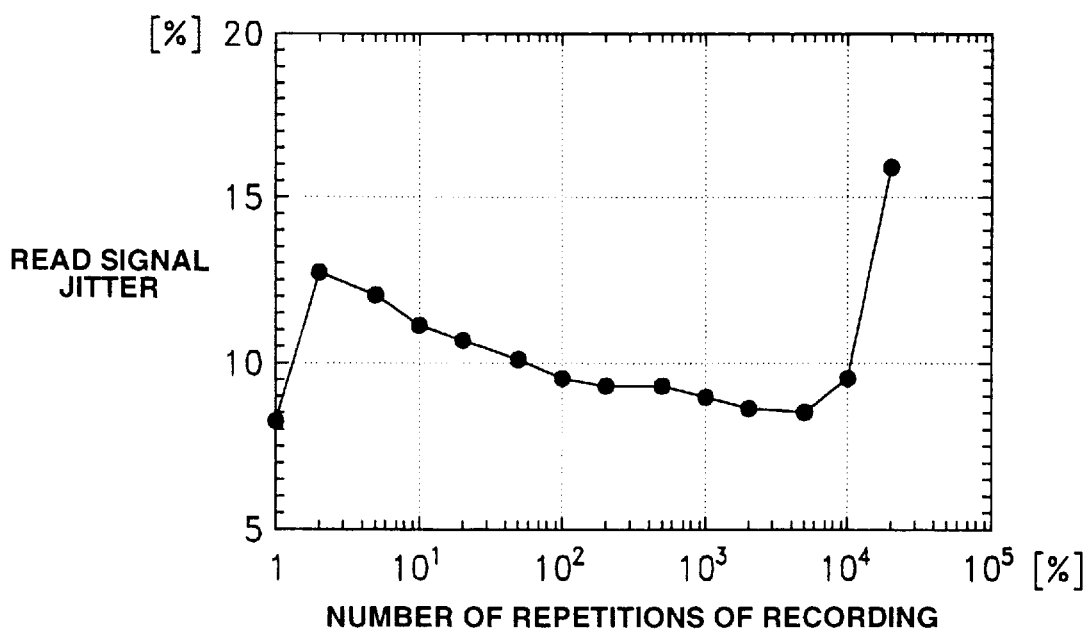
FIG. 45 graphically illustrates the relation between the number of repetitions of recording and read signal jitter in a comparative example of the first experimental embodiment.

The measurement results of the first example are shown in FIG. 44, and those of the first comparative example are shown in FIG. 45.

As mentioned above, the recording layer in the first example of phase-change optical disc was formed in the Ar atmosphere containing the $N_2$ and $O_2$ gases at a predetermined ratio according to the present invention. As seen from the experiment results shown in FIG. 44, there is found no increased jitter in the signal read out after being recorded repeatedly the second and subsequent times and the jitter measured on the signals read out after being recorded repeatedly up to 100,000 times is substantially stable and less than 12.5%.

On the other hand, the recording layer in the first comparative example of phase-change optical disc was formed in the Ar atmosphere containing no $N_2$ and $O_2$ gases. As seen from the experiment results shown in FIG. 45, the jitter is regionally increased after the second to 10th repetitions of recording, and increases drastically after the number of repetitions of recording exceeds 10,000 recordings.

The experiment results proved that the formation of the recording layer at the predetermined speed in the Ar gas atmosphere having predetermined contents of $N_2$ and $O_2$ gases is effective to minimize the regional increase of jitter found in a signal read out after being recorded repeatedly a small number of times such as a few times and also the drastic increase of jitter found in the signal read out after being recorded repeatedly tens of thousands of times is also avoided.

Second Experiment

In this experiment, the effect of the Ar gas containing $O_2$ gas as a sputtering gas used in forming the recording layer was studied.

Second Example

After a first dielectric layer of $ZnS$—$SiO_2$ having a thickness of 90 nm was formed on a substrate, a recording layer of $Ge_2Sb_2Te_5$ having a thickness of 25 nm was formed on the first dielectric layer at a speed of 0.42 nm/s in an Ar gas atmosphere containing $O_2$ gas at a ratio $O_2/Ar$ of 10% with the Ar gas. Further, a second dielectric layer of $ZnS$—$SiO_2$ having a thickness of 15 nm, and a light-reflective layer of Al alloy having a thickness of 150 nm, were formed in this order on the recording layer by sputtering. Thereafter, an ultraviolet-curable resin was applied to the light-reflective layer to form a protective layer of 10 nm in thickness, thereby providing a phase-change optical disc.

Second Comparative Example

On the other hand, a phase-change optical disc was made by effecting a similar process to that for the second example except that an Ar gas atmosphere containing no $O_2$ gas, namely, containing only Ar gas, was used for forming a recording layer therein.

Figure 46:
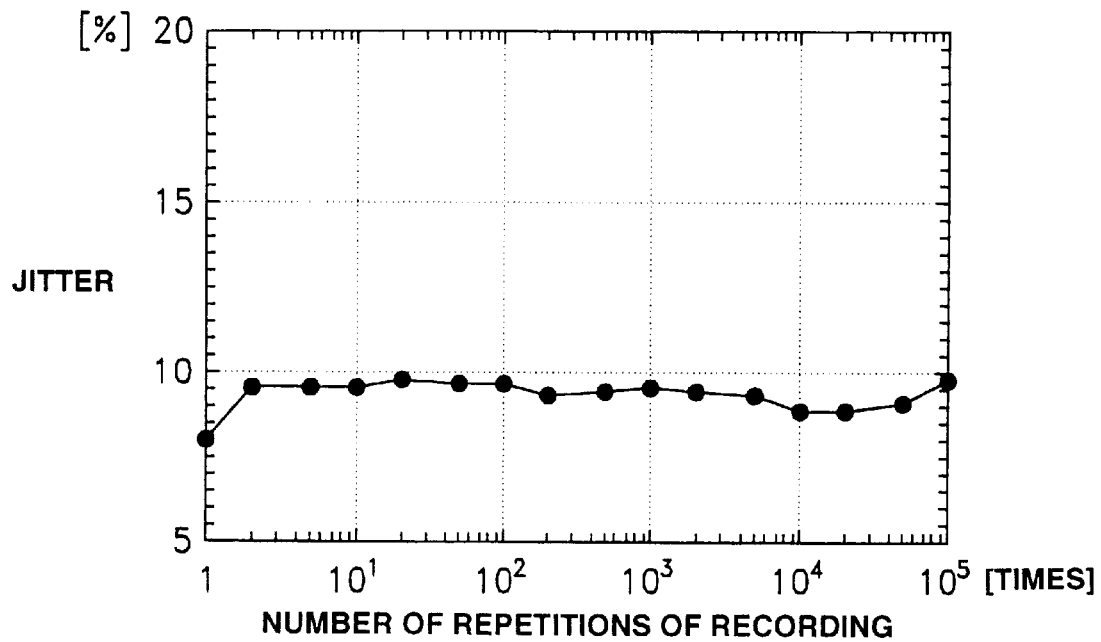
FIG. 46 graphically illustrates the relation between the number of repetitions of recording and read signal jitter in an example of the second experimental embodiment of the phase-change optical disc according to the present invention.
Figure 47:
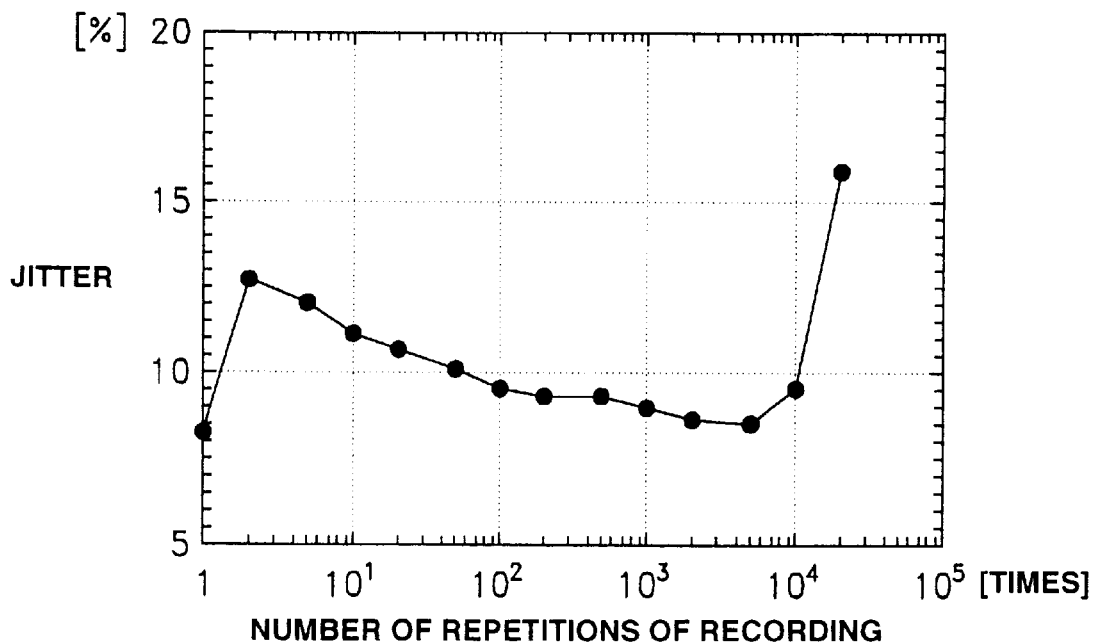
FIG. 47 graphically illustrates the relation between the number of repetitions of recording and read signal jitter in a comparative example of the second experimental embodiment.

The second example and second comparative example of phase-change optical disc were initialized. Thereafter, the lighting pattern shown in FIG. 3 was used to record a random EFM signal repeatedly to these phase-change optical discs and the jitters of the signal read out at appropriate times from the optical discs were measured. The measurement results of the second example are shown in FIG. 46, and those of the second comparative example are shown in FIG. 47.

As mentioned above, the recording layer in the second example of phase-change optical disc was formed in the Ar atmosphere containing the $O_2$ gas at a predetermined ratio according to the present invention. As seen from the experiment results shown in FIG. 46, there is found only a small increase of jitter in the signal read out after being recorded repeatedly the second and subsequent times and the jitter measured on the signals read out after being recorded repeatedly up to 100,000 times is less than 10%, thus a stable write/read characteristic of the phase-change optical disc is assured.

On the other hand, the recording layer in the second comparative example of phase-change optical disc was formed in the Ar atmosphere containing no $O_2$ gas. As seen from the experiment results shown in FIG. 47, the jitter increases drastically after the number of repetitions of recording exceeds 20,000 recordings.

The experiment results proved that the formation of the recording layer at the predetermined speed in the Ar gas atmosphere having the predetermined content of $O_2$ gas enables to provide a phase-change optical disc capable of a good read signal even after being recorded repeatedly many times.

Third Experiment

In this experiment, the effect of the Ar gas containing $N_2$ gas as a sputtering gas used in forming the recording layer was studied.

Third Example

After a first dielectric layer of $ZnS$—$SiO_2$ having a thickness of 120 nm was formed on a substrate, a recording layer of $Ge_2Sb_2Te_5$ having a thickness of 25 nm was formed on the first dielectric layer at a speed of 0.42 nm/s in an Ar gas atmosphere containing $N_2$ gas at a ratio $N_2/Ar$ of 10% with the Ar gas. Further, a second dielectric layer of $ZnS$—$SiO_2$ having a thickness of 15 nm, and a light-reflective layer of Al alloy having a thickness of 150 nm, were formed in this order on the recording layer by sputtering. Thereafter, an ultraviolet-curable resin was applied to the light-reflective layer to form a protective layer of 10 nm in thickness, thereby providing a phase-change optical disc.

Third Comparative Example

On the other hand, a phase-change optical disc was made by effecting a similar process to that for the second example except that an Ar gas atmosphere containing no $N_2$ gas, namely, containing only Ar gas, was used for forming a recording layer therein.

Figure 48:
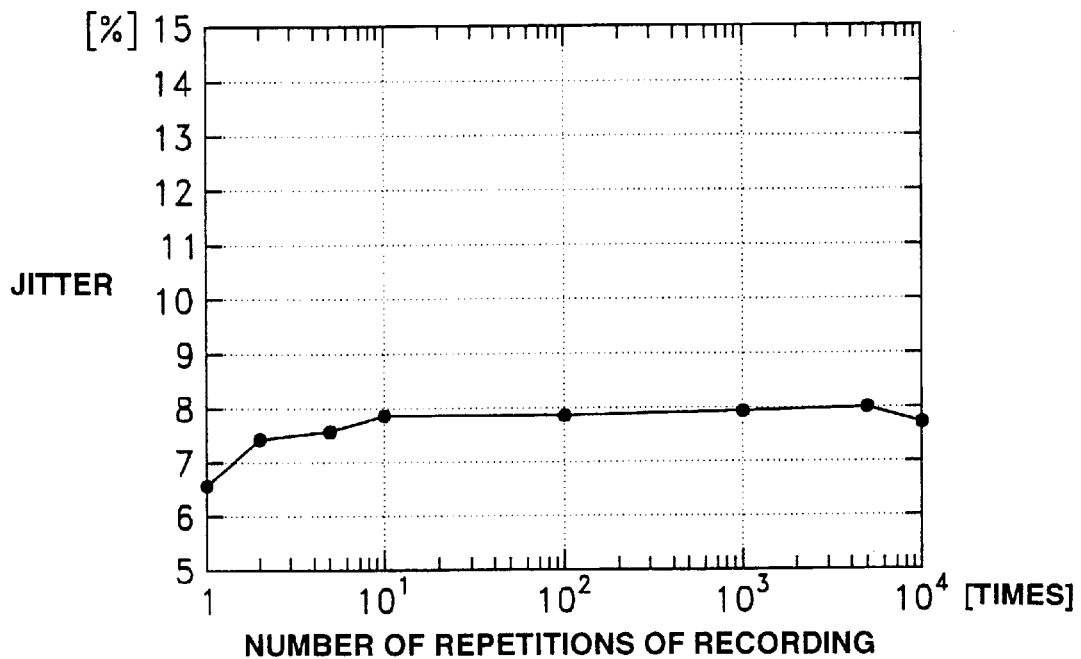
FIG. 48 graphically illustrates the relation between the number of repetitions of recording and read signal jitter in an example of the third experimental embodiment of the phase-change optical disc according to the present invention.
Figure 49:
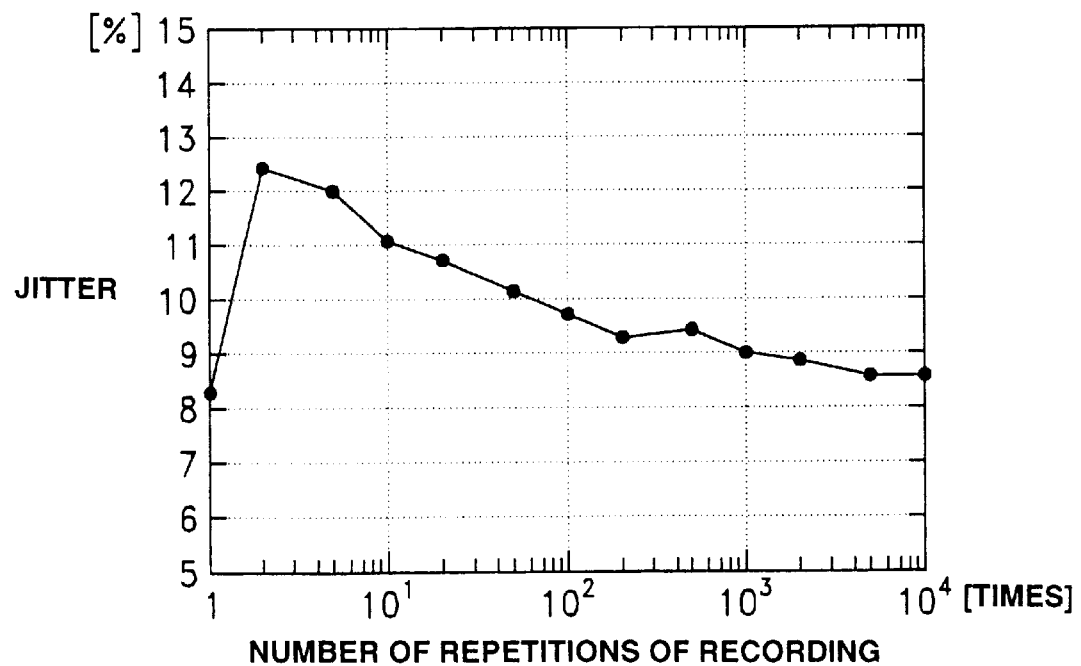
FIG. 49 graphically illustrates the relation between the number of repetitions of recording and read signal jitter in a comparative example of the third experimental embodiment.

The third example and third comparative example of phase-change optical disc were initialized. Thereafter, the lighting pattern shown in FIG. 3 was used to record a random EFM signal repeatedly to these phase-change optical discs and the jitters of the signal read out at appropriate times from the optical discs were measured. The measurement results of the third example are shown in FIG. 48, and those of the third comparative example are shown in FIG. 49.

As mentioned above, the recording layer in the third example of phase-change optical disc was formed in the Ar atmosphere containing the $N_2$ gas at a predetermined ratio according to the present invention. As seen from the experiment results shown in FIG. 48, there is found no increase of jitter in the signal read out after being recorded repeatedly the second and subsequent times and the jitter measured on the signals read out after being recorded repeatedly up to 10,000 times is stably less than 8%.

On the other hand, the recording layer in the third comparative example of phase-change optical disc was formed in the Ar atmosphere containing no $N_2$ gas. As seen from the experiment results shown in FIG. 49, the jitter increases drastically after the second recording. Recording has to be repeated on the order of 100 times until the jitter in the read signal is stably less than 10%.

The experiment results proved that the formation of the recording layer at the predetermined speed in the Ar gas atmosphere having the predetermined content of $N_2$ gas enables to provide a phase-change optical disc capable of a good read signal even after being recorded repeatedly many times.

As has been described in the foregoing, in the optical recording medium according to the present invention, since the conditions of forming the recording layer are defined, the GeSbTe alloy of the recording layer can be suitably nitrated and oxidized to optimize the physical properties of the recording layer for the write/read characteristic thereof and thus for further improvement of the durability against repeated recording. Therefore, the optical recording medium according to the present invention shows little regional deterioration of a signal read out after being recorded repeatedly a few times to tens of times and provides a good read signal even after more than tens of thousands of repetitions of recording. Thus, the optical recording medium according to the present invention always shows a stable and good write/read characteristic even after repetitions of signal recording. Namely, this optical recording medium is highly reliable.

Also, in the optical recording medium manufacturing method according to the present invention, since the conditions of forming the recording layer are defined, the GeSbTe alloy of the recording layer can be suitably nitrated and oxidized to optimize the physical properties of the recording layer for the write/read characteristic thereof and thus for further improvement of the durability against repeated recording. Therefore, the manufacturing method according to the present invention provides an optical recording medium showing little regional deterioration of a signal read out after being recorded repeatedly a few times to tens of times, and providing a good read signal even after more than tens of thousands of repetitions of recording. Thus, the manufacturing method according to the present invention can provide a highly reliable optical recording medium always showing a stable and good write/read characteristic even after repetitions of signal recording.

What is claimed is:

1. An optical recording medium comprising a recording layer of a phase-change material switchable between a crystalline state and an amorphous state in response to signal-wise illumination by light focused onto the recording layer to change the phase thereof from crystalline to amorphous, thereby writing an information signal onto the recording layer, said phase-change material comprising a GeSbTe alloy and said recording layer being formed by sputtering in an Ar gas atmosphere comprising $N_2$, $O_2$ or both $N_2$ and $O_2$, wherein:

the recording layer is formed at a speed X (nm/s) in an Ar gas atmosphere containing $N_2$ and $O_2$ gases of which the mixing ratio $(N_2$ and $O_2)/Ar$ among the $N_2$, $O_2$ and Ar gases is Y(%) and the mixing ratio $O_2/(N_2+O_2)$ of $O_2$ gas with the mixture of $N_2$ and $O_2$ gases is Z(%), the parameters X, Y and Z meeting the following relations (1) to (3):

$$Y \geq 2.3X + 1.0 \quad (1)$$

$$Y \leq 12.8X + 16.7 \quad (2)$$

$$10 \leq Z \leq 60 \quad (3).$$

2. The optical recording medium as set forth in claim 1, wherein the recording layer forming speed X is over 0.1 (nm/s) and under 5.0 (nm/s).

3. The optical recording medium as set forth in claim 1, wherein:

the GeSbTe alloy contained in the phase-change material is a composition falling in an area defined, in a ternary composition diagram of the three elements Ge, Sb and Te, by four points including a first point (26.0, 19.2, 54.8), second point (21.0, 21.0, 58.0), third point (14.3, 28.6, 57.1) and a fourth point (21.6, 24.4, 54.0).

4. The optical recording medium as set forth in claim 1, wherein the recording layer is 18 to 30 nm thick.

5. The optical recording medium as set forth in claim 1, wherein:

the recording layer is formed on a substrate having a diameter of 120±0.3 mm and a thickness of 0.60±0.03 mm; and the track pitch is 0.8±0.01 μm.

6. An optical recording medium comprising a recording layer of a phase-change material switchable between a crystalline state and an amorphous state in response to signal-wise illumination by light focused onto the recording layer to change the phase thereof from crystalline to amorphous, thereby writing an information signal onto the recording layer, said phase-change material comprising a GeSbTe alloy and said recording layer being formed by sputtering in an Ar gas atmosphere comprising $N_2$, $O_2$ or both $N_2$ and $O_2$, wherein:

the recording layer is formed at the speed X (nm/s) in an Ar gas atmosphere containing $O_2$ gas of which the mixing ratio $O_2/Ar$ between the $O_2$ and Ar gases is Y(%), the parameters X and Y meeting the following relations (1) and (4):

$$Y \geq 2.3X + 1.0 \quad (1)$$

$$Y \leq 5.5X + 2.7 \quad (4).$$

7. The optical recording medium as set forth in claim 6, wherein the recording layer forming speed X is over 0.1 (nm/s) and under 5.0 (nm/s).

8. The optical recording medium as set forth in claim 6, wherein:

the GeSbTe alloy contained in the phase-change material is a composition falling in an area defined, in a ternary composition diagram (of the three elements Ge, Sb and Te), by four points including a first point (26.0, 19.2, 54.8), second point (21.0, 21.0, 58.0), third point (14.3, 28.6, 57.1) and a fourth point (21.6, 24.4, 54.0).

9. The optical recording medium as set forth in claim 6, wherein the recording layer is 18 to 30 nm thick.

10. The optical recording medium as set forth in claim 6, wherein:

the recording layer is formed on a substrate having a diameter of 120±0.3 mm and a thickness of 0.60±0.03 mm; and the track pitch is 0.8±0.01 μm.

11. An optical recording medium comprising a recording layer of a phase-change material switchable between a crystalline state and an amorphous state in response to signal-wise illumination by light focused onto the recording layer to change the phase thereof from crystalline to amorphous, thereby writing an information signal onto the recording layer, said phase-change material comprising a GeSbTe alloy and said recording layer being formed by sputtering in an Ar gas atmosphere comprising $N_2$, $O_2$ or both $N_2$ and $O_2$, wherein:

the recording layer is formed at the speed X (nm/s) in an Ar gas atmosphere containing $N_2$ gas of which the mixing ratio $N_2$/Ar between the $N_2$ and Ar gases is Y(%), the parameters X and Y meeting the following relations (2) and (5):

$$Y \leq 12.8X + 16.7 \qquad (2)$$

$$Y \geq 1.8X + 5.0 \qquad (5).$$

12. The optical recording medium as set forth in claim 11, wherein the recording layer forming speed X is over 0.1 (nm/s) and under 5.0 (nm/s).

13. The optical recording medium as set forth in claim 11, wherein:

the GeSbTe alloy contained in the phase-change material is a composition falling in an area defined, in a ternary composition diagram (of the three elements Ge, Sb and Te), by four points including a first point (26.0, 19.2, 54.8), second point (21.0, 21.0, 58.0), third point (14.3, 28.6, 57.1) and a fourth point (21.6, 24.4, 54.0).

14. The optical recording medium as set forth in claim 11, wherein the recording layer is 18 to 30 nm thick.

15. The optical recording medium as set forth in claim 11, wherein:

the recording layer is formed on a substrate having a diameter of 120±0.3 mm and a thickness of 0.60±0.03 mm; and the track pitch is 0.8±0.01 μm.

16. A method for making an optical recording medium comprising the steps of:

providing an optical disk substrate; and forming a recording layer on said substrate comprising a GeSbTe alloy as a phase-change material, said recording layer being formed by sputtering in an Ar gas atmosphere comprising $N_2$ gas, $O_2$ gas or a mixture of $O_2$ gas and $N_2$ gas, to provide a phase change material recording layer switchable between a crystalline state and an amorphous state in response to being illuminated signal-wise by light focused on the recording layer which is effective to change the phase of the phase change material of the recording layer from crystalline to amorphous, to thereby write an information signal into the recording layer, wherein:

the recording layer is formed at a speed X (nm/s) in an Ar gas atmosphere containing $N_2$ and $O_2$ gases of which the mixing ratio $(N_2+O_2)$/Ar among the $N_2$ and $O_2$ gases and Ar gas is Y(%) and the mixing ratio $O_2$/$(N_2+O_2)$ of $O_2$ gas with the mixture of $N_2$ and $O_2$ gases is Z(%), the parameters X, Y and Z meeting the following relations (1) to (3):

$$Y \geq 2.3X + 1.0 \qquad (1)$$

$$Y \leq 12.8X + 16.7 \qquad (2)$$

$$10 \leq Z \leq 60 \qquad (3).$$

17. The optical recording medium as set forth in claim 16, wherein the recording layer forming speed X is over 0.1 (nm/s) and under 5.0 (nm/s).

18. The optical recording medium as set forth in claim 16, wherein:

the GeSbTe alloy contained in the phase-change material is a composition falling in an area defined, in a ternary composition diagram (of the three elements Ge, Sb and Te), by four points including a first point (26.0, 19.2, 54.8), second point (21.0, 21.0, 58.0), third point (14.3, 28.6, 57.1) and a fourth point (21.6, 24.4, 54.0).

19. The optical recording medium as set forth in claim 16, wherein the recording layer is 18 to 30 nm thick.

20. A method for making an optical recording medium comprising the steps of:

providing an optical disk substrate; and forming a recording layer on said substrate comprising a GeSbTe alloy as a phase-change material, said recording layer being formed by sputtering in an Ar gas atmosphere comprising $N_2$ gas, $O_2$ gas or a mixture of $O_2$ gas and $N_2$ gas, to provide a phase change material recording layer switchable between a crystalline state and an amorphous state in response to being illuminated signal-wise by light focused on the recording layer which is effective to change the phase of the phase change material of the recording layer from crystalline to amorphous, to thereby write an information signal into the recording layer, wherein:

the recording layer is formed at the speed X (nm/s) in an Ar gas atmosphere containing $O_2$ gas of which the mixing ratio $O_2$/Ar between the $O_2$ and Ar gases is Y(%), the parameters X and Y meeting the following relations (1) and (4):

$$Y \geq 2.3X + 1.0 \qquad (1)$$

$$Y \leq 5.5X + 2.7 \qquad (4).$$

21. The optical recording medium as set forth in claim 20, wherein the recording layer forming speed X is over 0.1 (nm/s) and under 5.0 (nm/s).

22. The optical recording medium as set forth in claim 20, wherein:

the GeSbTe alloy contained in the phase-change material is a composition falling in an area defined, in a ternary composition diagram (of the three elements Ge, Sb and Te), by four points including a first point (26.0, 19.2, 54.8), second point (21.0, 21.0, 58.0), third point (14.3, 28.6, 57.1) and a fourth point (21.6, 24.4, 54.0).

23. The optical recording medium as set forth in claim 20, wherein the recording layer is 18 to 30 nm thick.

24. A method for making an optical recording medium comprising the steps of:

provide an optical disk substrate; and forming a recording layer on said substrate comprising a GeSbTe alloy as a phase-change material, said recording layer being formed by sputtering in an Ar gas atmosphere comprising $N_2$ gas, $O_2$ gas or a mixture of $O_2$ gas and $N_2$ gas, to provide a phase change material recording layer switchable between a crystalline state and an amorphous state in response to being illuminated signal-wise by light focused on the recording layer which is effective to change the phase of the phase change material of the recording layer from crystalline to amorphous, to thereby write an information signal into the recording layer, wherein:

the recording layer is formed at the speed X (nm/s) in an Ar gas atmosphere containing $N_2$ gas of which the mixing ratio $N_2$/Ar between the $N_2$ and Ar gases is Y(%), the parameters X and Y meeting the following relations (2) and (5):

$$Y \leq 12.8X + 16.7 \quad (2)$$

$$Y \geq 1.8X + 5.0 \quad (5).$$

25. The optical recording medium as set forth in claim 24, wherein the recording layer forming speed X is over 0.1 (nm/s) and under 5.0 (nm/s).

26. The optical recording medium as set forth in claim 24, wherein:

the GeSbTe alloy contained in the phase-change material is a composition falling in an area defined, in a ternary composition diagram (of the three elements Ge, Sb and Te), by four points including a first point (26.0, 19.2, 54.8), second point (21.0, 21.0, 58.0), third point (14.3, 28.6, 57.1) and a fourth point (21.6, 24.4, 54.0).

27. The optical recording medium as set forth in claim 24, wherein the recording layer is 18 to 30 nm thick.

* * * * *